(12) United States Patent
Tatar et al.

(10) Patent No.: US 7,729,351 B2
(45) Date of Patent: Jun. 1, 2010

(54) PIPELINED PACKET SWITCHING AND QUEUING ARCHITECTURE

(75) Inventors: Mohammed I. Tatar, Ottawa (CA); Garry P. Epps, Sunnyvale, CA (US); Oded Trainin, Raanana (IL); Eyal Oren, Raanana (IL); Cedrik Begin, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 898 days.

(21) Appl. No.: 11/365,017

(22) Filed: Mar. 1, 2006

(65) Prior Publication Data

US 2007/0195761 A1 Aug. 23, 2007

Related U.S. Application Data

(63) Continuation of application No. 11/358,860, filed on Feb. 21, 2006.

(51) Int. Cl.
*H04L 12/56* (2006.01)
*H04J 1/16* (2006.01)

(52) U.S. Cl. .................... 370/390; 370/419; 370/432

(58) Field of Classification Search ............... 370/389, 370/390, 469, 419, 432
See application file for complete search history.

(56) References Cited

U.S. PATENT DOCUMENTS

| | | | |
|---|---|---|---|
| 4,849,968 A | 7/1989 | Turner | 370/94 |
| 6,119,215 A * | 9/2000 | Key et al. | 712/19 |
| 6,173,386 B1 * | 1/2001 | Key et al. | 712/10 |
| 6,175,571 B1 * | 1/2001 | Haddock et al. | 370/423 |
| 6,272,621 B1 * | 8/2001 | Key et al. | 712/200 |
| 6,501,733 B1 | 12/2002 | Falco et al. | 370/235 |
| 6,513,108 B1 * | 1/2003 | Kerr et al. | 712/19 |
| 6,711,170 B1 | 3/2004 | Brown | 370/395.7 |
| 6,775,279 B2 * | 8/2004 | Murai et al. | 370/390 |
| 6,785,236 B1 | 8/2004 | Lo et al. | 370/235 |
| 6,810,426 B2 | 10/2004 | Mysore et al. | 709/234 |
| 6,813,243 B1 | 11/2004 | Epps et al. | 370/235 |
| 6,831,923 B1 * | 12/2004 | Laor et al. | 370/412 |
| 6,895,481 B1 * | 5/2005 | Mitten et al. | 711/154 |
| 6,959,323 B1 * | 10/2005 | Tzeng et al. | 709/205 |
| 6,961,341 B1 | 11/2005 | Krishnan | 370/412 |

(Continued)

OTHER PUBLICATIONS

Floyd et al., "Random Early Detection Gateways for Congestion Avoidance," IEEE/ATM Transactions on Networking, Aug. 1993, pp. 1-22.

*Primary Examiner*—John Pezzlo
(74) *Attorney, Agent, or Firm*—Jonathan N. Geld; Campbell Stephenson LLP

(57) ABSTRACT

An architecture for a line card in a network routing device is provided. The line card architecture provides a bi-directional interface between the routing device and a network, both receiving packets from the network and transmitting the packets to the network through one or more connecting ports. In both the receive and transmit path, packets processing and routing in a multi-stage, parallel pipeline that can operate on several packets at the same time to determine each packet's routing destination is provided. The transmit path of the line card architecture further incorporates additional features for treatment and replication of multicast packets. These features can include a recycle path coupling a gather stage circuit and a fetch stage circuit and can include sequence number logic configured to associate sequence numbers with multicast packet headers.

30 Claims, 13 Drawing Sheets

U.S. PATENT DOCUMENTS

| | | | |
|---|---|---|---|
| 6,977,930 B1 * | 12/2005 | Epps et al. | 370/392 |
| 6,980,552 B1 * | 12/2005 | Belz et al. | 370/392 |
| 7,061,909 B2 * | 6/2006 | Blanc et al. | 370/390 |
| 7,100,020 B1 * | 8/2006 | Brightman et al. | 712/18 |
| 7,131,125 B2 * | 10/2006 | Modelski et al. | 718/106 |
| 7,177,276 B1 * | 2/2007 | Epps et al. | 370/230 |
| 7,180,856 B1 * | 2/2007 | Breslau et al. | 370/230 |
| 7,206,858 B2 | 4/2007 | Hooper et al. | 709/238 |
| 7,236,465 B2 * | 6/2007 | Banerjee et al. | 370/312 |
| 7,237,016 B1 * | 6/2007 | Schober | 709/223 |
| 7,257,083 B2 | 8/2007 | Bansal et al. | 370/235 |
| 7,269,348 B1 * | 9/2007 | Tse-Au | 398/25 |
| 7,292,578 B1 | 11/2007 | Kerr et al. | 370/395.32 |
| 7,301,905 B1 | 11/2007 | Tontiruttananon et al. | 370/232 |
| 7,304,944 B2 | 12/2007 | Bitar et al. | 370/229 |
| 7,304,996 B1 * | 12/2007 | Swenson et al. | 370/394 |
| 7,313,093 B1 | 12/2007 | Eatherton et al. | 370/230 |
| 7,330,468 B1 * | 2/2008 | Tse-Au | 370/389 |
| 7,333,484 B2 * | 2/2008 | Henderson et al. | 370/389 |
| 7,342,942 B1 * | 3/2008 | Parruck et al. | 370/474 |
| 7,349,403 B2 * | 3/2008 | Lee et al. | 370/395.21 |
| 7,350,208 B1 | 3/2008 | Shoham | 718/102 |
| 7,356,750 B2 * | 4/2008 | Fukushima et al. | 714/748 |
| 7,369,500 B1 | 5/2008 | Gallagher et al. | 370/235 |
| 7,382,787 B1 * | 6/2008 | Barnes et al. | 370/401 |
| 7,426,215 B2 | 9/2008 | Romano et al. | 370/412 |
| 2002/0085586 A1 | 7/2002 | Tzeng | 370/475 |
| 2002/0131413 A1 | 9/2002 | Tsao et al. | 370/392 |
| 2003/0002517 A1 * | 1/2003 | Takajitsuko et al. | 370/428 |
| 2003/0214964 A1 | 11/2003 | Shoham et al. | 370/412 |
| 2003/0231594 A1 | 12/2003 | Xu et al. | 370/236 |
| 2004/0004972 A1 | 1/2004 | Lakshmanamurthy et al. | 370/413 |
| 2004/0037302 A1 * | 2/2004 | Varma et al. | 370/412 |
| 2004/0184444 A1 | 9/2004 | Aimoto et al. | 370/352 |
| 2004/0258072 A1 | 12/2004 | Deforche | 370/395.4 |
| 2005/0031097 A1 | 2/2005 | Rabenko et al. | 379/93.31 |
| 2005/0111461 A1 | 5/2005 | Khan et al. | 370/395.4 |
| 2005/0135243 A1 | 6/2005 | Lee et al. | 370/229 |
| 2005/0141424 A1 | 6/2005 | Lim et al. | 370/235 |
| 2005/0175014 A1 | 8/2005 | Patrick | 370/395.43 |
| 2005/0243853 A1 | 11/2005 | Bitar et al. | 370/432 |
| 2005/0259574 A1 | 11/2005 | Figueira et al. | 370/229 |
| 2006/0002386 A1 * | 1/2006 | Yik et al. | 370/389 |
| 2006/0013133 A1 | 1/2006 | Peng et al. | 370/230 |
| 2006/0039374 A1 * | 2/2006 | Belz et al. | 370/389 |
| 2006/0092934 A1 | 5/2006 | Chung et al. | 370/389 |
| 2006/0187949 A1 * | 8/2006 | Seshan et al. | 370/412 |
| 2006/0203819 A1 | 9/2006 | Farinacci et al. | 370/390 |
| 2006/0268913 A1 * | 11/2006 | Singh et al. | 370/412 |
| 2007/0070895 A1 | 3/2007 | Narvaez | 370/230 |
| 2007/0195773 A1 * | 8/2007 | Tatar et al. | 370/392 |
| 2007/0195777 A1 * | 8/2007 | Tatar et al. | 370/392 |
| 2007/0195778 A1 * | 8/2007 | Tatar et al. | 370/392 |
| 2008/0117913 A1 * | 5/2008 | Tatar et al. | 370/392 |

* cited by examiner

PIPELINED PACKET SWITCHING AND QUEUING ARCHITECTURE

CROSS-REFERENCE TO RELATED APPLICATIONS

This application is a continuation of U.S. patent application Ser. No. 11/358,860, entitled "PIPELINED PACKET SWITCHING AND QUEUING ARCHITECTURE", filed Feb. 21, 2006, and naming Mohammed Tatar, Garry P. Epps, Oded Trainin, Eyal Oren, and Cedrik Begin as inventors. This application is assigned to CISCO TECHNOLOGY, INC., the assignee of the present invention, and is hereby incorporated by reference, in its entirety and for all purposes.

FIELD OF THE INVENTION

The present invention relates to data network communication devices, specifically devices that enable packet forwarding and handling in data communication networks.

BACKGROUND OF THE INVENTION

In a data communication network, routing devices receive messages at one of a set of input interfaces and forward them on to one or more of a set of output interfaces. Users typically require that such routing devices operate as quickly as possible in order to keep pace with a high rate of incoming messages. In a packet routing network, where information messages are transmitted in discrete chunks or "packets" of data, each packet includes a header. A routing device uses the header information for routing the packet to an output interface for subsequent forwarding to a destination device. A routing device can forward the packet to another routing device for further processing and/or forwarding.

Header information used for routing can include destination and source addresses for the packet. Additionally, a routing device can use header information such as destination device port, source device port, protocol, packet length, and packet priority. Routing devices can use header information for access control, accounting, quality of service, or class of service.

FIG. 1 illustrates a generic packet routing device 100 such as that found in the prior art. Routing device 100 consists of a set of line cards 110 and a switching fabric 120. Each line card 110 includes an input interface 111, an output interface 112, a fabric interface 170, and a control element 130. Line cards 110 connect to communications network 1, which can be a local, enterprise, metropolitan, or wide-area network, through both input interface 111 and output interface 112. More than one input interface 111 or output interface 112 can be provided, with each interface carrying a fraction of the full capacity of control element 130.

Control element 130 is configured to receive inbound packets (i.e., packets entering the routing device from network 1) from input interface 111, process the packets, and transmit them through fabric interface 170 to switching fabric 120, which then sends the packets to another (or the same) line card 110 for further processing. This path to the switching fabric is the "receive" or ingress path into the routing device from the network.

Outbound packets (i.e., transmitted out of the routing device) are received from switching fabric 120 through fabric interface 170, processed in control element 130, and transmitted to network 1 on output interface 112. Accordingly, this path from the switching fabric is the "transmit" or egress path from the routing device to the network.

In the prior art, control element 130 can include an inbound packet receiver 140, lookup circuit 145, inbound memory controller 150, first memory 160, a second (outbound) lookup circuit 175, outbound memory controller 155, second memory 165, and outbound transmitter 180. Control circuits 190 are also provided to perform such tasks as configuration, initialization, statistics collection, and accounting functions, as well as to process certain exception packets.

In routing device 100, packets are received from the physical medium of the network at input interface 111. The inbound packet receiver 140 operates in conjunction with lookup circuit 145 to determine routing treatments for inbound packets. Lookup circuit 145 includes routing treatment information disposed in a memory structure. These routing treatments can include, for example, one or more of the following:

- selection of one or more output interfaces to which to forward inbound packets responsive to the destination device, to the source and destination device, or to information in any other packet header fields (packets may also be dropped);
- determination of access control list (ACL) treatment for inbound packets;
- determination of class of service (COS) treatment for inbound packets;
- determination of one or more accounting records or treatments for inbound packets; and
- determination of other administrative treatment for inbound packets.

One shortcoming of traditional prior art packet routing systems is an inability of processors using software to perform necessary lookup and queue management functions in real time (i.e., approaching line rate of the incoming packets). As the need for increased packet throughput grows, such software-based systems lack sufficient scalability to meet the demands of modern data communications networks.

Prior art packet routing systems tuned for additional speed with hardware implementation of functions once performed by software exhibit a drawback of a lack of flexibility. As the hardware is less able to be reconfigured without replacement or redesign, these prior art packet routing systems can be rendered obsolete by the adoption of new standards and communication protocols.

A further drawback of prior art routing systems is their relative inability to rapidly provide a range of services, such as bandwidth management, based on packet priority, as represented by, for example, the various fields in a packet header. Such systems are often described as providing type of service (TOS), quality of service (QOS), or class of service (COS). Such prior art routing systems typically experience additional packet latency and throughput reduction when performing services such as bandwidth management based on packet priority, if they are capable of performing these features at all. In particular, so-called "edge" QOS features associated with, for example, leased-line aggregation and content aggregation are in particular need of support by new routing devices.

What is therefore needed is a flexible routing system, preferably distributed on a line card, that provides ultra-high throughput packet switching and bandwidth management. The system architecture should be able to be reconfigured to handle a variety of network protocols and optimization. In particular, low-latency routing determined by individual packet class of service is desired. Such a line card should operate at near line rate (i.e., at or near the maximum speed of transmission over the physical medium and without any appreciable buffering delay).

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention is an architecture for a line card in a network routing device. The line card provides a bi-directional interface between the routing device and a network, both receiving packets from the network and transmitting the packets to the network through one or more connecting ports. Typical routing devices embodying the present invention can comprise multiple such line cards (and thus multiple network connections) and a switching fabric that provides a physical connection between the line cards.

In embodiments of the present invention, both the receive and transmit path of each line card, packets can be processed and routed in a multi-stage, parallel pipeline that can operate on several packets at the same time to determine each packet's routing destination. Once that determination is made, each received packet can be modified to contain new routing information as well as additional header data to facilitate the packet's transmission through the switching fabric. Using bandwidth management techniques, each packet is then buffered and enqueued for transmission through the switching fabric to the corresponding destination port. The destination line card can be the same physical line card as that receiving the inbound packet or a different physical line card. The transmit path of the line card incorporates additional features for treatment and replication of multicast packets.

Among the more desirable "edge" features that can be supported by embodiments of the present invention are access control lists (ACLs) or extended access control lists (Ex-ACLs), committed access rate (CAR), and network data flow statistics (e.g., network source and destination packet count statistics including those associated with Cisco Systems IOS Netflow services, hereafter called "Netflow" without limitation). ACLs and Ex-ACLs are used to classify packets or perform filtering based on certain matching criteria, such as interface, protocol, source prefix, destination prefix, L4 port number, and the like. Filtering actions can include permit or deny, with or without statistics accumulation, and reporting. CAR features are used to rate limit traffic based on certain matching criteria such as interface, IP precedence, quality of service group, or Ex-ACL criteria. CAR actions include transmit, drop, set precedence, or set quality of service group when traffic conforms or exceeds the rate limit. Netflow features include separating or identifying a specific flow or group of flows, and operating on those flows in some manner (e.g., gathering desired statistical information). In general, a "flow" is a series of data packets transmitted between two points in a network during a session. Such Netflow information can be used for network planning, traffic engineering, or even billing purposes.

Figure 1:
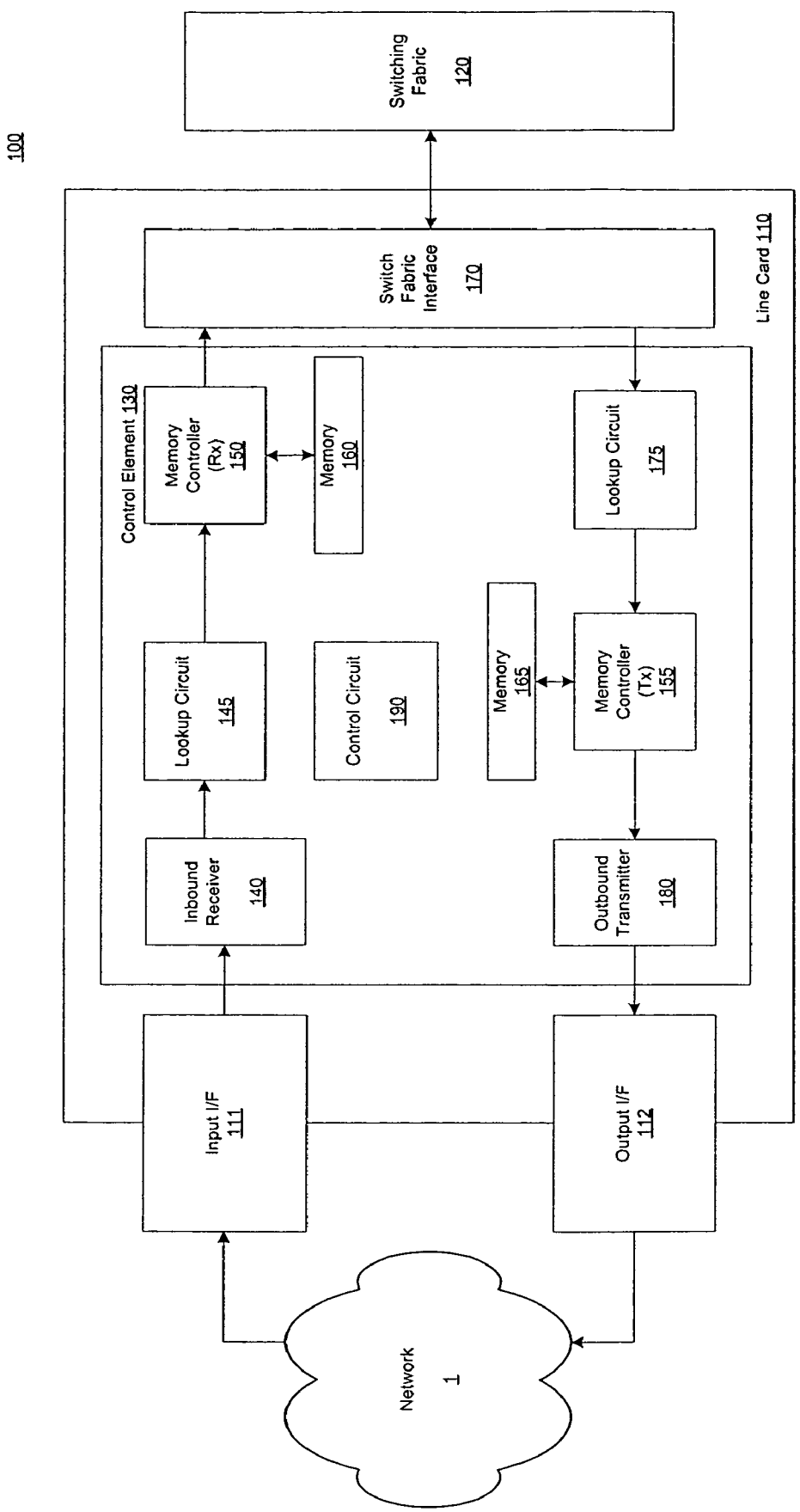
FIG. 1 is a simplified block diagram illustrating a generic packet routing device such as that found in the prior art.
Figure 2:
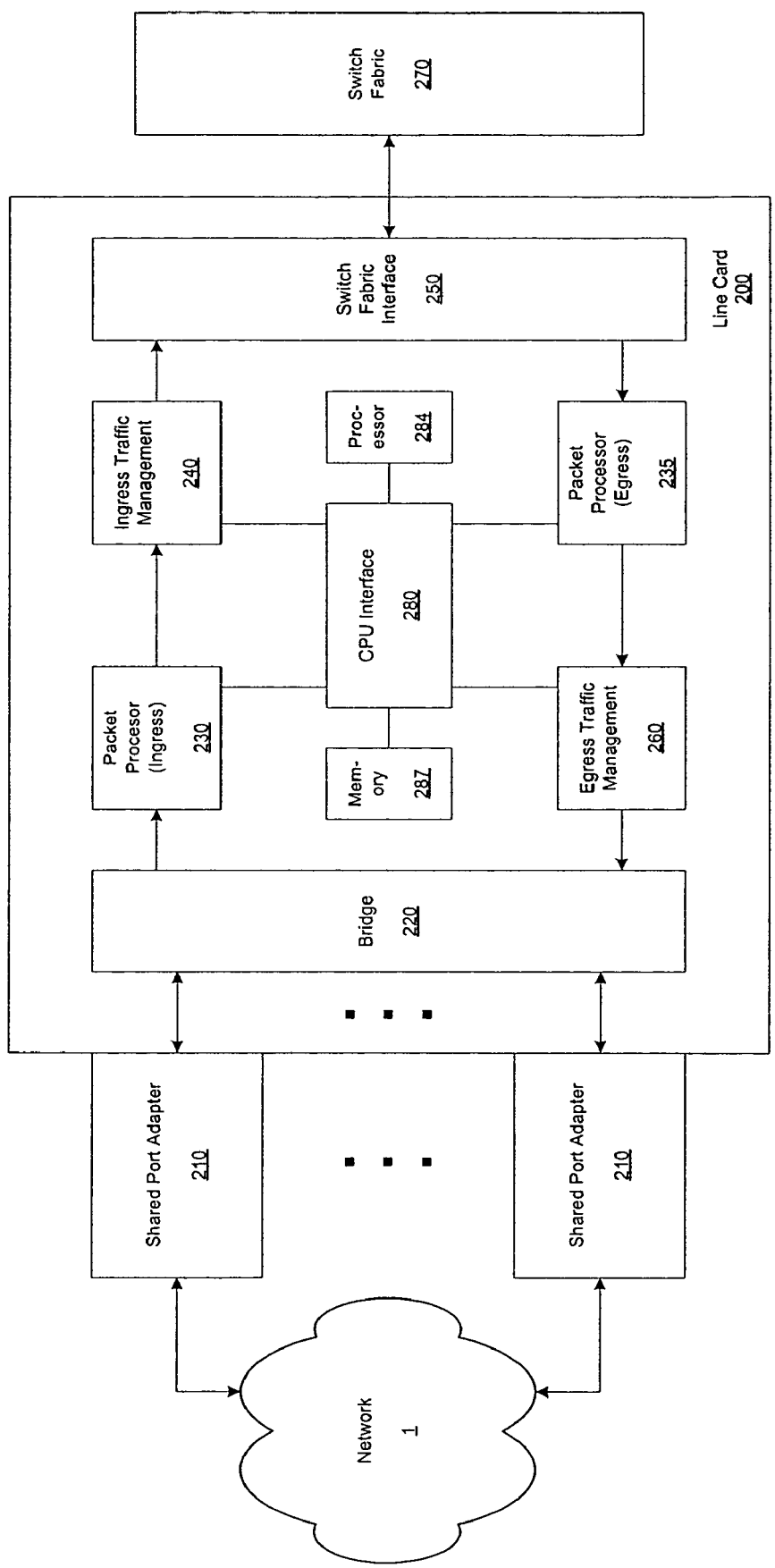
FIG. 2 is a simplified block diagram illustrating a line card architecture in accord with one embodiment of the present invention.

FIG. 2 is a simplified block diagram illustrating a line card architecture according to one embodiment of the present invention. The line card architecture includes distinct receive and transmit data paths. The receive and transmit data paths are independent and can operate on a stream of packets received from network 1 or from switch fabric 270, respectively. The receive side data path is defined as a path from one of a plurality of shared port adapters 210 to the routing device's switch fabric 270. A transmit side data path is a path from the switch fabric 270 to a shared port adapter 210.

I. Ingress (Receive) Data Path Overview

In the illustrated embodiment, data packets are received from network 1 through a shared port adapter 210. A shared port adapter can be configured to couple to a variety of hardware and network protocols in network 1. A shared port adapter comprises one or more physical interfaces to the network and is configured to perform operations on ingress frames, such as OSI Layer 2 (MAC). Shared port adapter coupled to line card 200 can be configured to both receive and transmit packets. Shared port adapters can also perform tasks such as VLAN-based filtering and accounting on ingress packets, or even truncation of L2 headers not needed by line card 200 for processing.

A plurality of shared port adapters (SPA) 210 are coupled to line card 200 via bridge 220. In one embodiment of the present invention, this coupling can be performed using a high speed interface such as a System Physical Interface level 4 (SPI-4) interface, as specified, for example, in the Optical Internetworking Forum Implementation Agreement OIF-SPI-4-02.1. Bridge 220 can store the incoming packets in a plurality of FIFO memories (not shown) to buffer the packets prior to transmitting them to the next stage of the receive data path. Bridge 220 extracts portions of the packets containing information relevant for forwarding and classification. Such forwarding and classification portion of the packets will be referred to as "heads" or "headers" while the remainder of the packet will be referred to as a "tail." A portion of a packet considered to be a header can be configured dependent upon, for example, the type of packets received or chosen switching parameters. Bridge 220 can also include in a head a control word providing the original Layer 2 length (before potential truncation by the SPA 210) and the received channel number of the packet to Ingress Packet Processor 230. Bridge 220 then sends interleaved heads and tails from each incoming FIFO memory to Ingress Packet Processor 230 according to a round robin scheme (e.g., a deficit or modified deficit round robin scheme). Bridge 220 can support low-latency FIFOs wherein a given physical port on an SPA can have multiple FIFOs of varying priority. Bridge 220 can also provide backpressure to the shared port adapters as the buffering memory becomes full or in response to a backpressure request from components further down the ingress data path.

Ingress Packet Processor 230 is a pipelined switch comprised of four parallel pipelines (or tiny pipes), wherein each pipe can perform the same series of operations on packet heads. In one embodiment of the present invention, the packet heads are distributed in a cyclic fashion to the four pipes. Each pipeline stage works on a different packet header to perform different tasks. When the operation of each stage is complete, each stage passes its results on to the next stage concurrently. Tails of the packets flow transparently through Ingress Packet Processor 230, bypassing the pipeline stages. If Ingress Packet Processor 230 cannot keep up with the number of incoming heads (due either to downstream backpressure or packet re-circulation), the Ingress Packet Processor can apply a hard backpressure to bridge 220. Ingress Packet Processor 230 can also strip the Layer 2 headers from the head and add a buffer header to packets sent downstream. A buffer header (BHDR) can contain information from table lookup results and other stages of the Ingress Packet Processor pipe (e.g., ingress-side queue, egress side queue, output encapsulation type, L3 length, L3 packet start offset, ideal packet buffer size, and identification of whether the packet is multicast or unicast). Ingress Packet Processor 230 can further be configured to recycle packet headers through a tiny pipe for further processing if required.

Ingress Packet Processor 230 provides Ingress Traffic Management module 240 with the heads and tails. Ingress Traffic Management module 240 can perform packet buffering, queue management, ingress traffic shaping, and weighted random early discard packet dropping for queue depth management. Ingress Traffic Management module 240 receives the heads and tails from Ingress Packet Processor 230 and merges them based on the order received at the Ingress Traffic Management module. The Ingress Traffic Management module can then place the merged packet into a queue in preparation for transmission to the switch fabric or be immediately dropped. Packets are pulled out of the queue memory based on the destination to which they are targeted and are placed in an appropriate priority FIFO (also known as a virtual output queue [VOQ]). The outgoing FIFO can be backpressured from switch fabric interface 250 depending upon congestion of switch fabric 270. Multicast packets will be enqueued to a special set of multicast queues. Embodiments of the Ingress Traffic Management module can also support two or more priorities for unicast and multicast traffic. High priority queue traffic can be mapped to a high priority outgoing FIFO, while low priority queue traffic can be mapped to low priority FIFOs in the switch fabric interface.

Ingress Traffic Management module 240 passes packets to appropriate FIFOs in switch fabric interface 250. In this aspect, the switch fabric interface can fragment the unicast and multicast packets received from the Ingress Traffic Management module into uniformly sized and appropriately identified cells to be transmitted through switch fabric 270. Switch fabric interface 250 can generate requests to a scheduler in switch fabric 270 in preparation for transmitting the encapsulated fragments (cells) to switch fabric 270.

II. Egress (Transmit) Data Path Overview

The egress data path in line card 200 extends from switch fabric 270 to shared port adapter 210 and ultimately to network 1. Cells are directed from switch fabric 270 to a destination line card's switch fabric interface 250.

Switch fabric interface 250 reassembles cells from a plurality of different flows (e.g., unicast, multicast, and multiple priorities of each) simultaneously. Switch fabric interface 250 can also perform cyclic redundancy and sequence numbers checks during reassembly, and will store a full packet in a reassembly memory. The transmit data path is configured to treat unicast and multicast packets distinctly. Switch fabric interface 250 can be configured with distinct multicast versus unicast handshaking schemes to Egress Packet Processor 235 in order to control the amount of packet processing capacity of Egress Packet Processor 235 used by multicast versus unicast. The Egress Packet Processor can handle a fixed number of packets at a time (the number of stages in each tiny pipe multiplied by the number of tiny pipes). To avoid overpopulating the stages with multicast packets, a counter is set which is updated for every multicast packet entering and leaving the Egress Packet Processor. In this manner, it is always known how many multicast packets are being handled at any time. This counter is compared with threshold registers to control the amount of multicast packets admitted into Egress Packet Processor 235. Switch fabric interface 250 can also monitor the full status of the reassembly memory FIFOs in order to generate fabric backpressure signals to switch fabric 270, if necessary. Switch fabric interface 250 will transfer the head and tail of each reassembled packet to Egress Packet Processor 235 using a scheduling scheme which can include a strict priority or deficit round robin among unicast and multicast traffic, but such priorities will be distinct between unicast and multicast transmission. Scheduling of transmission of multicast and unicast traffic is controlled by the above-mentioned handshaking scheme between switch fabric interface 250 and Egress Packet Processor 235.

Egress Packet Processor 235 generally performs similar functions as Ingress Packet Processor 230, plus Egress Packet Processor 235 incorporates additional functions. Egress Packet Processor 235 can perform Layer 2 encapsulation for unicast and multicast packets using the table lookup memory (described in the receive data path). Egress Packet Processor 235 uses thresholds for multicast to request new packets from switch fabric interface 250. Egress Packet Processor 235 is further configured to perform multicast packet replication by recirculating a head through one of the parallel pipes immediately after that head has transited the pipe. Egress Packet Processor 235 works in conjunction with Egress Traffic Management module 260 in generating and assembling multicast packets for transmission as well as unicast packets.

Egress Traffic Management module 260 manipulates unicast heads and tails in a similar fashion as Ingress Traffic Management module 240 by merging the heads and tails and placing the full packet into a queue memory. Egress Traffic Management module 260 also assembles multicast heads and tails. In one embodiment of the present invention, such multicast packet assembly can be performed by merging the first head and tail into a queue memory. As the Egress Traffic Management module receives additional heads (for the multicast packet using the same tail data) from Egress Packet Processor 235, the additional head is stored in a queue memory and associated with a tail pointer that points to the memory location of the tail stored with the first head.

In the aspect of the invention illustrated in FIG. 2, Bridge 220 is configured to receive the outgoing packets from Egress Traffic Management module 260. Bridge 220 can accept the packets destined for physical outbound ports on shared port adapters (SPA) 210 based on a flexible mapping of Egress Traffic Management module 260's ports to physical ports. Such a mapping can be used to associate subinterfaces with physical interfaces corresponding to different types of network protocols or priorities associated with outgoing interfaces. Bridge 220 can store the full packets in outgoing FIFO memory channels corresponding to each network interface. Should the outgoing FIFO memories reach a full state, bridge 220 can cause a backpressure along the transmit data path to a corresponding queuing hierarchy root in Egress Traffic Management module 260, and can also respond to backpressure signals received from SPAs 210.

SPAs 210 receive the egress packets from bridge 220. The shared port adapters can process the egress packets, formatting them appropriately for the hardware and network protocols for network 1. Shared port adapters 210 can then transmit the outgoing packets on hardware interfaces coupled to network 1. In this manner, an SPA 210 can both receive packets from network 1 and transmit packets onto network 1.

Details of each stage on the receive (ingress) and transmit (egress) data paths of the line card architecture are described more fully below.

III. Receive Path Module Details

A. Bridge Module

Bridge module 220 is the interface between shared port adapters 210 (SPA) and Ingress Packet Processor 230. Bridge 220 functions as a physical layer interface.

Figure 3:
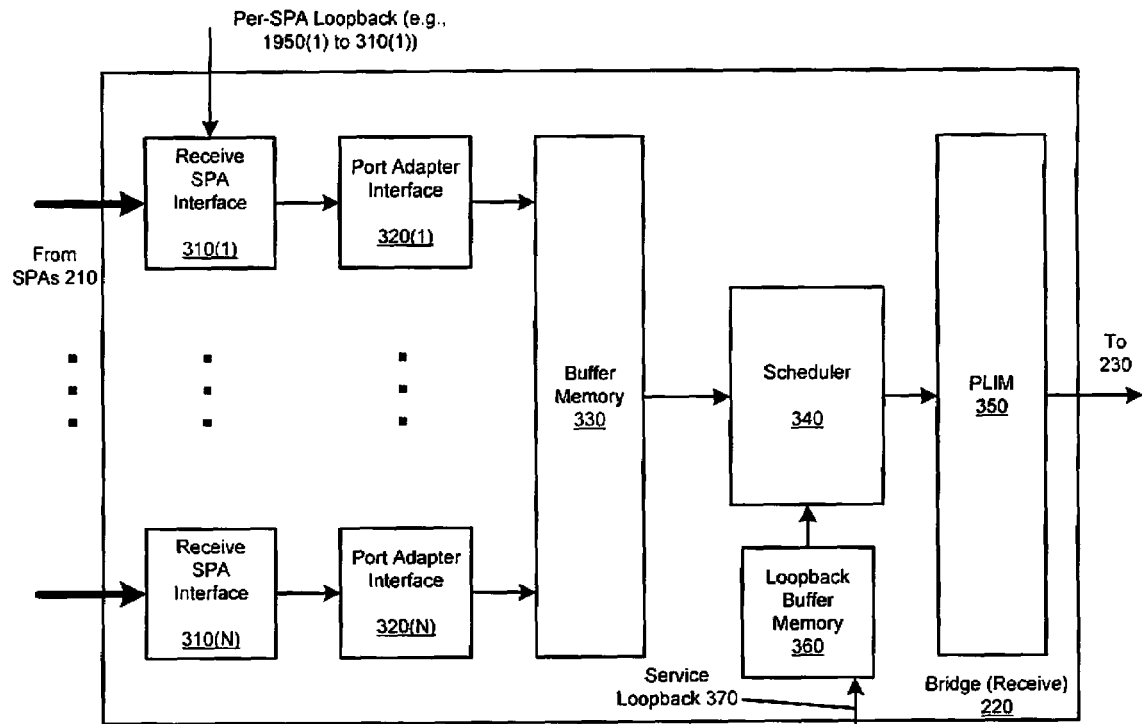
FIG. 3 is a simplified block diagram illustrating a data path through a line card bridge module in accord with one embodiment of the present invention.

FIG. 3 is a simplified block diagram of a data path through one embodiment of bridge 220. In the ingress direction, bridge 220 can receive interleaved packet bursts from the plurality of SPAs 210 through SPA interfaces 310(1)-(N). In one embodiment of the present invention, SPA interfaces 310 can implement System Packet Interface level 4 phase 2 (SPI 4.2) interface protocols in communicating with each SPA. SPA interfaces 310 pass the packet bursts to port adapter interfaces 320(1)-(N), which assemble full packets. These full packets are then written to buffer memory 330. In one embodiment of the present invention, buffer memory 330 can be an embedded DRAM (DRAM). Buffer memory 330 can be divided into a plurality of buffers each of which can be associated with a port or channel on an SPA or the entire SPA interface (e.g., 8 MB of buffer memory can be divided into 64 buffers).

The available buffer memory can be used by one or more SPAs. For example, if four SPAs are coupled to bridge 220, each SPA can use up to one-fourth of the buffer memory and up to one-fourth of the total number of buffers. If only one SPA is coupled to bridge 220, the one SPA can use all the buffer memory storage and all of the buffers configured therein.

In one embodiment of the present invention, buffer memory 330 can be configured into 64 separate buffers. Each buffer can be assigned to a port of an SPA. In embodiments of the present invention, SPA output can be over-subscribed to the Ingress Packet Processor, which can result in packet drops. When a single buffer is configured per SPA port, packet drops are done in an unintelligent fashion and can result in the loss of important control packets. In order to address this issue, bridge 220 can be configured to support a high priority buffer and a low priority buffer per SPA port. The SPAs can perform packet prioritization and indicate a packet's priority through a selection of a channel between the SPA and the SPA interface. High priority packets will be forwarded to Ingress Packet Processor 230 before low priority packets for a given port.

If a high priority queue has packets, that queue can be selected, otherwise a low priority queue can be selected. Once a queue (or buffer) is selected by scheduler 340, information in that queue is read and sent out on a physical layer interface module (PLIM) 350 to Ingress Packet Processor 230.

Scheduler 340 then performs port selection on the buffer memory queues. In one embodiment of the present invention, scheduler 340 performs such port selection using a deficit round robin (DRR) algorithm. A DRR algorithm can be employed to fairly allocate ingress bandwidth to Ingress Packet Processor 230. Such fair allocation is desirable because each of the SPAs can have different bandwidths (e.g., channelized SONET versus Ethernet) and within an SPA, different ports can have different bandwidths or priorities. Under a deficit round robin port selection algorithm, the deficit of the selected queue is adjusted based on the length of a packet serviced from the queue. Further, under DRR, the identity of the last selected port is retained and used to select the next eligible port (i.e., the next port that has at least one packet available). A port will remain selected as long as the port's deficit is positive and packets are available in that port. When the deficit goes negative or packets are not available, DRR advances to select the next eligible port. Once a port is selected, bridge 220 will send packets from the buffers associated with that port until the deficit of that port becomes negative. Every time a packet is sent, scheduler 340 will subtract the length of that packet from the deficit of that port. The scheduler can be configured to use either the L3 length of the packet or the original L2 length.

Scheduler 340 can also allocate bandwidth to loopback packets stored in loopback buffer memory 360. Loopback packets are passed to loopback buffer memory 360 from the transmit (egress) data path PLIM 1910, discussed more fully below. Loopback of packets allows packets to re-enter the switch router without having to egress from line card 200 into network 1 and then back into the line card.

In one embodiment of the present invention, if the fill level of any of the buffers in buffer memory 330 exceeds a programmable threshold, bridge 220 can set a "Don't Work Hard" (DWH) bit in a control word inserted in packets sent to Ingress Packet Processor 230. If at least one of the buffers in buffer memory 330 exceeds the programmable threshold, subsequent packets sent to Ingress Packet Processor 230 can have the DWH bit set in the control word. The Ingress Packet Processor will look at this bit and can selectively drop processing-intensive packets or perform less intensive processing on those packets, while allowing high-priority control packets to flow through. Such selection avoids non-intelligent packet dropping of important packets (e.g., keep alive packets) by bridge 220. In this manner, the DWH-bit is basically a single bit indication that signals Ingress Packet Processor 230 to speed up packet processing. When the fill level of all buffers in buffer memory 330 drops below the corresponding threshold, the DWH-bit can be reset. Bridge 220 can also take into account hysteresis in setting and resetting the DWH-bit; that is, buffer fill level thresholds for setting and resetting the DWH-bit are not necessarily the same.

Bridge 220 can also provide and respond to backpressure signals. For each SPA, bridge 220 can provide a backpressure signal through SPA interfaces 310. Bridge 220 is configured so that the data path from SPA interfaces 310 to buffer memory 330 is always faster than incoming traffic from the SPAs. Bridge 220 can send a "starving," "hungry," or "satisfied" indication to the SPAs based on programmable thresholds (e.g., almost full or almost empty) applied to buffers in buffer memory 330. Scheduler 340 can also respond to backpressure signals received from Ingress Packet Processor 230. Bridge 220 can also count dropped packets on a per port (or per buffer) basis.

Bridge 220 can provide a path for packets to be "looped back" from the egress path to the ingress path (Service Loopback 370). Packets flagged as requiring this path arrive from the transmit side of Bridge 220 into the Loopback Buffer Memory 360. Loopback Buffer Memory 360 can be a simple FIFO, or multiple parallel FIFOs allowing for multiple Classes of Service. Packets from Loopback Buffer Memory 360 are read out by Scheduler 340 and multiplexed with the normal traffic received from the SPAs using a scheduling algorithm. In one embodiment, this can be a weighted round-robin, but other schemes are not precluded such as Modified Deficit Round Robin. An example of a packet flagged for loop back would be a packet sent from an originating line card to another card or processor for service (e.g., decryption). That packet can then be returned to the originating line card egress path via the switching fabric and flagged for loop back to resume processing on the ingress path of the originating line card.

Bridge 220 provides packets to Ingress Packet Processor 230 as a combination of interleaved heads and tails, wherein packet heads are given priority over tails. Ingress Packet Processor 230 can then perform separate operations, if any, on the packet beads and tails. In one embodiment of the present invention, packet tails receive no processing in the Ingress Packet Processor.

B. Packet Processor Details

1. Packet Processor Overview

Ingress Packet Processor 230 performs analysis on incoming headers and supports edge features such as classification and Netflow statistics based upon information in the headers. Ingress Packet Processor 230 provides this functionality at a high data rate (10 Gb/s) by utilizing a parallel pipeline architecture to perform the analysis on multiple packet headers simultaneously. Ingress Packet Processor 230 can be configured to perform such analysis on protocols such as Internet Protocol version 4 (IPv4), Internet Protocol version 6 (IPv6) and MPLS packets.

Figure 4A:
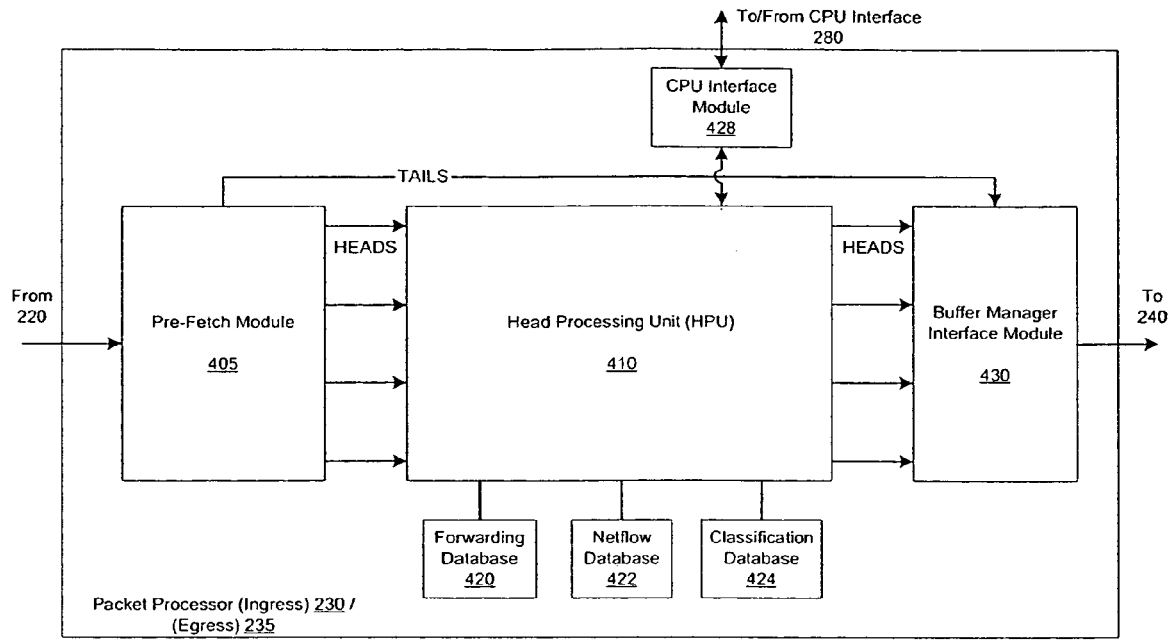
FIG. 4A is a simplified block diagram illustrating modules within a line card packet processor in accord with one embodiment of the present invention.

FIG. 4A is a simplified block diagram of modules within Ingress Packet Processor 230 according to one embodiment of the present invention. Packets enter Ingress Packet Processor 230 from bridge 220. Pre-Fetch module 405 receives the heads and tails of the packets transferred from bridge 220. Pre-Fetch module 405 is configured to forward packet heads to head processing unit (HPU) 410 and packet tails directly to buffer manager interface module 430.

The core of Ingress Packet Processor 230 is HPU 410, which, in this aspect of the present invention, contains four processing pipes that work in parallel while keeping packet order. The HPU is coupled to a forwarding database 420, Netflow database 422, and classification database 424. Forwarding database 420 can include a content addressable memory (e.g., TCAM and DRAM) to store a forwarding information base (FIB). In one embodiment of the present invention, the FIB can include up to one million entries of 72 bits each. Netflow database 422 can also include a content addressable memory or SRAM to store various netflow information similarly, classification database 424 can include a content addressable memory configured to store various classification data. Netflow and classification data and analyses will be discussed more fully below in descriptions of processing stages relevant to those categories of data.

Once HPU 410 has completed analysis of the packet heads, the packet heads are forwarded in parallel to buffer manager interface module 430. Buffer manager interface module 430 is responsible for forwarding packet heads and tails to Ingress Traffic Management module 240. HPU 410 is also coupled to CPU interface module 428, which enables processor 284 to access all the data in Ingress Packet Processor 230, internal and external memories, and registers via CPU interface 280.

Figure 4B:
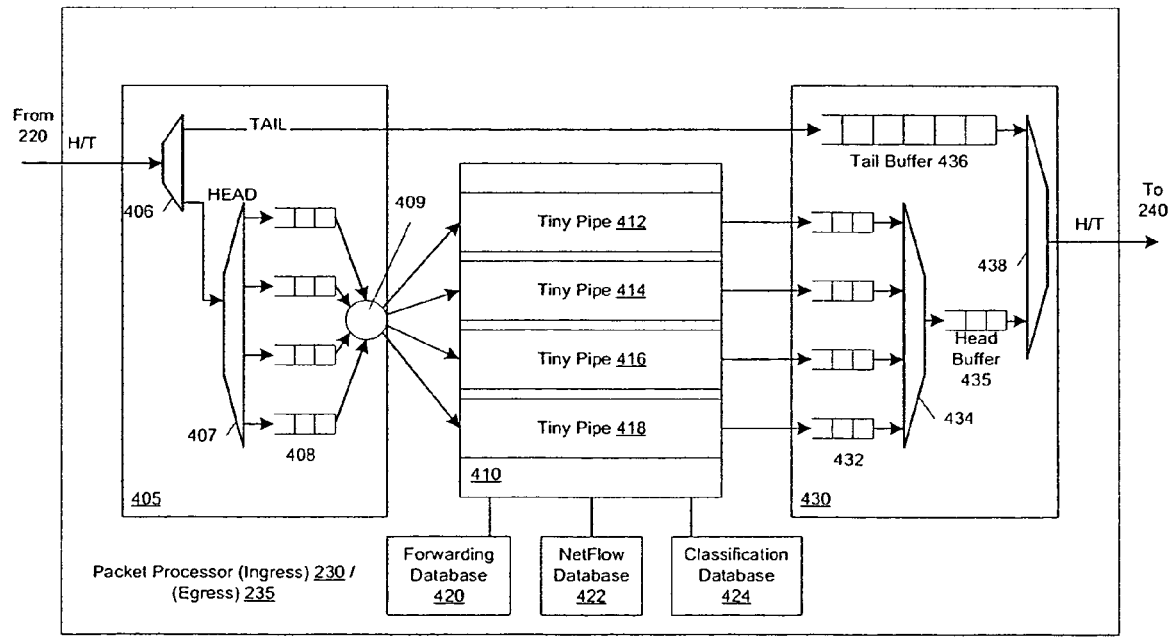
FIG. 4B is a simplified block diagram illustrating data paths that incoming packet headers and tails can take through the line card packet processor in accord with one embodiment of the present invention.

FIG. 4B is a simplified block diagram illustrating paths that incoming headers and tails can take through Ingress Packet Processor 230. Incoming heads and tails enter Pre-Fetch module 405 from bridge 220. State machine 406 forwards packet tails to tail buffer 436 in buffer manager interface module 430 and headers to one of four internal head buffers 408 via a head distribution mechanism 407. Pre-Fetch head buffers 408 can function as elastic buffers to prevent data loss that can result from the handshake between Ingress Packet Processor 230 and bridge 200, and further enable several datastreams to pass in parallel to HPU 410s processing pipes. State machine 406 can also include information with associated packet heads and tails that permits re-associating the heads and tails at a later point in the data path. Such information can include time stamp information such as clock time, sequence number, or other unique sequence identifier.

In one embodiment of the present invention, head distribution mechanism 407 can distribute headers to head buffers 408 in a cyclic manner. In an alternate embodiment, distribution of headers to the head buffers (and from there to HPU tiny pipes 412, 414, 416, and 418) can be performed in a configured manner that allows for packet headers to be sent to designated tiny pipes based on packet information (e.g., priority for selected classes of packets, packet type, selecting head buffers based on fullness of a head buffer, and the like).

Each head buffer 408 can provide packet headers to any HPU tiny pipe. Packet header distribution from the head buffers to the tiny pipes is performed by buffer distributor

409. In one embodiment of the present invention, buffer distributor 409 includes a plurality of multiplexers equaling the number of tiny pipes which are connected to all of the head buffers. In such an embodiment, a multiplexer control logic controls the crossing of a header from a head buffer to a tiny pipe. Choice of destination tiny pipe for a given head buffer can be made for reasons including: a head buffer is empty at the time of transfer, a tiny pipe is recycling a header (to be discussed in greater detail below) and therefore cannot receive a new packet header in that cycle, and in response to a backpressure signal from Buffer Manager Interface module 430.

The head distribution mechanism can also provide additional information to a head buffer with a header that indicates whether the word being transferred to the head buffer is the last word of the head. In another embodiment of the present invention, the full status of the head buffers can be tracked, and if a threshold number of the head buffers is full, a backpressure signal can be sent to the previous stage (bridge module 220 on the receive data path and switch fabric interface 250 on the transmit data path).

As discussed above, HPU 410 is coupled to forwarding database 420, Netflow database 422, and classification database 424.

Figure 5:
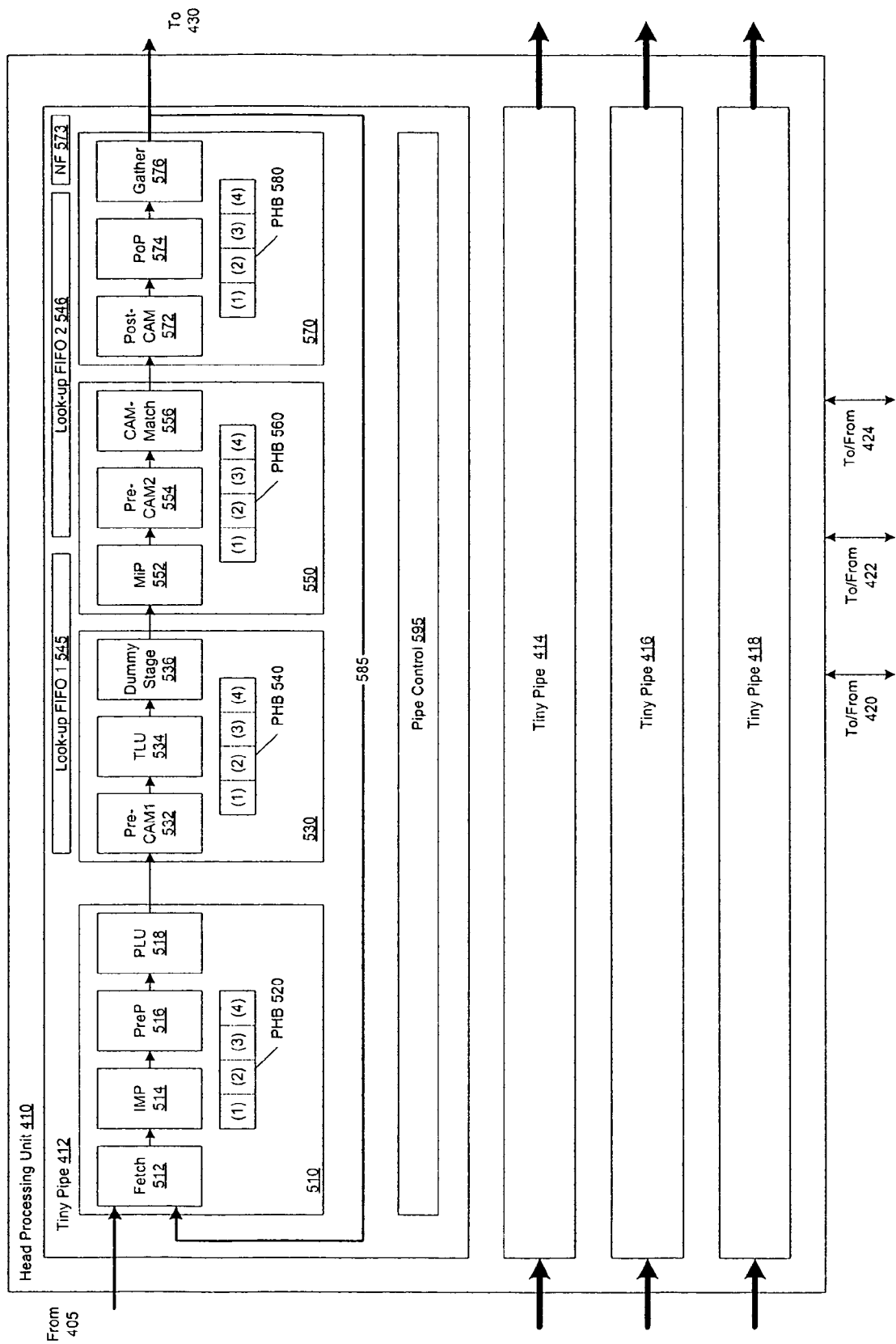
FIG. 5 is a simplified block diagram illustrating processing stages of a pipeline included in a line card packet processor head processing unit in accord with one embodiment of the present invention.

FIG. 5 is a simplified block diagram illustrating the processing stages of a tiny pipe (e.g., 412) included in head processing unit 410. In the illustrated embodiment, the head processing unit has four pipelines, each with 13 stages including a dummy stage. In addition, there are packet header buffers (PHB) 520, 540, 560 and 580. Each incoming packet head is associated with a PHB that contains the packet head as well as other switching information. That information is written into the PHB by the different stages of the tiny pipe, and at any given time each stage in the tiny pipe operates on a different PHB. In addition to the PHBs, stages of tiny pipes can include a packet associated information register (PAIR) that can be associated with each packet and is used to transfer control information among the stages of the tiny pipe. As each stage completes its operation on a packet, the stage can send an end signal to pipe control block 595. Pipe control block 595 provides a synchronous control on starting the next stage of the pipe.

Each tiny pipe 412, 414, 416, and 418 includes the stages summarized below. These stages, executed in sequence on a given packet, form the heart of the receive (and transmit) data path. An additional dummy stage 536 is included in stage block 530. This dummy stage permits data from an associated PHB 540 to be written to a new PHB 560 associated with stage block 550 since there is only sufficient bandwidth to/from the PHB memory to allow a single operation at a time. This is similar to PHB writing from a PHB 520 to a PHB 540, which occurs during PLU 518 which does not touch data in the PHB and therefore that data is available for copying. Similarly, CAM-Match 556 does not touch data in an associated PHB 560 and therefore data in the associated PHB can be passed to PHB 580.

Fetch Stage (512): Provides physical transmission of the header into the tiny pipe. As the head arrives, various packet checks and classifications are performed, including MAC header checking, protocol ID checking, IP header checking, and extraction of such things as IP/MPLS address fields and Layer 4 fields and flags. The Fetch stage is configured to analyze IPv6 and IPv4 headers. The results of these checks are made available to the subsequent tiny pipe stages.

Initial Microprocessor (IMP) and Pre-Processor (PreP) Stages (514, 516): These microcoded stages are capable of any general purpose activity on a packet head. Typical duties for these stages include processing packet sanity checks performed by the Fetch stage, classifying protocol type, unicast/multicast identification, setting up any per-interface or sub-interface processing required for the packet, and exception handling (e.g, TTL expiry, and IP checksum errors). IMP and PreP set up actions to be taken by subsequent stages. The IMP and PreP microsequencers can be configured to function cooperatively to flexibly handle long threads, such as those encountered in IPv6, wherein a thread is a sequence of instructions that the microsequencer performs.

Pointer Lookup (PLU) Stage (518): This is a TCAM-based lookup engine. The IMP/PreP stages can select words that can be used for destination and source lookups by the PLU stage. One lookup word can be based on the packet destination address and the second on the packet source address. A lookup word can also be an MPLS label or other type of tunnel identifier (e.g., L2TP). The results of these lookups are used by TLU stage 534. In some cases, the TCAM lookup can be bypassed and a direct table lookup in the TLU used instead (e.g., MPLS).

Pre-Content Addressable Memory (Pre-CAM1) Stage (532): This stage accesses a TCAM based on a profile selected by the IMP/PreP stages. The results of these lookups are stored in a packet header buffer (PHB) or the PAIR. The results of the lookup can change the address from which the table lookup stage (TLU) continues its work. Pre-CAM1 can also perform a lookup that provides a key for a Pre-CAM2 lookup; thereby compressing a large lookup into a plurality of smaller lookups.

Table Lookup (TLU) Stage (534): The TLU stage begins with a final pointer from the PLU stage or a Pre-CAM1 modified pointer and traverses the corresponding data structure in the TLU memory. Ultimately, this results in various data entries being fetched into the PHB and various statistics being counted (e.g., per adjacency packets/bytes).

Mid-Processor Microsequencer (MiP) Stage (552): MiP is another microcoded stage, using a microsequencer identical to that of the IMP and PreP stages and which is capable of performing any general purpose activity on the head. It is typical for MiP to perform tasks such as selecting an appropriate profile for the subsequent CAM stages, and thus which exact features are to be executed on the head (e.g., ACLs, CAR, and Netflow).

Pre-Content Addressable Memory (Pre-CAM2) Stage 2 (554): This stage is configured to perform additional TCAM accesses based on profiles selected by the MiP stage, similar to those lookups performed in Pre-CAM1. Pre-CAM2 is responsible for building all of the CAM lookup words for each head. The Pre-CAM2 stage builds the TCAM lookup words according to a profile that was selected by the MiP stage.

Content Addressable Memory Match (CAM-Match) Stage (556): The CAM-Match stage sends to the classification TCAM all the words prepared by the Pre-CAM1 and Pre-CAM2 stages (with the exception of netflow words) and receives the results for each lookup, which can be pointers and actions for any TCAM matches or an indication of a TCAM miss. For a CAR lookup, CAM-Match can send a key repeatedly while advancing a CAR counter, in order to perform multiple searches on differing rules for a packet.

Post-CAM Stage (572): The Post-CAM stage is the last of the content addressable memory processor stages, which also include Pre-CAM1, Pre-CAM2, and CAM-Match. The Post-CAM stage calculates and updates all statistics and buckets that are located in the pointers received by the CAM-Match stage. Together, the content addressable memory processor stages perform the bulk of the "edge" features of Ingress Packet Processor 230, including Ex-ACL (extended access list), and CAR (committed access rate).

Post-Processing Microsequencer (PoP) Stare (574): The PoP stage is another microcoded stage, identical to IMP, PreP, and MiP, which is capable of performing general purpose activities on a packet head. PoP typically performs tasks such as handling exceptions detected by previous stages, processing CAR rules that were not processed in the CAM processor stages, and programming the subsequent gather stage for final manipulation of the head as it exits the tiny pipe.

Gather Stage (576): The gather stage collects together data elements brought into the PHBs and formats those data elements into a correct packet head structure. Gather performs tasks including stripping old input encapsulation, adding a new BHDR, stripping old MPLS labels, pushing new MPLS labels, and computation of a new IP checksum. The gather stage can also provide a packet recycle path to the Fetch stage, which will be more fully completely discussed with regard to the transmit data path.

Further details of each stage in the tiny pipes are discussed below.

Advancing a packet head to a subsequent stage includes shifting ownership of a PHB memory location associated with the packet head from the current stage to the subsequent stage. All stages can start operations simultaneously when the pipe control asserts a start signal. Pipe control 595 waits until all stages finish their operations and assert a ready signal before issuing another start. In order to minimize the number of stages simultaneously accessing the PHB, tiny pipe 412 is logically divided into four blocks (510, 530, 550 and 570), each having an associated PHB memory that is logically partitioned for sections of the memory to be visible to each stage in a block. PHB partitions 520(1-4) are associated with the first set of stages: Fetch (512), IMP (514), PreP (516), and PLU (518). PHB partitions 540(1-4) are associated with the next two stages: Pre-CAM1 (532) and TLU (534). PHB partitions 560(1-4) are associated with the next three stages: MiP (552), Pre-CAM2 (554) and CAM-Match (556). PHB partitions 580(1-4) are associated with the last set of stages: Post-CAM (572), PoP (574), and Gather (576). Physical memory locations associated with the PHBs can be located in proximity to the physical locations of the circuitry for the block stages in order to decrease access time. In such an arrangement, a head in a PHB can reside in a first PHB partition for the first block of stages, and then be transferred to a second PHB for the second block of stages, and so on.

When a head enters Fetch stage 512, either from Pre-Fetch module 405 or from recycle path 585, the Fetch stage writes the head into an available PHB partition 520(1-4). When Fetch stage 512 completes this action, it passes control of the PHB partition to IMP stage 514 (e.g., by passing a pointer to the PHB partition). Passing of control over the PHB partition continues from the IMP stage to PreP stage 516, and then subsequently to PLU stage 518. The PLU stage performs a FIB lookup according to other registers and does not access the PHB, so the PHB contents can be copied to an available PHB partition in the next logical block 530 (PHB 540). This process of passing control over the PHB and then writing the contents of the PHB to an available PHB in the next logical block continues through the tiny pipe processing.

With four parallel tiny pipes and 13 stages per tiny pipe (the 12 stages discussed above plus one dummy stage), HPU 410 can process up to 52 heads simultaneously. Once processing of a head is complete in one of tiny pipes 412, 414, 416 or 418, the head passes from HPU 410 to a corresponding input buffer 432 in buffer manager interface module 430. Heads are then transferred in the order they are received to head buffer 435, which, in one embodiment of the present invention, can hold up to 128 heads. Head buffer 435 can store younger heads from the HPU, while waiting for older head processing to conclude as a result of head recycle, which will be more fully discussed below with regard to the transmit data path. State machine 438 sends interleaved heads and tails from Ingress Packet Processor 230 to Ingress Traffic Management Module 240.

2. Head Processing Unit Details a. Fetch Stage

Fetch stage 512 accepts headers from either Pre-Fetch module 405 or recycle path 585 from Gather stage 576, and writes the header to a PHB. Along with the header, Fetch stage 512 can receive packet length and channel number information from bridge 220 via Pre-Fetch module 405. These values are typically stored in the PAIR along with other information extracted from the header. Fetch stage 512 can also receive a flag bit indicating whether the header has a corresponding tail.

Figure 6:
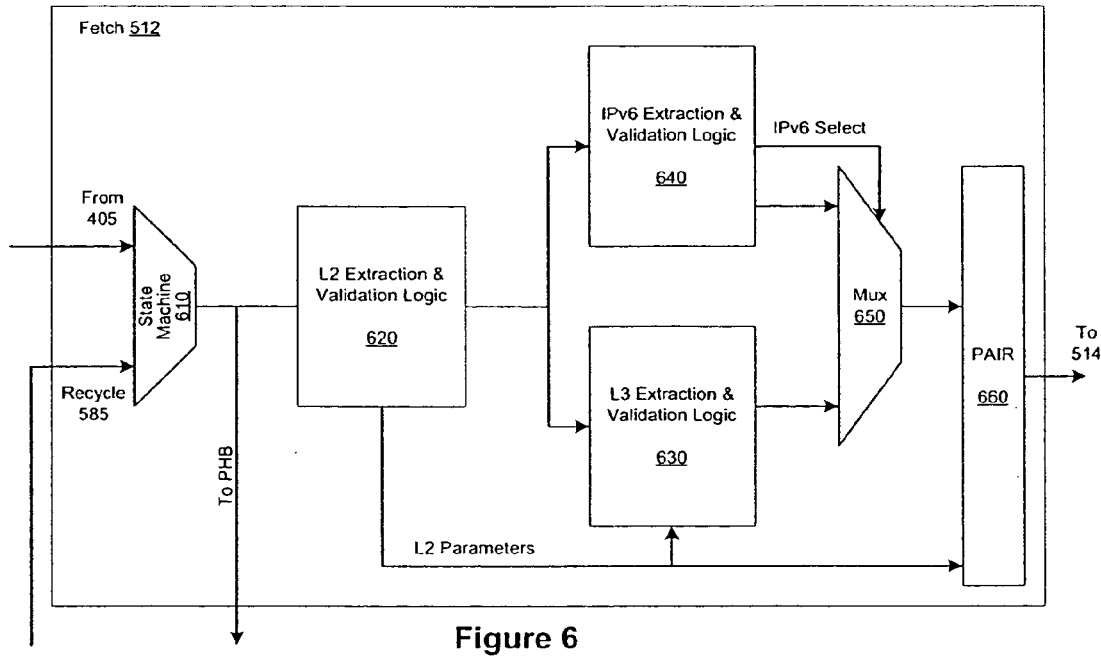
FIG. 6 is a simplified block diagram illustrating a data path in a head processing unit pipeline Fetch stage in accord with one embodiment of the present invention.

FIG. 6 is a simplified block diagram illustrating data flow through one embodiment of Fetch stage 512. Fetch stage 512 processes headers from one of two sources: new headers from Pre-Fetch module 405 or recycle path 585. The recycle path typically has priority over the new header path since a recycled header can stall the subsequent headers in the tiny pipe until it passes through again. A packet header may be recycled in order to perform more processing than possible in one pass as with, for example, a tunneled packet (e.g., IPinIP). In the egress path, the decision to recycle a header is typically made by PoP stage 574, and can be made in response to a packet being identified as a multicast packet. When PoP 574 decides to send the contents of a PHB back through the pipeline, PoP stage 574 initiates a recycle request. When a recycle indication is given, the data from Gather stage 576 is selected, according to a recycle interface and driven into Fetch stage 512. Fetch state machine 610 is used to select the appropriate data source. From fetch state machine 610, the data passes to L2 extraction and validation logic 620 and a selected one of PHB 520.

L2 Extraction & Validation Logic 620 receives the header (either new or recycled) and checks the header's protocol identification field (PID) and its media access control field (MAC). According to the values of those fields, L2 Extraction & Validation Logic 620 extracts encapsulation size, type of L3 packet (e.g., IP or MPLS), a thread for use by IMP/PreP stages 514 and 516, and whether L3 checks and information extraction should be performed.

The L2 Extraction & Validation Logic compares the MAC field of the header to a pre-programmed MAC value for the channel on which the packet arrived. The header can be forwarded to L3 Extraction & Validation Logic 630 and IPv6 Extraction & Validation Logic 640, if the MAC comparison succeeds. L2 Extraction & Validation Logic 620 performs protocol identification by comparing the PID in the header to a set of several pre-programmed values for each PID register and sets an indication to IMP/PreP stages 514 and 516 of a protocol type (IP/MPLS) of the incoming packet. In one embodiment of the present invention, there are 64 PID registers. These registers can include, beside the PID value, fields including heading parameters for IP/MPLS, no L3 checks, no L3 extractions, and Info (a thread used by the IMP/PreP stages). The PID registers can also be programmed for specific cases including, but not limited to: IP unicast over PPP; IP multicast over PPP; IP unicast over FR; IP multicast over FR; MPLS unicast over PPP; MPLS multicast over PPP; IP unicast over HDLC; IP multicast over HDLC; MPLS unicast over HDLC; MPLS multicast over HDLC; MPLS unicast over FR; and, MPLS multicast over FR. Fetch stage 512 provides the protocol type to IMP/PreP stages 514 and 516 by setting appropriate bits in PAIR 590 and thread selection based on PID.

The header is forwarded with encapsulation size and parameters extracted by L2 Extraction & Validation Logic 620 to both L3 Extraction & Validation Logic 630 and IPv6 Extraction & Validation Logic 640. The L3 extraction logic extracts the relevant L3 information and saves it in PAIR 660 (e.g., IPv4 source and destination addresses, IP TOS field, protocol field, and IP length, MPLS labels, start address of L3 data in the PHB, and L4 parameters [e.g. TCP source and destination port numbers and other TCP flags]), and performs validity checks on the L3 fields. The parameters and check results are passed on to other pipeline stages through PAIR 660. For IPv4 packets, some of the tests that can be performed by logic 630 include: a runt packet test verifying that there is sufficient size in the packet to hold an IPv4 header; an IPv4 "no options" test; an IPv4 header checksum test; and, time to live (TTL) tests. For MPLS packets, tests that can be performed by logic 630 include: TTL tests; S-bit test; null label test; null stack test; IP inside test (indicating and IPv4 header inside); IP "no options" test; run IP inside test; and, IPv4 header checksum inside test.

IPv6 Extraction & Validation Logic 640 also receives headers from L2 Extraction & Validation Logic 620. IPv6 Extraction & Validation Logic 640 parses and validates IPv6 information found in the header. The primary validation actions performed by IPv6 Extraction & Validation Logic 640 include: determining whether the version field in the header corresponds to IPv6, determining whether the hop count field is greater than one, validating the length field, determining that the destination address is not all zeros or a loopback address, and determining that the source address is not a loopback or multicast address. Failure of any of these checks can result in an exception. IPv6 extraction logic 640 can provide a control signal to mux 650, if the header is an IPv6 header so that PAIR 660 will be updated with results from IPv6 extraction logic 640 rather than results from logic 630 (e.g., IPv4). Information provided to PAIR 660 by IPv6 extraction logic 640 can include: IPv6 source and destination addresses; IPv6 traffic class, next header and IP length; TCP source and destination port numbers; and, TCP header flags and a logical OR between TCP RST and TCP ACK bits. Those having ordinary skill in the art will readily recognize that logic 620, logic 630, and logic 640 can perform a variety of different tests and parameter extractions beyond those examples listed herein (for example, this block contains logic that can perform IPv6 extension header parsing and bypassing to get Layer 4 information located in the header).

b. IMP/PreP Stages

The next stages in the HPU are initial microprocessor (IMP) and pre-processor (PreP) stages 514 and 516. In one embodiment of the present invention, IMP 514, PreP 516, MiP 552, and PoP 574 are four separate instantiations of the same microsequencer logic. The microsequencer logic serves as a programmable general purpose machine for header processing. The basic architecture of the microsequencer is a three-stage pipelined-execution flow. The stages are: instruction fetch and decode, operand fetch and branch evaluation, and instruction execution. For most operations, the presence of the pipeline is transparent but the results of any arithmetic operation (including the result flags) are not available for the instruction immediately following the instruction that set them.

Figure 7:
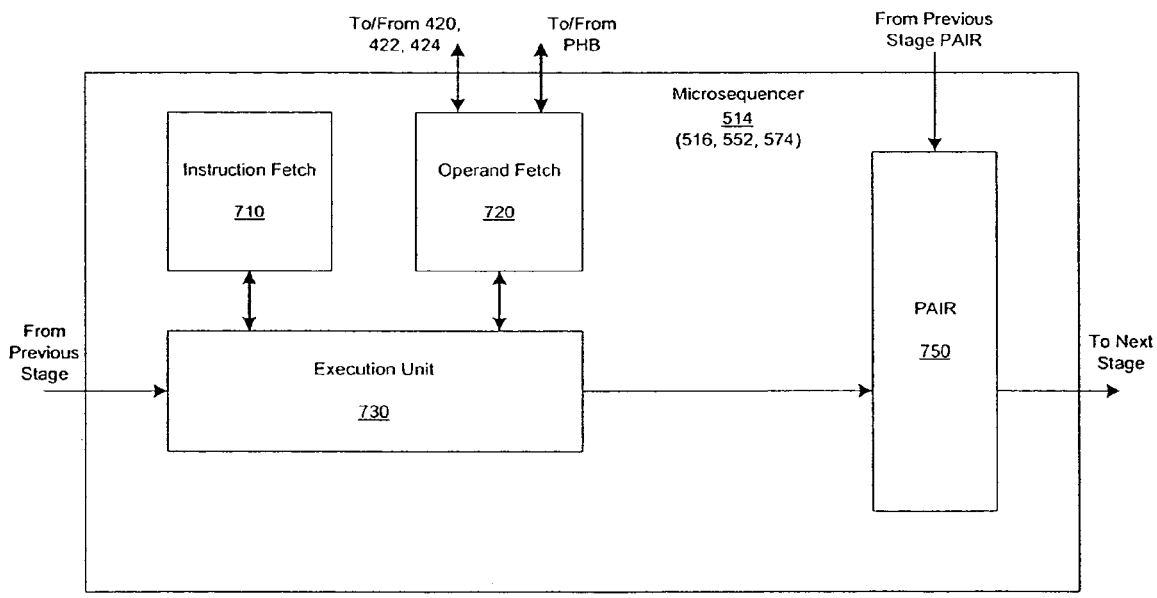
FIG. 7 is a simplified block diagram illustrating a configuration of head processing unit pipeline microsequencer stages in accord with one embodiment of the present invention.

FIG. 7 is a simplified block diagram illustrating the configuration of microsequencers 514, 516, 552, and 574 in accord with one embodiment of the present invention. Instruction Fetch stage 710 reads program instructions from an instruction memory (not shown), decodes the operation to be performed and generates corresponding control signals, while keeping track of a program counter. A typical microsequencer instruction set can include jumps (relative and absolute addressing, conditional and unconditional), arithmetic logic unit (ALU) operations to an accumulator, transfers, and load/stores. The instruction set supports the functions of logic within execution unit 730, including barrel shifting, find-first-one logic, nibble masking, standard ALU operations (add, subtract, AND, OR, XOR, NOT, AND NOT, shift, and compare), and multiplying. Operand Fetch stage 720 includes logic for reading and storing data from various memories external to the microsequencer, including PLU memory, PHBs, and all external memories (e.g., forwarding database 420, Netflow database 422, and classification database 424), as well as internal register memory and operand registers. Execution unit 730 performs arithmetic and logic operations based on instructions from instruction Fetch stage 710 and data (operands) from operand Fetch stage 720. Results from instruction execution are stored in PAIR 750 or can also be stored in other memories such as PHB, all external memories, PLU memory, or TLU memory.

In one embodiment of the present invention, IMP 514 and PreP 516 are primarily responsible for analysis of the header. IMP and PreP read the header from the PHB and perform analysis according to the packet type. The analysis can include completing the packet classification, preparing address fields that need to be looked up by following stages, and performing various checks and statistics accumulation on the packet. Specific IMP/PreP tasks include, but are not limited to:

If a Don't Work Hard (DWH) bit is set, then continue processing the packet only if it is an "important" packet (e.g., by checking an IP TOS field of the packet header);

Reading a sub-interface specific configuration from memory and analyzing any features that are enabled;

Checking packet type (e.g., detecting L3 protocol [IPv4, IPv6, MPLS, etc.]);

Checking TTL expired flag previously set by Fetch stage (from PAIR);

Checking IP header checksum error indication from Fetch stage 512 (skip on error);

Setting PLU configuration registers appropriately for the packet type and configured features;

Setting TLU configuration registers appropriately for the packet type and configured features;

Determining and processing Layer 2 packet length;

Setting the Pre-CAM1 profile select registers appropriately for the packet type and configured features;

If the packet is a multicast packet, calculating a hash entry for reverse path forwarding (RPF) checking based on source address and writing the hash entry into PAIR 750;

For unicast packets, prepare to perform an RPF check (reverse path forwarding check);

If the packet is an IPv6 packet, extracting any needed L4 information from the header; and Providing other services, such as support for rate limiting and load balancing, as well as identifying dummy multicast packets (to be explained more fully below).

When the IMP/PreP stages identify an exception case in which HPU 410 chooses not to forward the packet (e.g., TTL expired, checksum error, or IP option), the IMP/PreP stages can set skip bits in the packet control register within PAIR 750. Such skip bits indicate to the subsequent stages to skip operations. The packet header is eventually passed to PoP 574, which decides how to process the packet based on the exception type.

Once the IMP and PreP microsequencers have completed their operations upon the packet header, control over the PHB passes to pointer lookup stage 518.

c. Pointer Lookup (PLU)

Pointer lookup (PLU) stage 518 implements the first stage of the search engine in HPU 410. IMP and PreP stages (514 and 516) can provide two lookup words to PLU 518, or PreP stage 516 can provide a special lookup type and definition through use of software. Lookup words are built from fields in the header that are extracted by Fetch stage 512. Fetch stage 512 can also set a default lookup type according to a packet's type (e.g., IPv4 and IPv6), which can then be optionally overwritten by the IMP/PreP stages.

Figure 8:
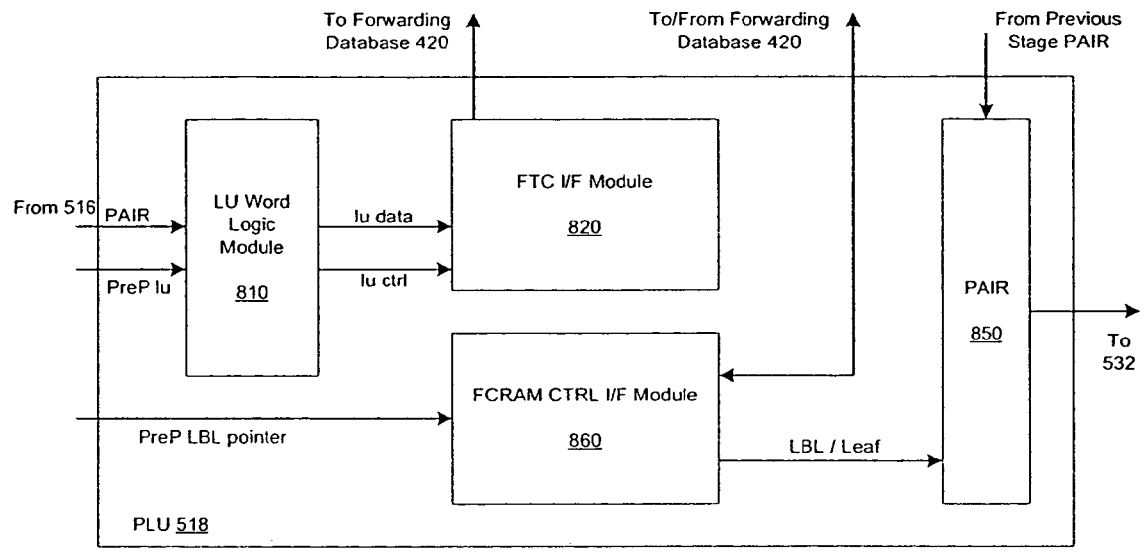
FIG. 8 is a simplified block diagram illustrating a head processing unit pipeline pointer lookup (PLU) stage in accord with one embodiment of the present invention.

FIG. 8 is a simplified block diagram illustrating modules found in PLU stage 518 according to one embodiment of the present invention. PLU 518 and TLU 534 are used to extract information from a forwarding information base (FIB). The FIB is a database used to store routing information needed by the line card to forward packets. For example, when a FIB is a tree-based data structure, there are two basic components: pointers (also known as nodes) that are used to navigate to the selected end point, and leaves that are the information found at the end point.

LU Word Logic module 810 receives data words from PreP stage PAIR 750, which can include select information from the IMP/PreP stages. A select register within the PAIR is written during the PreP stage. LU Word Logic module 810 can also perform a special lookup built by the PreP stage. In one embodiment of the present invention, there are eight 72 bit data registers and two 10 bit command registers within Lookup Word Logic module 810. LU Word Logic module 810 can build lookup words for most of the known lookup types (e.g., IPv4 and IPv6). Such lookup words must mirror exactly those found within a ternary content addressable memory (TCAM) module discussed below. As discussed above, MPLS can directly use a TLU lookup and thereby bypass this stage.

LU Word Logic module 810 forwards the lookup words, along with lookup size, enable bits and control words related to lookups to be performed by an FTC controller to a Forwarding TCAM Controller Interface module 820 (FTC I/F). FTC I/F 820 provides the lookup data and control information to Forwarding Database 420. In one embodiment of the present invention, Forwarding Database 420 is accessible to the IMP, PreP, MiP, PLU, and Pre-CAM1 stages. The Forwarding Database provides data of interest, such as leaf data, to FCRAM controller interface module 860. FCRAM controller interface 860 then supplies leaf data to a register in PAIR 850.

A second function PLU 518 can perform is a lookup to assist with load balancing. A load balance process starts with PreP 516 loading an appropriate key into a hash generator logic. Typically, this data involves IP source/destination addresses. The hash result is a 16 bit value. That value, an LBL pointer, is supplied to FCRAM controller interface module 860, which can supply the LBL pointer to Forwarding Database 420, forming a simple lookup the result of which can also be passed to a register in PAIR 850 to reduce the amount of logic and complexity required in the later Table Lookup stage 534.

d. Pre-CAM1

Figure 9:
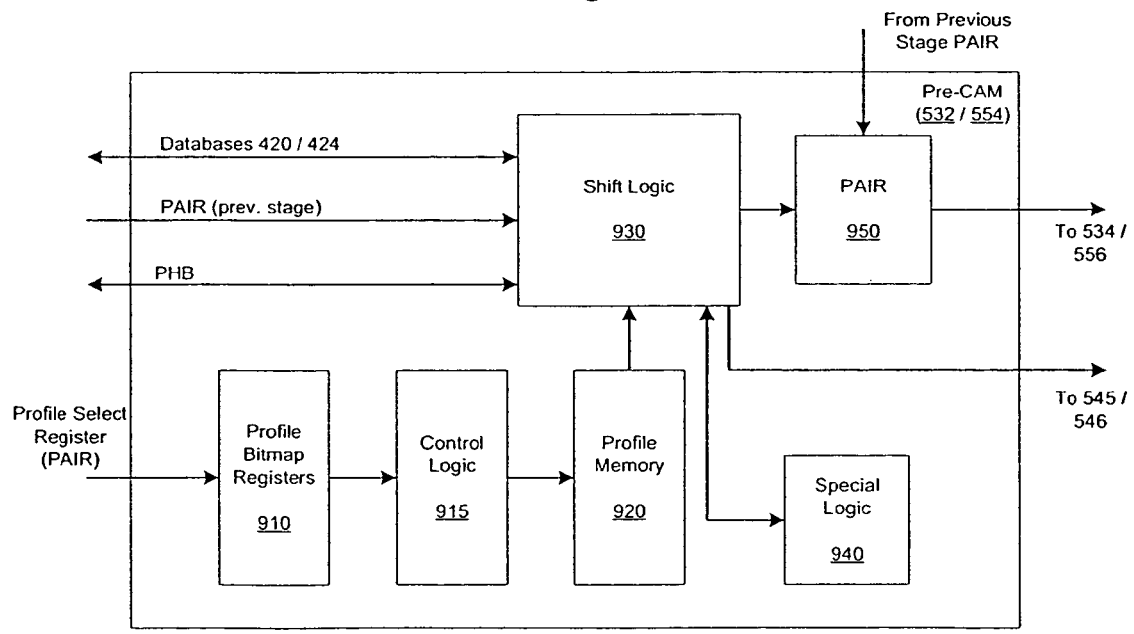
FIG. 9 is a simplified block diagram illustrating a head processing unit pipeline content addressable memory preparation (Pre-CAM) stage in accord with one embodiment of the present invention.

FIG. 9 is a simplified block diagram illustrating the next stage in HPU 410, Pre-CAM1 532, according to one embodiment of the present invention. Pre-CAM1 and Pre-CAM2 554 are substantially identical stages and will be discussed together here. Pre-CAM1 and Pre-CAM2 are state machines preconfigured with a series of different profiles. Each profile describes a set of data fields taken from various places in the PHB or other data registers associated with a packet (e.g., results of the PreP or PLU (Pre-CAM1) or results of the TLU or MiP (Pre-CAM2)). Each profile entry represents needed fields concatenated together and issued to Forwarding Database 420 for Pre-CAM1 or Classification Database 424 for Pre-CAM2 for processing a certain feature (e.g., Ex-ACL, CAR, policy-based routing (PBR), or Netflow statistics). In one embodiment of the present invention, the Pre-CAM stages can be programmed with as many as 128 different profiles. Typically, the profiles are programmed by software at configuration time, but the selection of those profile entries to run for each given packet header is a run-time decision made by PreP 516 (Pre-CAM1) or MiP 552 (Pre-CAM2). This decision is typically made based on the interface/sub-interface on which a packet was received, or the protocol a packet uses (e.g., IPv4, IPv6, or MPLS). The Pre-CAM stages issue appropriate lookup requests for the current packet header to the Forwarding (Pre-CAM1) or Classification (Pre-CAM2) databases. In some cases, data returned from the databases can be used to overwrite information such as the leaf pointer (determined by PLU 518) for use by TLU stage 534. Returned data can also be used in a subsequent database lookup (e.g., for compressing a MAC address). Other data returned during a database lookup operation performed by a Pre-CAM stage can be stored in a Lookup FIFO (e.g., Lookup FIFO 1 (545) for Pre-CAM1 and Lookup FIFO 2 (546) for Pre-CAM2, respectively) for later processing by a microsequencer or by the CAM-Match or Post-CAM stages. Such a scheme provides an ability to implement features such as policy-based routing, where a result of the database lookup (e.g., an IP destination address and TOS field) will replace the result achieved from the PLU stage. Another application of the Pre-CAM stages is compression of an incoming MAC or IPv6 address to make it possible to implement statistics or other features on the full data field further down the pipeline without using a large CAM width.

An indication of the selected profile is stored in a profile select register set by PreP (Pre-CAM1) or MiP (Pre-CAM2) and stored in a PAIR. Each profile represents a set of commands, and multiple profiles are stored in Profile Bit Map registers 910. Commands that form a given profile are stored in Profile Memory 920. Each bit in the profile bitmap corresponds to a command in the profile memory. When set to one, the corresponding command is included in the set of commands for the present header, and when set to a zero, the corresponding command is not included. At the beginning of every pipeline cycle, the Pre-CAM stages select a profile according to a value residing in the profile select registers. The selected profile is processed by traversing its bitmap. Each of the memory values of Profile Bitmap 910 can define any set of entries from Profile Memory 920, but this can dictate a sequence of execution that is not necessarily ordered. Commands determined by successive values in the profile are executed in the designated sequence. Control logic 915 serves as the profile command decoder. Control logic 915 translates the coded command fields into control signals to all units.

Shift logic 930 coordinates providing proper data from various sources (e.g., prior stage PAIR, Forwarding Database 420, Classification Database 424, the current PHB, and Profile Memory 920) to various destinations (e.g, PAIR 950, Lookup FIFO 1 545, and Lookup FIFO 2 546). Special Logic 940 provides additional logic not provided by the CAM-Match stage. For example, the CAM-Match function inherently provides equal, not-equal and logic AND operators. The first two operators are the match/no-match results, while the last is a match on several values concatenated together. This may be enough for basic routing requirements, but for ACL, CAR, and Netflow a stronger set of operators is desirable. Functions like greater-than, less-than, range (i.e. Value 1<X<Value 2), and not-equal-to are particularly useful for qualifying specific fields of an entry. The desired functions can be implemented using the CAM but can cost many entries. Instead, the Special Logic saves these entries by providing a limited set of entries with an enhanced set of functions. In one embodiment, Special Logic 940 includes a number of logic units, each having a primitive ALU, three operand registers and dual result flags. The ALU executes the functions selected by the operator on two or three inputs and then gives the result in flag bits, which are available, for example, as CAM lookup bits to the Shift logic. Those having ordinary skill in the art will readily recognize that both a number of different logic functions can be implemented in this manner and each logic function can be implemented using a variety of digital logic techniques.

Lookup FIFOs 545 and 546 are memories than can store lookup keys generated by shift logic 930 for later use by a lookup module either in the TLU (Pre-CAM1) or the CAM-Match (Pre-CAM2). In general, the Lookup FIFOs move through the pipeline so that their contents can be used by the CAM control module in conjunction with subsequent stages. This scheme provides load balancing of, for example, generation of lookup entries between the two Pre-CAM stages, allowing Pre-CAM1 532 to perform work that is later completed by Pre-CAM2 554. In one embodiment of the present invention, Pre-CAM1 and Pre-CAM2 do not share the same Lookup FIFO. In one embodiment of the present invention, Pre-CAM1 shares a Lookup FIFO with the TLU and MiP stages (e.g., Lookup FIFO 1 545), while Pre-CAM2 shares a Lookup FIFO with the CAM-Match, Post-CAM, PoP and other stages (e.g., Lookup FIFO 2 546).

e. Table Lookup (TLU)

Figure 10:
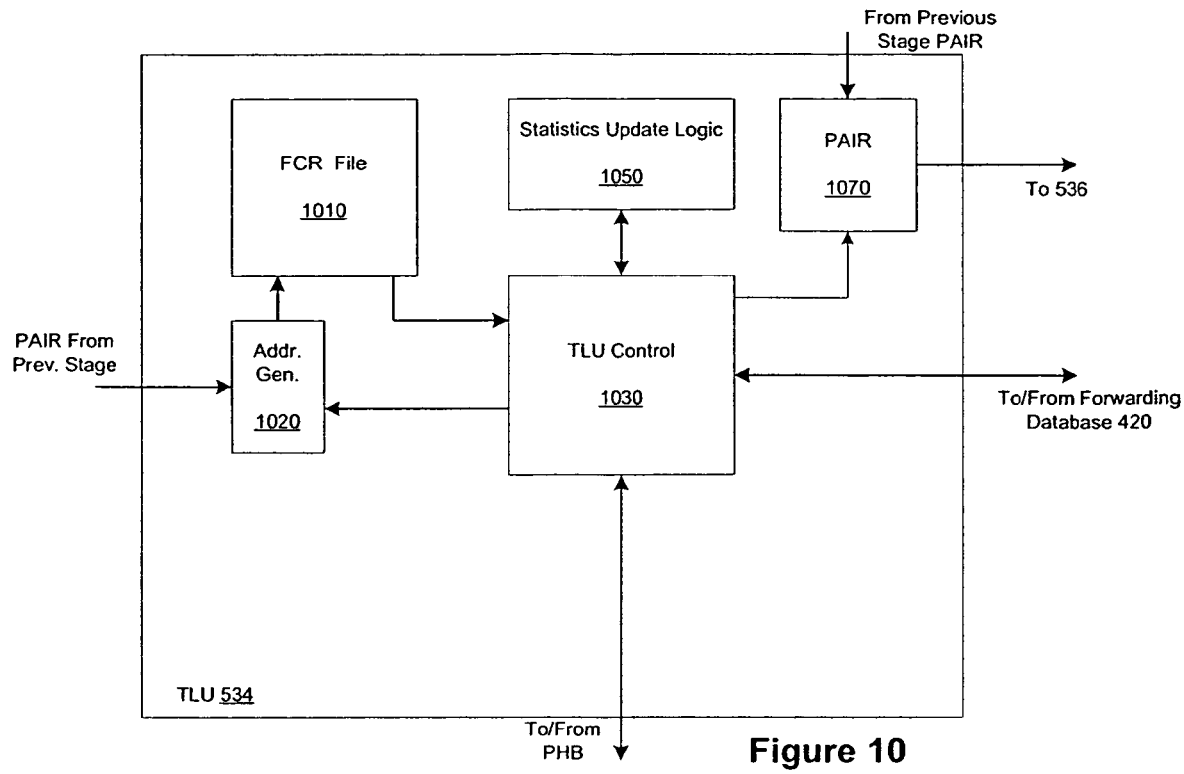
FIG. 10 is a simplified block diagram illustrating a head processing unit pipeline table lookup (TLU) stage in accord with one embodiment of the present invention.

FIG. 10 is a simplified block diagram illustrating modules within the Table Lookup (TLU) stage 534 of HPU 410, according to one embodiment of the present invention. Based on a leaf pointer or pointers provided by PLU stage 518, or an override value from Pre-CAM1 stage 532, TLU stage 534 performs lookups of table entries in a data structure stored in a TLU memory. In general, TLU stage 534 navigates a linked-list of data structures and stores some or all of the fetched data in the PHB associated with the current packet header.

A leaf pointer provided by PLU 518 (or Pre-CAM1 532) can be used to locate the first data structured to be fetched by TLU Control module 1030. A pointer to the next data structure can be embedded in the first fetched data structure. TLU Control module 1030 then reads the data structure and then interprets it according to a Fetch Control Register (FCR) code associated with the pointer and stored in FCR file 1010. TLU stage 534 continues to fetch down the linked-list of data structures, using the pointers in each fetched data structure as the pointer to the next data structure until an end to the linked-list of data structures is reached.

Various different functions can be indicated by FCR values including: fetching a number of bytes from an offset of the structure into the PHB; indexing into an array of pointers/FCRs based on a load-balance key and fetching another pointer/FCR; updating byte/packet counters; extracting another pointer/FCR value to follow from an arbitrary offset in the structure and repeating; and, determining that the end of the list has been reached (e.g., the last fetch has occurred). The fetched entry can be in any format and for any purpose. Based on decisions made by earlier stages of HPU 410, TLU stage 534 can optionally perform two lookup operations per packet. In one embodiment of the present invention, such multiple lookups can be configured using a shell that interfaces with datastreams from PLU stage 518 and Pre-CAM1 stage 532.

Address generator module 1020 generates an address to FCR File Memory 1010. An initial address is loaded at the beginning of a tiny pipe cycle according to data provided by previous stages through the PAIR. Subsequently, an address can be determined in a variety of different ways. In an "incremental mode," each FCR in FCR file 1010 is addressed sequentially. In an "external read mode", a next FCR address is read from an external memory. These options permit having a different linked-list structure for different types of packets. Since each leaf pointer from PLU stage 518 points to an FCR entry based on its type (e.g., an IP unicast packet selects an FCR that defines the IP unicast linked-list format or multicast packets select a multicast linked-list format). FCR file 1010 includes a plurality of FCR registers. In one embodiment of the present invention, there are 128 FCR registers in FCR file 1010.

TLU Control module 1030 uses information in the FCR to control the search in Forwarding Database 420. Data passed from the PLU (leaf) and Pre-CAM1 stages is used to access the Forwarding Database. TLU memory can include both DRAM and SRAM memory. In one embodiment of the present invention, the TLU memory includes both DRAM and SRAM memory. Fetched data is provided to the PHB and a pointer to the next iteration is calculated and can be provided to address generator module 1020. The next FCR address can be loaded and the process repeats. TLU Control module 1030 can also provide data to statistics update logic 1050, which in turn updates a packet statistics memory.

Once TLU stage 534 reaches the end of the FCR linked-list, the TLU Control module 1030 completes storing the fetched information into appropriate locations (e.g., the corresponding PHB and PAIR 1070) and signals to pipeline control that it has completed its operation.

f. Middle Processor Microsequencer (MiP)

The next stage in an HPU tiny pipe, and the first stage of block 550, is Middle Processor microsequencer (MiP) 552. As noted in the above discussion related to the PreP microsequencer, one embodiment of the present invention provides IMP 514, PreP 516, MiP 552, and PoP 571 stages as four separate instantiations of substantially the same microsequencer logic. Therefore, the basic architecture of MiP stage 552 is described above in the context of PreP stage 516.

In one embodiment of the present invention, MiP stage 552 is primarily responsible for selecting an appropriate profile to be used by the following Pre-CAM2 stage 554. Profile selection determines those features that will be executed on a packet header (e.g., ACLs, CAR, and Netflow statistics). In another example, MiP stage 552 can be programmed to check the packet size against a maximum transmission unit (MTU) size (i.e., the size of the largest packet that can be processed by a particular output interface) and to determine the appropriate interface to which to forward the packet. Data is stored in a corresponding PHB or PAIR, and operation of the tiny pipe proceeds to the Pre-CAM2 stage.

g. Content Addressable Memory Processor (CAMP)

The Pre-CAM1, Pre-CAM2, CAM-Match, and Post-CAM stages of HPU 410 together form a content addressable memory processor (CAMP) that performs most of the "edge" features of a tiny pipe. Edge features can include extended access lists (Ex-ACL), committed access rate (CAR) and Netflow accounting. Ex-ACL can be used to classify packets or perform filtering based on certain matching criteria (e.g., interface, protocol, source prefix, destination prefix, port number, and the like). A filtering action can be either permit or deny, with or without statistics. CAR can be used to rate-limit traffic based on certain matching criteria (e.g., interface, IP precedence, QOS group, or Ex-ACL criteria). CAR provides configurable actions such as transmit, drop, set precedence, or set QOS group when traffic conforms or exceeds the rate limit.

Pre-CAM1 532 and Pre-CAM2 554 are the only blocks of the CAMP that read a PHB. The Pre-CAM stages prepare all the words to be matched in the associated TCAM according to a pre-programmed profile. CAM-Match stage 556 sends all the lookup words that were prepared by the Pre-CAM stages to Classification Database 424 (e.g., in FIG. 11), except for Netflow lookup words, and receives back pointers and actions for the matched words. Post-CAM stage 572 calculates and updates all statistics and buckets that are located in the pointers received by CAM-Match.

Classification Database 424 is associated with the CAMP stages and accessible via Classification TCAM Controller 1130. The Classification Database 424 can be divided into ACL (filtering) entries, CAR entries, PBR entries, and others. A match for any of those entries causes the address of the matched entry to be returned on a result bus of the TCAM. The result bus can be connected directly to a CSRAM as the address bus; thus, content of the address in the CSRAM can be read by the CAMP stages. In one embodiment of the present invention, if a matched TCAM entry is ACL, then the associated CSRAM has a "permit" or "deny" for the packet and an optional pointer to the entry statistics. Similarly, if the matched TCAM entry is CAR, then the CSRAM can have a pointer to a bucket for this CAR entry in the CSRAM. Also, if a matched TCAM entry is other than ACL or CAR, then the CSRAM can contain a compressed value for this entry, which will be used by a later stage.

i. Pre-CAM2

A normal flow of a packet header through the CAMP stages begins with Pre-CAM2 stage 554, which prepares the searching word from the packet header data. As stated above in the section related to Pre-CAM1, which is substantially identical to Pre-CAM2, the Pre-CAM2 stage contains a pre-programmed profile memory that has all information on how to build all the lookup words to the CAM. According to the content of the profile memory, all the lookup words are built and are stored in one of a series of Lookup FIFOs. Those are prepared for CAM-Match stage 556 which starts sending them to the CAM as soon as it takes over this packet header. The order of search words sent to the CAM is determined by the content of the profile memory. In one embodiment of the present invention, Pre-CAM2 stage 554 uses four Lookup FIFOs to store the lookup words. The Pre-CAM2 stage uses one of the Lookup FIFOs to build all the words, CAM-Match stage 556 uses another of the Lookup FIFOs to send its content to the CAM, Post-CAM stage 572 uses a third Lookup FIFO to resend modified CAR words in case of CAR modification actions being performed, and PoP stage 574 can use the fourth of the Lookup FIFOs in the event that the PoP stage must continue the CAR actions with further lookups.

When a packet arrives at Pre-CAM2 stage 554, Pre-CAM2 builds lookup words in Lookup FIFO 2 546 according to a profile selected by MiP stage 552. Similar to the PreP stage for Pre-CAM1, MiP stage 552 selects a profile bitmap register (in 910) that Pre-CAM2 can use to perform operations in shift logic 930. Information generated by the PRE-CAM2 stage is then written to a Lookup FIFO 2 546 or PAIR 590, which can be accessed by subsequent stage CAM-Match 556.

ii. CAM-Match Stage

Figure 11:
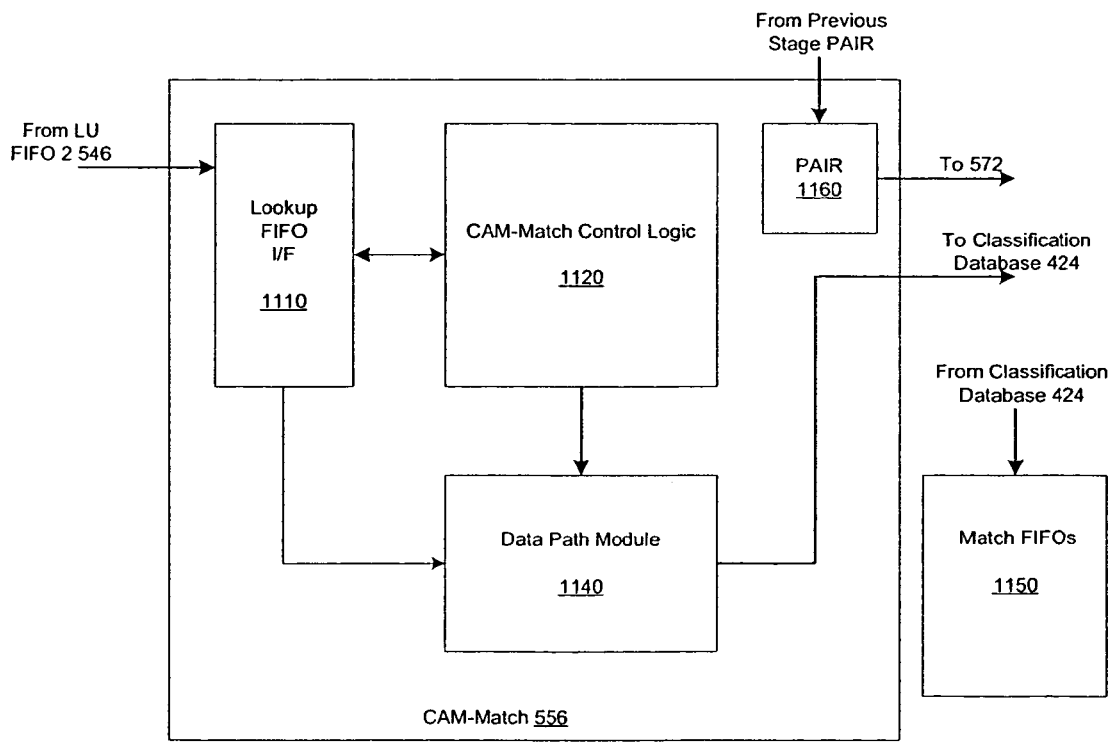
FIG. 11 is a simplified block diagram illustrating a head processing unit pipeline content addressable memory matching (CAM-Match) stage in accord with one embodiment of the present invention.

FIG. 11 is a simplified block diagram illustrating a CAM-Match stage 556 that can be implemented in one embodiment of the present invention. CAM-Match stage 556 is responsible for sending lookup words to Classification Database 424, which performs a matching in an associated memory. When CAM-Match stage 556 takes control over a packet header, the stage receives via Lookup FIFO Interface 1110 the contents of the Pre-CAM2 stage's Lookup FIFO (e.g., 546), which contains lookup words prepared by Pre-CAM1 and Pre-CAM2 that need to be sent to Classification Database 424 to determine a match. CAM-Match Control Logic module 1120 implements a state machine responsible for sequentially sending the lookup words to Classification Database 424, while skipping Netflow statistics words. Classification Database lookup results are stored in Match FIFO 1150 for transfer to Post-CAM stage 572. CAM-Match Control Logic module 1120 can send some entries (e.g., CAR entries) for lookup multiple times. In such cases, the CAM-Match Control Logic module can determine the number of times each CAR entry needs to be sent for lookup by examining the value of continue bits in the CAR lookup word. In one embodiment of the present invention, a CAM-Match stage is instantiated twice in HPU 410: once as a tiny pipe stage (556) and once as part of Post-CAM stage 572. In such an embodiment, access to PAIR 590 is typically included only in CAM-Match stage 556.

CAM-Match Control Logic module 1120 provides the main control of CAM-Match stage 556. The CAM-Match Control Logic module interfaces with Classification Database 424 through Data Path Module 1140 and sends appropriate control signals to other modules in the CAM-Match stage based on interface, Lookup FIFO status, and indicia from each lookup word. When CAM-Match Control Logic module 1120 receives a start signal from pipe control 595 and an indication from the Lookup FIFO Interface 1110 that there is an entry ready for lookup, the CAM-Match Control Logic module transmits a request to Classification Database 424. That request can remain asserted until the Classification Database acknowledges Lookup result determination. If there are no more valid lookups to send, CAM-Match Control Logic module 1120 can de-assert the request. Otherwise, a request signal can remain asserted until the next acknowledgement is received. When there are no more lookup words to be sent, CAM-Match Control Logic module 1120 can wait for all the lookups that have already been sent to be completed. CAM-Match 556 also includes a PAIR 1160 that receives PAIR information from prior stages and provides that information to subsequent stages. PAIR 1160 can also be updated by exception conditions generated by CAM-Match 556.

Some data needed for controlling lookup operations performed by CAM-Match stage 556 is extracted by Data Path module 1140. As mentioned above, each CAR lookup word may need to be transmitted more than once with different continue bits each time. In one embodiment of the present invention, a CAR word can be transmitted as many as 32 times. Data Path module 1140 can also determine how many times each CAR entry is sent to Classification Database 424 for lookup and with what continue bits. If the type of the entry received by Data Path module 1140 is not a CAR, that entry passes through the Data Path module as is.

iii. Post-CAM

Figure 12:
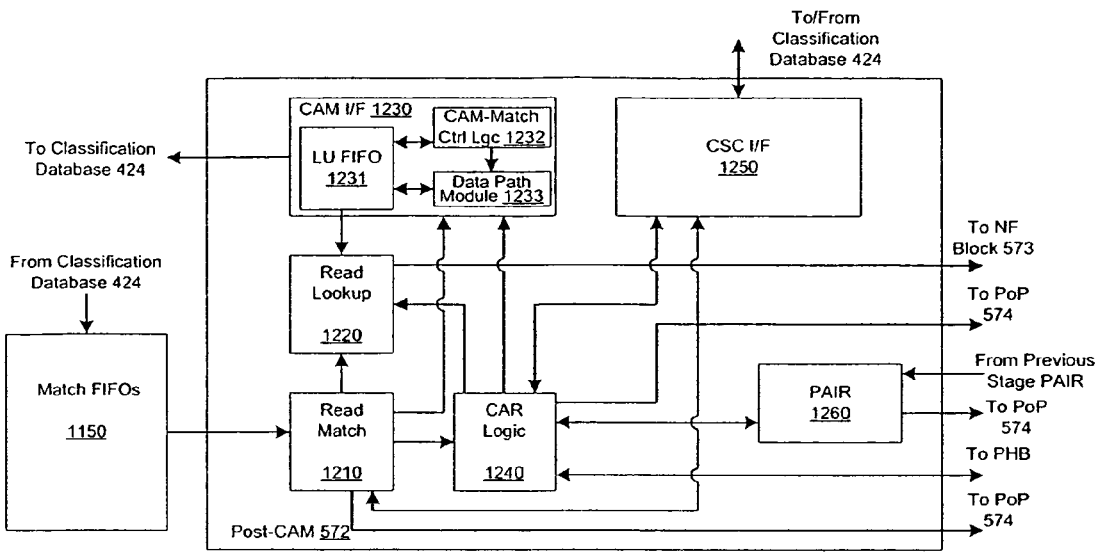
FIG. 12 is a simplified block diagram illustrating a head processing unit pipeline post content addressable memory processing (Post-CAM) stage in accord with one embodiment of the present invention.

From CAM-Match stage 556, data can pass to Post-CAM stage 572 via Match FIFO 1150 and PAIR 590. FIG. 12 is a simplified block diagram illustrating modules within Post-CAM stage 572, according to one embodiment of the present invention. Post-CAM stage 572 is the execution stage of the CAMP. Post-CAM stage 572 updates ACL statistics and notifies subsequent tiny pipe stages of permit or deny situations. The Post-CAM stage calculates CAR buckets, operates according to a conform-exceed action, and updates other non-Netflow statistics. For Netflow statistics, Post-CAM stage 572 copies flow statistics to a Netflow statistics block 573 (discussed below).

When Post-CAM stage 572 takes control over a packet, the Post-CAM stage acquires control over Match FIFO 1150. The Match FIFO can be shared between the CAM-Match and Post-CAM stages, or a separate Match FIFO that receives the contents of Match FIFO 1150 (from CAM-Match) can be accessed by Post-CAM stage 572. The entries of Match FIFO 1150 can be read sequentially by Read Match module 1210, which then determines whether to write the entry as a read request to Classification Database 424 through Classification SRAM Controller (CSC) Interface 1250 and/or to forward the entry to PoP stage 574. In one embodiment of the present invention, Classification Database 424 is physically implemented with two separate memories: a CBSRAM for token buckets and a CSSRAM for statistics (e.g., head counters), in addition to TCAMs and other memories.

CAR actions are sent to CAR Logic module 1240, which performs the requested CAR procedure and forwards the appropriate data to PoP stage 574. After Read Match module 1210 reads Match FIFO entries, Read Lookup module 1220 reads entries from a Lookup FIFO in CAM Interface 1230. CAM Interface 1230 can perform substantially the same matching tasks as the CAM-Match stage, and includes structures corresponding to the CAM-Match Lookup FIFO (1231), CAM-Match Control Logic (1232) and Data Path Module (1233). Any Netflow entries in the CAM Interface Lookup FIFO can be passed on to Netflow statistics block 573 along with a flag signaling whether a drop occurred for this packet before the Netflow entry (e.g., because of CAR or ACL). CAM Interface Lookup FIFO entries that are not Netflow statistics entries can be ignored.

Data read from Classification Database 424 (via CSC Interface 1250) can be split between CAR Logic module 1240 and an appropriate PHB. CAR Logic module 1240 can perform CAR calculations, updates and actions on that data. Results of these actions can be stored in appropriate registers in PAIR 1260 or the PHB. For example, CAR Logic module 1240 can write an updated CAR bucket back to a FIFO that is part of the Classification Database 424 and the selected action can be forwarded to PoP stage 574. If the CAR action contains some changes to lookup words, CAR Logic module 1240 can signal CAM Interface module 1230 to perform a change and retransmit all lookup words from that CAR entry forward to Classification Database 424. That access to the Classification Database can be controlled by CAM Match circuitry that is part of CAM Interface module 1230, which is largely identical to CAM-Match stage 556, as described above. Matched lookup words and CAR buckets that are read after this change (and before new matched words are received from the Classification Database) are ignored. When revised data arrives at Match FIFO 1150 from the Classification Database, the same processing steps can be performed.

h. Post-Processor Microsequencer (PoP)

The next stage in a HPU 410 tiny pipe is post-processor microsequencer stage 574. As discussed above, in one embodiment of the present invention, IMP stage 514, PreP stage 516, MiP stage 552, and PoP stage 574 are four separate instantiations of the same general purpose microsequencer logic. The microsequencer logic serves as a programmable general purpose machine for header portion processing. The basic architecture of the PoP stage, therefore, is described above in context of PreP stage 516.

PoP stage 574 receives data from Post-CAM stage 572, Lookup FIFO 545, and PAIR 590. The PoP stage is responsible for the preparation of the buffer header (BHDR) and any necessary further classification processing. PoP stage 574 can check for any exception detected by previous stages or the other microsequencers. The PoP stage also programs gather stage 576 for header transfer of the packet.

Tasks that PoP stage 574 can perform for IP packets include: checking the type of packet (e.g., unicast, multicast, or MPLS); setting recycle and multicast bits according to packet type and previous information; calculating an appropriate buffer size according to the length of the packet; and checking conformance of the packet for rate limiting performance (e.g., removing tokens from the bucket and performing any required action specified). PoP stage 574 also performs buffer header (BHDR) tasks including: writing a free queue number and return queue number field in BHDR, writing local output queue field in BHDR, writing output queue field in BHDR, and calculating fabric length field in BHDR.

PoP stage 574 can perform additional tasks in an MPLS environment, including: analyzing leaf data and deciding what operation to do with the label; programming gather stage 576 according to said analysis; propagating time to live (TTL) and class of service (CoS) if required; and calculating an appropriate buffer size according to packet length including any additional header data.

i. Netflow Statistics Block

Packet Processors 230 and 235 can perform Netflow statistics analysis while processing packet headers. Netflow statistics include data such as number of connections from a source or to a destination, number of packets sent by a particular source or sent to a particular destination, number of packets of a particular type passing through the HPU, and the like. The Netflow block and the Netflow controller (NFC) perform Netflow counters updates. The architecture of Netflow accounting includes four Netflow blocks (e.g, 573), each associated with a tiny pipe, connected to the NFC, which is a "smart" controller that acts as an additional agent in order to generate certain transactions.

Figure 13:
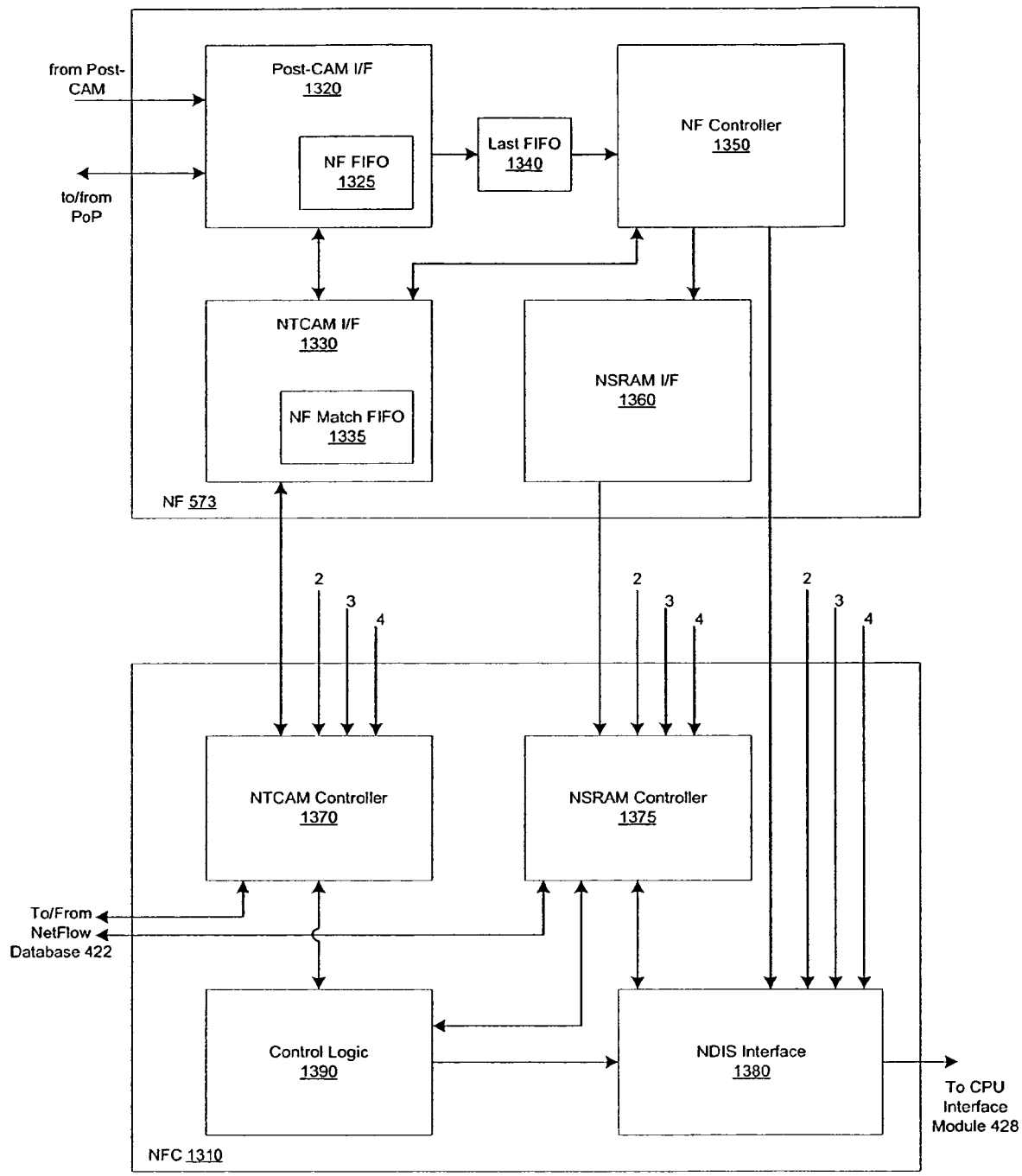
FIG. 13 is a simplified block diagram illustrating a head processing unit network flow statistics (Netflow) module and a coupled network flow controller (NFC) module in accord with one embodiment of the present invention.

FIG. 13 is a simplified block diagram illustrating a Netflow block 573 and a coupled NFC block 1310, according to one embodiment of the present invention. The Netflow block (NF block) is the agent that actually deals with counter updates. NF block 573 is configured to process two kinds of counters: static and dynamic. Static counters are counters for which entries in an NTCAM are added and deleted by CPU 284, while dynamic counters can have entries in the NTCAM added and deleted by the NF block. The NTCAM is configured with a dedicated area for dynamic counters, which is handled by NFC 1310.

All entries processed by NF block 573 are prepared in the Pre-CAM1 and Pre-CAM2 stages or the PoP stage, using a special code that identifies the entry as static, dynamic, or other. Post-CAM stage 572 copies all the NF entries sequentially to NF block 573. NF block 573 holds those entries for processing until the packet header is processed by Gather stage 576. Once Gather initiates processing on the packet header, the NF block sends the NF entries sequentially to the NTCAM controller 1370 for lookup. NF block 573 then can receive a match flag along with a matched CAM address in NF Match FIFO 1335 for all lookups transmitted. NF block 573 processes NF Match FIFO 1335 according to the match flag and entry type (static or dynamic) for all lookups transmitted. In one embodiment of the present invention, for each entry in NF Match FIFO 1335, NF block 573 can perform one of the following actions: (1) if a match, send a statistics update request to NSRAM Controller 1375 in NFC 1310, which will then update Netflow Database 422; (2) if no match for NF static, ignore the entry; and, (3) if no match for NF dynamic, add the entry to the NTCAM, send initial statistics request to NFC 1310, and notify the CPU.

Post-CAM stage 572 writes all NF lookup words of the packet header to NF FIFO 1325 along with a static/dynamic indication and other identifying information. NF block 573 counts the number of NF lookup words written by the Post-CAM stage. A previous drop flag can also be set by the Post-CAM stage when a CAR or an ACL has a drop action; all entries following the CAR or ACL entry can be marked with the drop flag. NF FIFO 1325 can be located in a Post-CAM Interface block 1320. PoP stage 574 can transmit modified information to NF FIFO 1325 that changes words stored in the NF FIFO. PoP stage 574 can read and write entries in NF FIFO 1325. NF block 573 gives access to PoP stage 574 to the relevant memory locations in NF FIFO 1325.

Post-CAM Interface module 1320 then provides the NF lookup words within NF FIFO 1325 to NTCAM Interface module 1330 for transmission to NTCAM Controller 1370 in NFC 1310. NTCAM Controller 1370 provides the lookup words to Netflow Database 422 for match processing and returns the results of such matching to NF Match FIFO 1335.

Once NF Match FIFO 1335 is not empty, NF Controller module 1350 reads the NF Match FIFO along with the contents of Last FIFO 1340. Last FIFO 1340 contains a copy of the lookup words sent from NF FIFO 1325 to the NTCAM to be used in case of a no-match condition. As NF Controller module 1350 reads NF Match FIFO 1335 and Last FIFO 1340, those FIFOs are in sync (e.g., a match/no-match result read from NF Match FIFO 1335 is the result for the lookup entry that is read from the Last FIFO 1340). NF Controller 1350 performs each FIFO read as an atomic operation, meaning that a new entry will not be read before all operations for the previous entry have been completed. Atomic operations that NF Controller 1350 can perform include:

Match: Send statistics update request to NSRAM Controller 1375 (in NFC 1310) according to a pointer received from NF Match FIFO 1335 and ignore data from Last FIFO 1340;

No Match Check data from Last FIFO 1340 and determine if the data represents a static or dynamic counter For Static: Ignore data from both Last FIFO 1340 and NF Match FIFO 1335; and For Dynamic: Add the unmatched entry from the Last FIFO into NTCAM interface 1330 with data from Last FIFO 1340 entry, send initialized statistics request to NSRAM controller 1375, which updates statistics counters in Netflow Database 422, and send the CPU an identification of the NTCAM added entry via NDIS Interface 1380.

NTCAM interface module 1330 interfaces NF block 573 with NTCAM Controller 1370. NTCAM Interface module 1335 can send lookup requests for the words read from NF FIFO 1325 after any PoP changes, and write requests that are initiated by NF Controller 1350. NTCAM Interface module 1330 can include NF Match FIFO 1335 to which lookup results from NTCAM controller 1370 are written. In one embodiment of the present invention, NF Match FIFO 1335 can contain 32 entries of 20 bits each. Writing to NF Match FIFO 1335 is performed according to control signals from NTCAM Controller 1370 and the entries are read by NF Controller 1350. NSRAM Interface module 1360 interfaces NF block 573 with NSRAM Controller 1375. The NSRAM Interface module receives requests to update statistics or to initialize statistics in Netflow Database 422 from NF Controller module 1350. NF Controller module controls operation of all modules in NF 573, analyzes contents of NF Match FIFO 1335 and Last FIFO 1340 as discussed above, and maintains counters in the NSRAM and entries in the Netflow Database 422. NDIS Interface 1380 in NFC 1310 communicates to the CPU Interface 280 that a new entry to the NTCAM is added (e.g., upon a mismatch of a dynamic entry). Control Logic 1390 provides communication logic between the various controllers of NFC 1310 as well as the external memories accessed by the controllers.

Netflow statistics are maintained for all of the tiny pipes in HPU 410 and tracked in a single NFC coupled to each tiny pipe's NF block. Such statistics can then be analyzed using a number of tools known in the art.

j. Gather Stage

Figure 14:
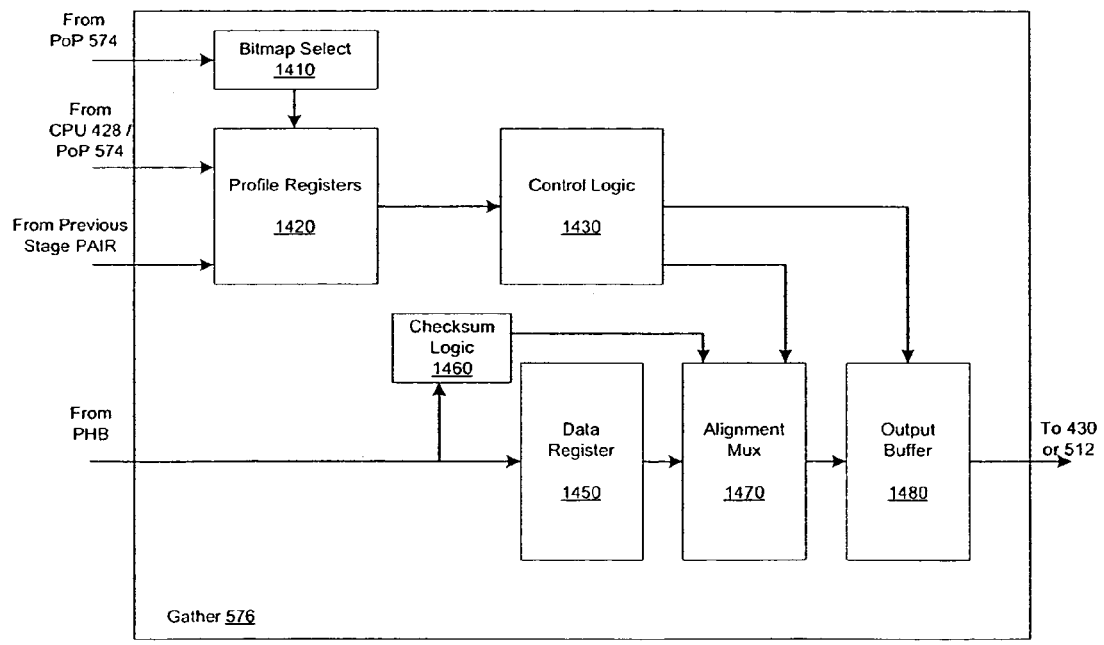
FIG. 14 is a simplified block diagram illustrating a head processing unit pipeline Gather stage in accord with one embodiment of the present invention.

FIG. 14 is a simplified block diagram of modules in Gather stage 576 of HPU 410, according to one embodiment of the present invention. The primary function of Gather stage 576 is to collect together various pieces of data contained in a PHB and other registers (e.g., PAIR) in preparation for departure of the packet header from the HPU tiny pipe and transferring data into buffer manager interface module (BMI) 430. More specifically, Gather stage 576 can perform processing that might be required by different protocols, including: IP checksum calculations; label switching, insertion or removal; MAC layer rewrite/removal; buffer header (BHDR) data arrangement (e.g., inserting leaf and adjacency fields in BHDR); and, IP header modification/updating. Gather stage 576 transfers data to BMI 430 according to programming in a profile register 1420. For each type of packet header, a profile is defined. Each profile includes one or more entries in Profile Registers 1420. In one embodiment, Profile Register 1420 can include some number of entries that can be written to directly by PoP stage 574. In order to allow one packet to be processed by Gather stage 576 at the same time that PoP stage 574 is configuring the next packet, the Gather stage alternates between sets of entries in Profile Registers 1420. Gather profiles can be determined dynamically by earlier tiny pipe stages depending on a variety of packet characteristics, including, but not limited to, Class of Service (CoS), input or output destination, port number, or packet type.

Gather stage 576 operation can start when PoP stage 574 programs Bitmap Select Register 1410 with a value calculated by the PoP stage according to the packet type. Based on values in Bitmap Select Register 1410 and the PAIR, Gather stage 576 calculates the address of the first entry in Profile Registers 1420. Upon receipt of a command from Pipe Control 595, Gather stage 576 loads an entry counter with a first entry value. The Gather stage then reads the entry's value and loads from Profile Registers 1420, (e.g., a start address, nibble count and last and IP packet start control bits) into corresponding registers (not shown).

Control Logic module 1430 can then initiate copying of data from a PHB 580 into Output Buffer 1480. This can be accomplished by reading data from an associated PHB 580 using the start address register and loading the PHB data into Data Register 1450. As data is read from different fields in the PHB, the data is concatenated and filtered such that only fields that should be sent to the output buffer are read. Fields which are not part of the packet are skipped. Read data arrives in Data Register 1450. According to nibble alignment of the data (e.g., which is the first nibble that must be transferred to BMI 430) alignment multiplexer 1470 is controlled. Output Buffer 1480 can be loaded according to the nibble counter. After the data is loaded into the output buffer, the nibble count is decremented. This process can continue until the nibble count expires. When such expiration occurs, the last bit in Profile Register 1420 is checked. If the bit is set, the header's transfer is complete and an end signal to Pipe Control 595 is asserted. Otherwise, the next entry in Profile Register 1420 is read.

If an IP packet start bit in an entry is set, Gather stage 576 can assume that the start address points to the first byte of an IP header. In that case, Checksum Logic 1460 is reset and an IP checksum calculation can be started on the following data. At the end of the IP header, where the checksum is located (e.g., 40 bytes into the header), the header checksum can be replaced in the packet with the newly computed value. In one embodiment of the present invention, the checksum calculation is performed using five 16-bit adders and five accumulators. Data is read from the PHB memory as described above. When the IP packet start bit in the entry is set, the checksum calculation begins. All the data preceding the IP header checksum can be transferred to BMI 430 (as soon as a 64 bit word is completed). The header checksum cannot be transferred until the whole IP header is read from the PHB. This means that an Output Buffer of three 64-bit words is required to store the remainder of the IP header. While this Output Buffer is filled, Checksum Logic 1460 can calculate the checksum of that header remainder.

Gather stage 576 can also support recycling of headers through a tiny pipe for additional rounds of pipeline processing. Such recycling can be important in cases related to tunneling or label manipulation (during receive) or multicast transmission (during transmit—see below). At least two issues arise with regard to recycling: packet level ordering and header-tail ordering. Packet level ordering requires that Ingress Packet Processor 230 keep packet arrival order in sync with packet transmission order. Header-tail ordering addresses issues related to synchronization of a header with its respective tail. Recycling a packet header into a tiny pipe violates one-to-one header-tail synchronization. PoP stage 574 provides an indication to Gather stage 576 and Fetch stage 512 that a packet header is to be recycled. At the beginning of the next cycle, Gather stage 576 writes a header into Fetch stage 512 rather than into BMI 430. This can be accomplished by activating a separate command bus (e.g., 585). The Gather stage provides to the Fetch stage a header containing all the information required for continued processing of the packet header during recycling. In one embodiment of the present invention, Gather stage 576 will only recycle a packet header to a Fetch stage 512 within the same tiny pipe. Gather stage 576 will also provide a sequence indication (e.g., a time stamp) associated with the recycled header that can be used subsequently by BMI 430 to reconstruct correct header order.

3. Buffer Manager Interface Module

The Buffer Manager Interface module (BMI) 430 is the output interface of Packet Processors 230 and 235. The BMI can interface to either Ingress Traffic Management module 240 in the receive path or Egress Traffic Management module 260 in the transmit path. BMI 430 is responsible for collecting headers and associated data from the four tiny pipes of HPU 410 and transferring that information to the Ingress or Egress Traffic Management modules. Such data transfer includes two types of data: packet tail data from Pre-Fetch stage 405 and other header data coming from HPU 410. Functions of BMI stage 430 can include interfacing to the Ingress/Egress Traffic Management modules, collecting headers from all of the HPU tiny pipes, receiving packet tails from the tail path of Pre-Fetch module 405, sending headers in a correct order in accord with associated Pre-Fetch ordering indicia (e.g., time stamps, sequence numbers, and the like), providing a back-pressure signal to Pre-Fetch module 405 when a Reorder Buffer exceeds a programmable threshold, and sending data to the traffic management modules.

In one embodiment of the present invention, transfers from a Packet Processor to a traffic management module include 64-bit words for headers and tails. The Packet Processor is the master of a transfer bus between the Packet Processor and the Traffic Management module; meaning that Ingress Packet Processor 230 decides the type of data to be transferred on the bus (e.g., header or tail). Such decision-making can be based on the readiness of the traffic management modules to receive the relevant data, with a priority for headers over tails. Ingress Packet Processor 230 can transfer to the Ingress Traffic Management module information such as data in the header or tail, parity bits, identification of the type of data being transferred (e.g, packet tail, last valid tail data for the current packet, packet header, and end of header data indicating whether a tail is associated with that head, and size information). The Ingress Traffic Management module 240 can indicate on the bus whether the module is ready to receive additional information from the Ingress Packet Processor used by BMI 430 to provide backpressure information. As will be discussed more fully below, in the transmit path, Egress Packet Processor 235 can transmit multicast header information to Egress Traffic Management module 260. Such information is, in general, not necessary to transmit to Ingress Traffic Management module 240 on the receive path.

Figure 15:
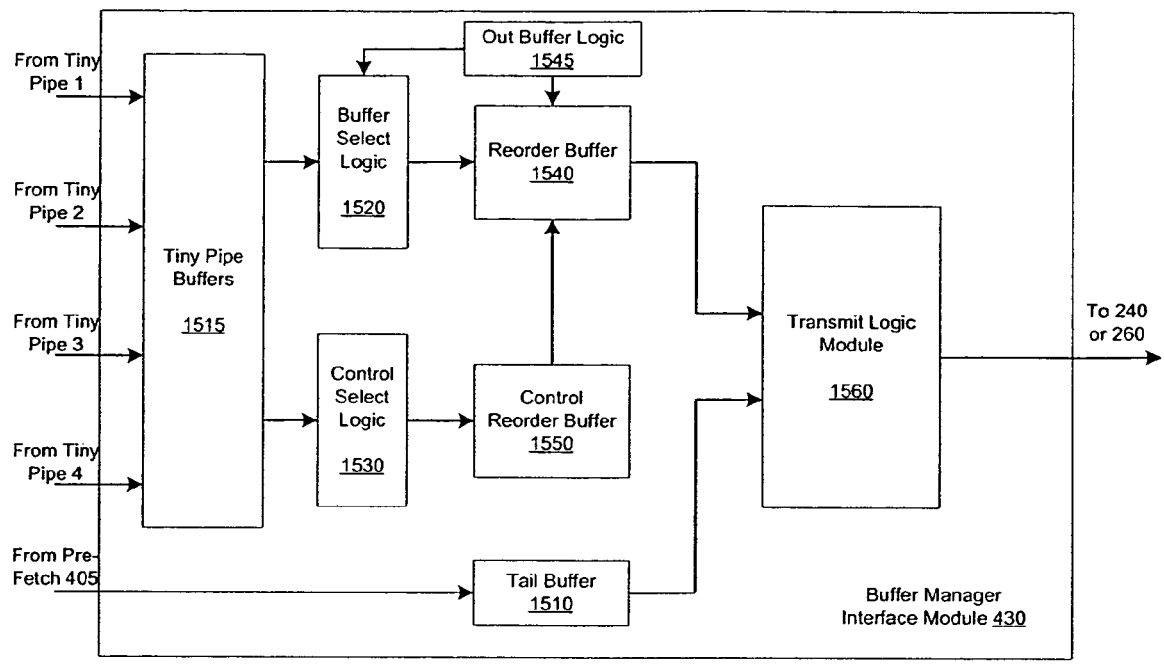
FIG. 15 is a simplified block diagram illustrating a head processing unit buffer manager interface module in accord with one embodiment of the present invention.

FIG. 15 is a simplified block diagram illustrating BMI 430 in accord with one embodiment of the present invention. Data enters BMI 430 either from the header path or tail path. When a tail is received from Pre-Fetch module 405, the tail is written to Tail Buffer 1510. Tails can then be transferred to Ingress Traffic Management module 240 (or Egress Traffic Management module 260) when there are no headers being transferred. Headers are received from Tiny Pipes 1-4 at Tiny Pipe (TP) Buffer 1515. In one embodiment of the present invention, a TP Buffer is a 256-bit wide, 3-word buffer that receives data at a rate of 64 bits at 150 MHz. Buffer Select Logic 1520 can select a TP Buffer to read a header word from and then write the header word into Reorder Buffer 1540. In one embodiment of the present invention, Buffer Select Logic 1520 selects a TP Buffer 1515 associated with the HPU tiny pipes in a cyclic manner during every clock cycle (i.e., every cycle a word is written to Reorder Buffer 1540 from a different TP Buffer, according to a time stamp the header was given). Tail indication and size information from the headers are also written to Control Reorder Buffer 1550, which contains an entry for each header written to Reorder Buffer 1540. Control Select Logic 1530 can manage selection and writing of this information to Control Reorder Buffer 1550 in the same manner that Buffer Select Logic 1520 manages writing of headers to Reorder Buffer 1540. When the last word of a header is written to Reorder Buffer 1540, a "valid bit" or flag can be sent to indicate that the header is ready for transfer.

Reads from Reorder Buffer 1540 start with the first header in the Reorder Buffer (e.g., entry 0). A read is performed only if the valid bit for that header is set. If Reorder Buffer 1540 gets to an entry not having a set valid bit, the Reorder Buffer can wait at this entry and stop sending headers until the valid bit is set. Control bits from Control Reorder Buffer 1550 are also provided when Reorder Buffer 1540 entries are read.

Out Buffer Logic 1545 is responsible for reading the TP buffers correctly and on time. If a word read from a TP Buffer 1515 is the first of a header (e.g., the word includes a time stamp), Out Buffer Logic 1545 is also responsible for reading the time stamp to a write pointer in Reorder Buffer 1540. Out Buffer Logic 1545 is further responsible for setting the valid bitmap or flag in Reorder Buffer 1540. Further, a counter for valid bits can be incremented. Such a valid bit counter reflects the number of headers written to Reorder Buffer 1540. If this counter exceeds a configurable threshold, BMI 430 can assert a backpressure on Pre-Fetch module 405 that will prevent new headers from entering the HPU.

Reorder Buffer 1540 can further include read logic that is responsible for header ordering to Ingress Traffic Management module 240 (receive path) or Egress Traffic Management module 260 (transmit path). If a read pointer points to an empty entry in Reorder Buffer 1540 (e.g., a recycled header), the read can be stopped until the empty entry is written. The Reorder Buffer can then be freed, allowing heads to be transmitted. The Reorder Buffer read logic can also generate the controls selecting between heads and tails. Tails can be sent when there is no header to be sent.

Transmit Logic module 1560 selects headers and tail as they are ready and transits them to the associated Traffic Management module at an appropriate clock speed.

In such a manner, BMI 430 transmits packet headers and tails in an interleaved manner to Ingress Traffic Management module 240 (or Egress Traffic Management module 260 in the transmit path).

C. Ingress Traffic Management Module

Ingress Traffic Management module 240 is responsible for receiving packet heads and tails from Ingress Packet Processor 230, reassembling those heads and tails into packets, storing the packets in an external FCRAM, and then sending each packet to Switch Fabric interface 250. In embodiments of the present invention, the Ingress Traffic Management module can manage input shape queues and virtual output queues, using modified deficit round robin (MDRR) and weighted random early detection (WRED) schemes to input shape and queue traffic going into the switch fabric. Functions and features of Ingress Traffic Management module 240 can also include: supporting queue elements (e.g., one million queue elements in one embodiment); supporting different sizes of packet buffers (e.g., 15 different sizes can be supported in one embodiment); supporting high and low priority unicast and multicast output queues with WRED (e.g., 2048 unicast, 16 high priority and 8 multicast output queues are supported in one embodiment); dynamic queue allocation for unicast output queues, allowing arbitrary distribution of queues to slots and different classes of service; bandwidth scheduling on output slots based on MDRR; supporting a plurality of shape queues with "leaky buckets" and WRED (e.g., 4096 input shape queues are supported in one embodiment); and, supporting a slow path for processing of packets by Processor 284 for packets unable to be processed by Ingress Packet Processor 230.

Figure 16:
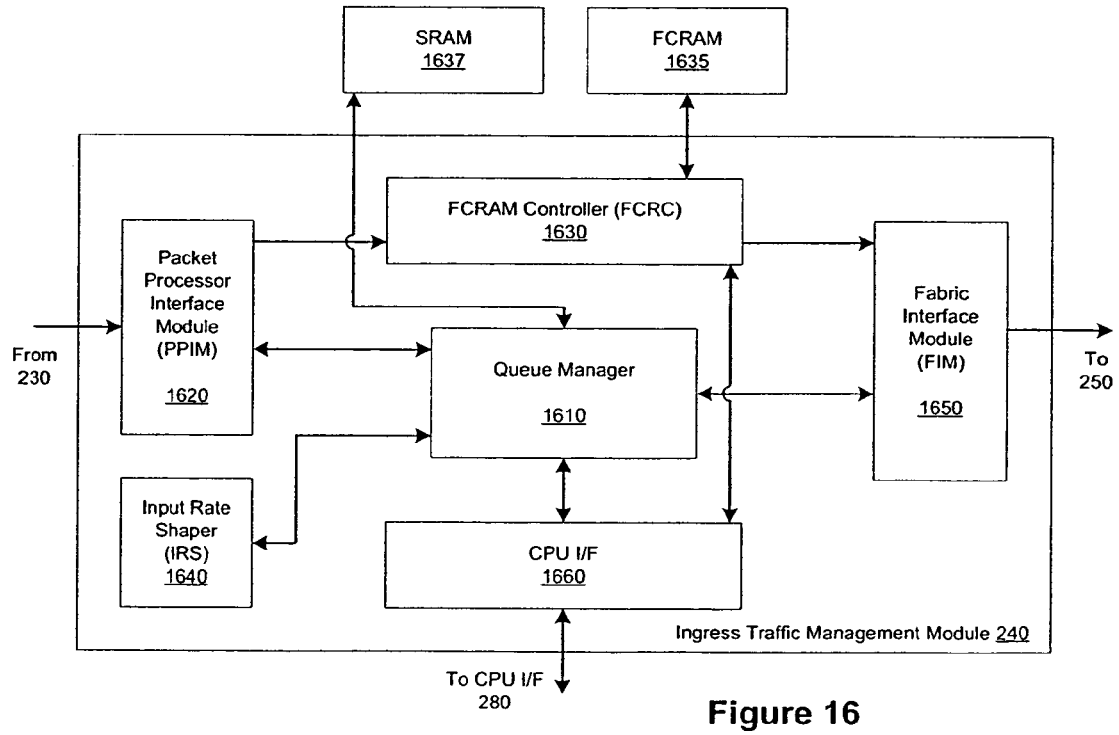
FIG. 16 is a simplified block diagram illustrating a line card ingress traffic management module in accord with one embodiment of the present invention.

FIG. 16 is a simplified block diagram illustrating Ingress Traffic Management module 240 in accord with one embodiment of the present invention. Ingress Traffic Management module 240 contains the following major functional modules: Queue Manager (QM) 1610, Packet Processor Interface module (PPIM) 1620, FCRAM controller (FCRC) 1630, Input Rate Shaper (IRS) 1640, Fabric Interface module (FIM) 1650, and CPU Interface module (CPU I/F) 1660.

QM 1610 performs all of the queuing and dequeuing functions in Ingress Traffic Management module 240. QM 1610 can perform enqueue and dequeue functions, by manipulating queue elements in external SRAM 1637 and internal Head-Tail-Length (HTL) pointers. QM 1610 also performs WRED functions for output queues and shape queues and MDRR functions to select packets from the output queues for slots. QM 1610 contains a queue map to arbitrarily map output queues to slots. QM 1610 can arbitrate for accesses between internal enqueue and dequeue state machines.

PPIM 1620 is the interface in Ingress Traffic Management module 240 to Ingress Packet Processor 230. PPIM 1620 performs reassembly of heads and tails sent from the Ingress Packet Processor, makes requests to QM 1610 for queue elements from an appropriate free queue, passes packets to FCRC 1630 for writing to external FCRAM 1635, and can request the QM to perform output queue enqueues or shaping queue enqueues.

FIM 1650 requests output queue dequeues from QM 1610 and reads data from packet buffers via FCRC 1630. The FIM interfaces to Switch Fabric Interface 250 and attempts to keep all ingress FIFOs in Switch Fabric Interface 250 full by transferring data from FCRAM 1635.

IRS 1640 can implement a leaky bucket algorithm for shape queues. The IRS performs shape queue dequeue and output queue enqueue requests to QM 1610, moving buffers from the shape queues to output queues at a rate determined by the leaky bucket algorithm and various parameters for each queue.

FCRC 1630 is the interface to FCRAM 1635, managing read and write accesses and refresh cycles. FCRC 1630 arbitrates between the FCRAM clients (PPIM: write only; FIM: read only; CPU I/F: read and write) and selects requests that optimize bus efficiency based on bank swapping as well as priority.

CPU I/F 1660 interfaces to Processor 284 via line card CPU Interface 280. CPU I/F 1660 supports two functions: (1) providing Processor 284 with access to internal registers, RAMs, and external FCRAM and SRAM, thereby allowing the Processor to configure the Ingress Traffic Management module, carve the external memory, and monitor for error conditions; and, (2) providing an automatic buffer header pre-fetch and transfer to CPU Interface 280 for packets that Ingress Packet Processor 230 chooses to send to the Processor 284.

1. Queuing Operation Performed By Ingress Traffic Management Module

As stated above, there are two external memory blocks associated with Ingress Traffic Management module 240: FCRAM 1635 into which packet data can be stored, and SRAM 1637 that contains queue element data that references packet buffers. These external memory blocks can be used in combination with internal HTL memories. In one embodiment of the present invention, the FCRAM is a DRAM of between 128 MB to 1 GB in size and the SRAM is up to 16 MB in size. Before operation of Ingress Traffic Management module 240 can commence, the HTL memories and external queue elements in the SRAM are configured.

FCRAM 1635 can be logically "carved" into packet buffers of various sizes. In one embodiment of the present invention, there are a maximum of 15 sets of buffers (i.e., 15 different sizes of buffer). SRAM 1637 can contain one queue element (QE) for each packet buffer in FCRAM 1635. Each QE has a number of different fields, one of which can be a buffer address that contains a starting address of the QE's associated buffer in FCRAM 1635. The buffer address is unique for each QE and, in general, will not be altered once buffer carving is completed. Another field in a QE is a link to a next QE in a particular linked-list of QEs. There is no requirement to write anything into the FCRAM during buffer carving, since PPIM 1620 can overwrite all information in a buffer when it stores a packet.

Internal to Ingress Traffic Management module 240 are a plurality of head-tail-length (HTL) memories. In one embodiment of the present invention, three HTL memories are used: low queue HTL, output queue HTL, and shape queue HTL. Each element in an HTL can include: a head pointer to the start of a linked-list of QEs, a tail pointer to the last element in the linked-list of QEs, and a length field containing the number of elements in the linked-list. In one embodiment of the present invention, there are 32 entries in the low queue HTL of which 15 are assigned to free queues (e.g., queues of empty buffers). After buffer carving, FCRAM 1635 is logically broken into buffers, each buffer having a corresponding QE pointing to that buffer. The QEs will be in a linked-list for each buffer size and free queue HTL entries will point to each linked-list. Linked-lists of free buffers can be ordered such that the smallest buffers are associated with the lowest HTL entry and other buffer sizes are in ascending order. With such an arrangement, if a free queue for a given buffer size is exhausted, the next size up of buffer can be used to store a packet.

QM 1610 can manipulate pointers in HTL memories and the QEs to move buffers between various queues. As stated above, Ingress Traffic Management module 240 can support three types of queues: low queues (free queues plus other special queues to be described later); output queues (virtual output queues that separately queue packets for each output channel on the egress line card); and shape queues. An example packet data flow is described herein. Upon receipt of a packet, PPIM 1620 can check an Ideal Free Queue field in the packet header to determine the size of a buffer required to store the packet plus all associated header information. PPIM 1620 can then request from QM 1610 a Free Queue, giving the QM the Ideal Free Queue information. QM 1610 can then read a low queue HTL for the Ideal Free Queue specified and determine the availability of an appropriately sized queue. QM 1610 can determine the appropriate address of that queue from SRAM 1637 and provide the information to PPIM 1620. The information provided to PPIM 1620 can include the buffer address in FCRAM 1635 to which to write the packet and the QE number of that address. PPIM 1620 can then make a request to FCRC 1630 to write the packet information to the indicated buffer address. It can take multiple transactions between PPIM 1620 and FCRC 1630 before a packet is fully stored in FCRAM 1635.

Once the packet is stored in FCRAM 1635, PPIM 1620 can then make an Output Queue enqueue request to QM 1610 to place the buffer in FCRAM 1635 onto a virtual Output Queue as specified in a local Output Queue field of the packet header. Along with this request, PPIM 1620 can give the QM the QE number for the buffer now containing the packet. QM 1610 can then read the HTL memory for the appropriate Output Queue and write to a QE pointed to by a tail pointer within that memory and updating the QE to point to the QE provided by PPIM 1620. QM 1610 can then acknowledge the Output Queue enqueue to PPIM 1620.

FIM 1650 tries to keep ingress FIFOs in Switch Fabric Interface 250 full and its own FIFOs full. As the FIFOs in FIM 1650 empty due to data transfer to Switch Fabric Interface 250, FIM 1650 will request more data. FIM requests an output slot dequeue from QM 1610, which selects a buffer to be dequeued using a modified deficit round robin (MDRR) scheme. QM 1610 can then remove a QE from the head of a selected Output Queue linked-list and give it to FIM 1650. The FIM can then request a read of the selected buffer from FCRC 1630 by passing the address of the dequeued buffer. FIM 1650 can read the packet data from FCRAM 1635 into the FIM's internal FIFO. When FIM 1650 has completely read the packet from FCRAM 1635, the FIM can inform the QM to return the QE to a Free Queue list.

The QM is designed such that the surrounding modules (PPIM, FIM, CPU I/F, IRS) are the QM's clients, asynchronously requesting enqueue and dequeue operations. QM 1610 arbitrates among the clients for servicing, and arbitrates for internal access to SRAM 1637. Similarly, FCRC 1630 services read and write requests from client modules (PPIM 1620, FIM 1650, and CPU I/F 1660), arbitrating based on priorities while trying to maximize FCRAM bus efficiency.

To shape traffic flows for bandwidth and burst parameters, Shape Queues are used. Instead of PPIM 1620 enqueuing buffers directly to output queues, the PPIM can enqueue to Shape Queues. IRS module 1640 can apply a "leaky bucket" algorithm plus WRED to the Shape Queues. IRS 1640 can then request Shape Queue dequeues and output queue enqueues to the queue manager in order to move buffers to Output Queues at a rate specified by shaping parameters.

Output queuing to FIM 1650 is serviced within QM 1610 using a modified deficit round robin (MDRR) algorithm. The function of the algorithm is to round robin among the queues based on allocated bandwidth, rather than a number of packets sent. MDRR is based upon DRR but with the addition of one high-priority queue per slot. The high-priority queue can be serviced in one of two modes: low-delay mode and fair-mode. In low-delay mode, the high-priority queue is serviced first. Once all high-priority traffic is clear from the high-priority queue, then low-priority queues can be serviced in a classic DRR fashion. Low-delay mode provides the lowest latency for high-priority traffic, but at the expense of possible starvation of low-priority traffic if the high-priority queue is over-used. In fair-mode, a quantum of data can be taken from the high-priority queue, then one quantum from one of the low-priority queues (chosen via the regular DRR algorithm), and then back to selecting a quantum of the high-priority queue again. Fair-mode guarantees that all queues get serviced, but at the expense of latency on the high-priority queue.

The Shape Queues provide a "leaky bucket" algorithm to shape traffic into a steady stream with control for bursts up to a configured limit. The leaky bucket algorithm can be implemented by adding, at regular intervals (e.g., every 250 microseconds), a configurable number of tokens to each queue bucket. A bucket can be filled up to a limit that controls the size of the maximum burst that can be sent from a queue. Packets can only be released from the leaky bucket when the bucket has a positive credit. In one embodiment of the present invention, the leaky bucket is implemented by deducting the packet length (in bytes) from the leaky bucket. The deducted packet length can be either a Layer 3 length of the packet or can be adjusted by an amount computed to account for anything that was stripped off the packet and discarded by Packet Processor 230 or SPA 210. Such a length adjustment is provided by ingress packet processor 230.

Both Output Queues and Shape Queues in Ingress Traffic Management module 240 provide a WRED function to control congestion within the router in which line card 200 is installed. WRED is a modification of RED. RED (random early detection or random early discard) is an algorithm used for congestion avoidance within a router. RED has the objective of constraining an average amount of data in a queue, and thus the average latency introduced by the queue to the system. Motivations for an RED algorithm include: (1) avoiding queue congestion and thus tail dropping, and (2) keeping average queue depth well below a potential maximum, thus avoiding the latency introduced in a router using the line card becoming unacceptable.

RED works on an assumption that traffic flowing through a router is predominantly TCP originated. TCP operates with a "transmit window" that controls the amount of data a given host can transmit to a network before that host must receive an acknowledgement for previous packets. TCP has an algorithm that allows it to open and close this window size depending on network conditions. When things are going well and packets are not being lost on the network, then the window size can be increased, and therefore net traffic sent by a host on the network goes up. When things aren't going well and the host discovers that packets are being lost in transit to the receiving end, then the window size is reduced and the net amount of traffic sent on the network goes down.

RED causes a deliberate drop in packets before network congestion occurs thus preventing congestion from happening in the first place. For each packet that would be put onto a queue, there is a probability computed for just dropping the packet instead. An RED algorithm states that this drop probability should increase as the average queue size increases.

WRED is an extension of RED where multiple classes of traffic can be combined into one queue with each class of traffic using a different set of RED parameters. A typical configuration of WRED sets a drop threshold for higher classes of service above those used for lower classes of service. Thus, as an average depth of a queue increases, the drop probability increases for the lower classes first while the drop probability for the upper classes remain the same.

D. Switch Fabric Interface

Switch Fabric Interface 250 includes modules for handling packets in both the receive and transmit data paths of line card 200. Switch Fabric Interface 250 is responsible for communicating packet information with Switch Fabric 270. The Switch Fabric Interface can segment packets into cells that can be more easily handled by data paths in the switch fabric. Such cells can be of uniform length to greater facilitate Switch Fabric transmission.

Figure 17:
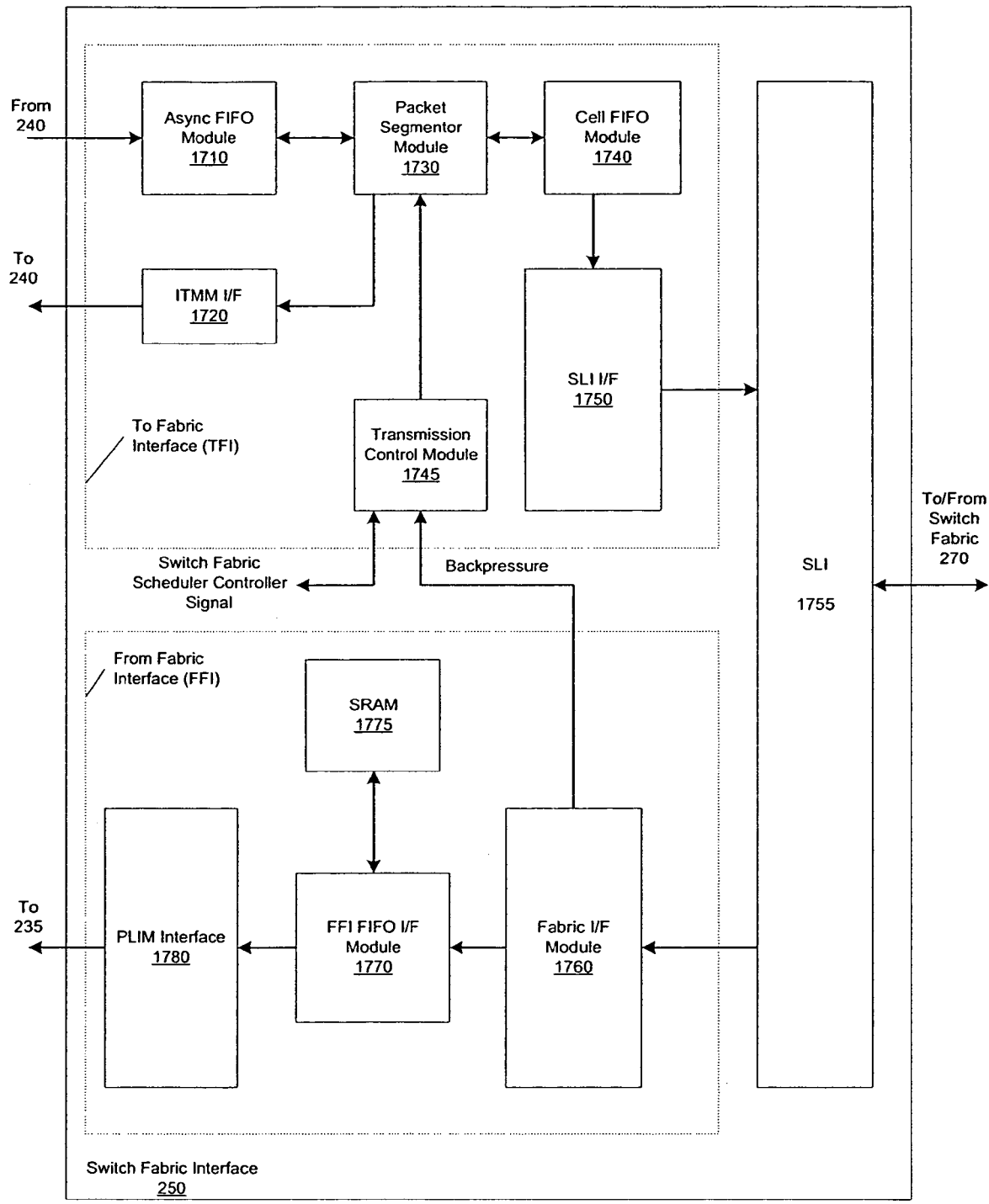
FIG. 17 is a simplified block diagram illustrating a line card switch fabric interface, including modules on the receive data path and the transmit data path, in accord with one embodiment of the present invention.

FIG. 17 is a simplified block diagram of Switch Fabric Interface 250, including modules on the receive data path and the transmit data path, according to one embodiment of the present invention.

Switch Fabric Interface 250 receives packet information from Ingress Traffic Management module 240 in the receive data path. The interface to Ingress Traffic Management module 240 includes two modules in the TFI (To Fabric Interface) section of the Switch Fabric Interface. Packet data is received by Async FIFO module 1710, while ITMM I/F 1720 provides status information for each TFI cell FIFO (to be described more fully below) back to Ingress Traffic Management module 240.

In one embodiment of the present invention, async FIFO module 1710 is configured to receive data from Ingress Traffic Management module 240 and moves data from one clock domain to another clock domain.

Async FIFO module 1710 provides packet data to packet segmentor module 1730, which arranges constituent words of an incoming packet into segments that eventually form a complete switch fabric cell. In one embodiment of the present invention, packet segmentor module 1730 arranges the constituent words of the incoming packet into 52-byte segments to which additional cell header and trailing CRC information can be added (e.g., resulting in a 64-byte switch cell). The buffer header (BHDR) of an incoming packet can be used to store parameters required for the construction of switch cell headers. Such parameters can be stored in a register array, with one entry for each cell FIFO in cell FIFO module 1740. Packet segmentor module 1730 can use a series of data muxes to write the correct byte to the correct word in the cell FIFO memories. As a burst of data is read from async FIFO module 1710, a correct write pointer and byte count for that channel is fetched from a register array. That write pointer can be used to generate a write address for the constituent RAMs of the cell FIFO and the byte count controls selection of the muxes. As discussed above with regard to Ingress Traffic Management module 240, the buffer header can include output queue, port information, and ideal free queue fields. That information can be extracted from the BHDR and be placed appropriately in data written to a cell FIFO. Multicast output mask fields can also be written to a register array and added to outgoing cells. Packet segmentor module 1730 can detect error conditions and cause an interrupt if an error condition is not masked. Error conditions that can be detected by the packet segmentor module can include parity error on data, parity error on command, cell FIFO overflow and underflow, a missing end or start command for a packet from Ingress Traffic Management module 240, packet length errors and output mask errors.

Packet segmentor module 1730 provides the divided up cell data to cell FIFO module 1740. Cell FIFO module 1740 can include a plurality of FIFO memories to store cell data. In one embodiment of the present invention, the cell FIFO module can include 32 unicast FIFOs (16 high priority and 16 low priority) and two multicast FIFOs (one high priority and one low priority). Cell FIFO module 1740 can be implemented using a plurality of instances of a single port SRAM (e.g., 13 instances of a 39-bit×2048-entry single port SRAM, in one embodiment of the present invention). Cell FIFO module 1740 can be configured to provide a "full" indication to packet segmentor module 1730 in order to cause a backpressure signal to be transmitted via Ingress Traffic Management module interface 1720 to Ingress Traffic Management module 240 in order to stop additional data from arriving at the cell FIFOs. Once the cell FIFOs in cell FIFO module 1740 begin to clear, the FIFO "full" indication can be deasserted. FIFO full assertion and deassertion thresholds can be configured to take into account latencies between the cell FIFO memories and switch interfaces 1755 (for a "full" assertion) and cell FIFO memories and the Ingress Traffic Management module (deassertion). Calculation of these latencies can also provide a determination of the necessary memory size of the cell FIFO memories.

Transmission control module 1745 can track a number of requests that need to be sent to a switch fabric scheduler controller and the number of requests sent to the switch fabric scheduler controller but not yet granted. Transmission control module 1745 can have a plurality of sets of counters wherein each set can be composed of two counters: one counting the number of requests needing to be sent to the switch fabric scheduler controller and the other counting the number of requests sent to the switch fabric scheduler controller but not yet granted. The transmission control module can contain as many counters as there are cell FIFOs in cell FIFO module 1740 (e.g., 34 sets of counters in one embodiment of the present invention). A maximum number of outstanding unicast requests and a maximum number of outstanding multicast requests can be programmable values. The switch fabric scheduler controller can allow switch fabric interface 250 to send multiple unicast requests to different line cards in any request per period. For example, a request A could have multiple unicast requests of the same priority to multiple destination line card. Multiple multicast requests can also be generated per cell period, wherein each request has its own destination map. Multicast requests sent to the switch fabric scheduler controller are in the same order as received by switch fabric interface 250, but can be granted out of order when compared to how the switch fabric scheduler controller received the request. Such reordering can allow the switch fabric scheduler controller to optimize switch fabric throughput, but the switch fabric scheduler controller is restricted to not grant cell transmission out of order to the same destination.

Transmission control module 1745 can also receive a backpressure signal from the transmit side of switch fabric interface 250 (the "From Fabric Interface" (FFI)). When any of the FFI's reassembly FIFOs are nearly full (to be discussed more fully below), the FFI can set a backpressure bit which is provided to transmission control module 1745. Backpressure can be asserted on a per FIFO basis, wherein the backpressure signal is provided to a source line card if a corresponding FIFO threshold is exceeded.

SLI interface module 1750 receives cell data from cell FIFO module 1740 and provides that information to SLI module 1755. In one embodiment of the present invention, SLI interface module 1750 can divide each cell across four SLI data paths (and subsequently to four corresponding switch fabric cards), and redundant data can be sent along a fifth SLI data path. Redundant data is sent so that if one of the five switch fabric cards corresponding to SLI module 1755 fails, a cell can be recovered by the destination FFI. A cyclic redundancy check can be generated for each of the four segments of the cell and a fifth cyclic redundancy check result can also be generated by XORing the other four CRCs together. Redundant data sent on the fifth SLI data path can be generated by XORing data being sent along the other four SLI data paths.

SLI module 1755 includes transmit and receive logic corresponding to the transmit and receive data paths on line card 200. SLI module 1755 is responsible for transmitting and receiving data to and from switch fabric 270. In one embodiment, an 8B/10B line encoding is used in SLI module 1755. Data transmitted by SLI module 1755 is provided by SLI interface 1750, while data received by SLI module 1755 is provided to fabric interface module 1760 in the transmit data path portion of switch fabric interface switch module 250. SLI module 1755 can also be configured to loopback data from the TFI data path to the FFI data path (i.e., from the receive side of switch fabric interface 250 to the transmit side of the switch fabric interface). In loopback mode, requests from the TFI transmission controller will be granted (using a basic model of the switch fabric scheduler controller implemented internally to switch fabric interface 250) for a certain number of channels (e.g., 17 logical channels are provided in one embodiment of the present invention).

The switch fabric interface modules discussed above complete the receive data path portion of line card 200. Cells containing portions of packets are provided to switch fabric 270, which transports those cells to an appropriate line card for transmission onto network 1. The transmission data path of line card 200 is discussed below.

IV. Transmit Data Path

The transmit data path of line card 200 provides data from switch fabric 270 to network 1. Data cells arrive at switch fabric interface 250 and are combined into packet headers and tails that are provided to Egress Packet Processor 235. Egress Packet Processor 235 is substantially identical to Ingress Packet Processor 230, but is configured to provide multicast packet replication along with functions described above for Ingress Packet Processor 230. Egress Packet Processor 235 then provides packet heads and tails to Egress Traffic Management module 260, which merges the heads and tails and provides them to bridge 220. The transmit portion of bridge 220 provides a complete packet to SPAs 210, which then formats the packet in an appropriate format for transmission on network 1.

A. Switch Fabric Interface

The transmit data path portion of switch fabric interface 250 includes an additional set of modules beyond those described above for a receive data path. In the transmit data path, switch fabric interface 250 is responsible for transferring data from switch fabric 270 to Egress Packet Processor 235.

SLI module 1755 can receive cell segments from switch fabric 270 and provide those incoming cell segments to fabric interface module 1760. The fabric interface module reconstructs cells from the incoming cell segments and performs sanity checks on the cells. Fabric interface module 1760 includes a cyclic redundancy check (CRC) stage that receives individual datastreams from the SLI module and performs a CRC on each data stream. In one embodiment of the present invention, in any given time period up to four cells can be received, with the last eight bytes of each cell containing CRC information to be checked by the CRC stage. If no more than one of the four data streams is identified as having an incorrect CRC, the CRC stage can reconstruct the cell with the incorrect CRC by performing an XOR function using a redundant datastream received on a fifth SLI datastream, as described above in the receive data path section of switch fabric interface 250. Each time a CRC error is detected, a bit in an CRC error register can be set and a counter incremented. In addition, each time a cell is dropped an appropriate cell drop counter can be incremented.

Fabric interface module 1760 can also include a fabric interface cell FIFO to accumulate complete cells for each cell stream and pass the complete cells to a cell processor. Through such accumulation of cells, a single sequential cell stream can be provided to the cell processor, rather than four separate cell streams. In one embodiment of the present invention, data into the fabric interface cell FIFO is four times 64-bits updated every other clock cycle and data out of the cell FIFO is 1×128-bits updated every clock cycle. It should be noted, therefore, that the input and output clock cycles for the fabric interface cell FIFO do not need to be the same. A control signal can also be propagated through the fabric interface cell FIFO to indicate how many valid cells have been received.

The fabric interface cell processor within fabric interface module 1760 can perform several actions for each cell passing through fabric interface module 1760, these actions can include: checking to see if the current cell is valid; identifying the channel number for the cell from the cell header; checking the sequence number of the current cell; checking for a missing last cell of a packet; extracting and checking the L3 length for a packet (from the first cell of a packet); formatting cell data for writing to the appropriate reassembly FIFO; dropping cells if FFI FIFO interface module 1770 indicates that the FIFO on that channel is full; providing a backpressure signal to a switch fabric scheduler controller if the FIFO is full; and, in the case of multicast only, optionally dropping the packet. Fabric interface module 1760 can also include a fabric interface cell processor that can check incoming cells for errors, strip off redundant information, and route the cells to a correct FIFO. The fabric interface cell processor checks the valid indicator from the fabric interface cell FIFO to determine if the current cell is valid, and if not, no further processing of the cell is performed. The fabric interface cell processor can check the channel number for a current cell and fetch state information for that channel once the information is identified. If a current cell is the first cell of a packet, a sequence number for that packet is saved as part of the state information for the channel. Otherwise, the last sequence number for this channel can be fetched and compared with the current sequence number. If a cell is out of sequence, then state information of this channel is checked to see if this cell is the first ever cell for the packet. If it is the first ever cell, the cell is forwarded to FFI FIFO interface module 1770 with an error indication. All subsequent cells to that channel will be dropped until the next valid first cell indicator (e.g., the next startup packet). After receiving the last cell for a given channel, the next cell for that channel must have its first cell of a packet bit active, and if not active this will result in a sequence error. The fabric interface cell processor provides a different formatting for a cell depending upon whether the cell is the first of a new packet. For a first cell of a packet, a control word is prepended to the cell data before being written to FFI FIFO. This control word can be used by subsequent modules in the FFI and can also be used by transmit path Egress Packet Processor 235. Such a control word can include packet length, queue type (whether a packet is unicast or multicast), port information and source slot information. A control word can also include a "no tail" field that can be set if the calculated packet length is less then a programmable header size (the packet will not be split into a header and tail).

Fabric interface module 1760 passes the cells to FFI FIFO interface module 1770. The FFI FIFO interface module controls read and write accesses to a FFI FIFO which can be implemented as an on-chip SRAM 1775. Individual payloads of cells are written to SRAM 1775 as a packet is reassembled from cells. Once a complete packet is available, PLIM interface module 1780 can read the header of the packet (and eventually the tail) and send that information to Egress Packet Processor 235. Locating SRAM 1775 on chip in switch fabric interface 250 can allow for more freedom in configuration and speed of this memory. In one embodiment of the present invention, SRAM 1775 can be implemented as a single port SRAM configured with 16 unicast and 16 multicast logical FIFOs for each of high and low priority with a total memory requirement of about 2 megabytes. FFI FIFO interface module 1770 can provide both read and write access to SRAM 1775 with read and write access being provided on alternating clock cycles. FFI FIFO interface module 1770 can provide two read pointers, one for tracking headers and the other for tails. When PLIM interface module 1780 detects that there is a packet available, that module can initiate a read of the packet header which will be fetched by the FFI FIFO interface read client. The FFI FIFO interface module can also provide PLIM interface module 1780 with a physical start address of the header so that the PLIM interface module can ultimately present this address with a tail request, thereby efficiently fetching the tail from SRAM 1775. FFI FIFO interface module 1770 can also maintain flags indicating FIFO empty, FIFO full, FIFO "really full" (less than a set amount of space left in the FIFO), and packet available. These flags can be used for providing backpressure signals as well as indicating a data ready condition to PLIM interface module 1780.

PLIM interface module 1780 controls the interface with Egress Packet Processor 235 by feeding the Packet Processor packet headers and packet tails. Egress Packet Processor 235 can provide backpressure signals for unicast, multicast, and tails, thereby requesting and receiving an optimum mix of traffic. PLIM interface module 1780 can include the following sub-modules: an SRAM reader, pre-fetch FIFOs for unicast headers, multicast headers, and tail data, a DDR interface, a PLIM arbiter, and an address/length FIFO.

Once a packet has been completely reassembled in SRAM 1775, FFI FIFO interface module 1770 can provide an appropriate channel indication to PLIM interface module 1780. If there is space in the appropriate head pre-fetch FIFO in PLIM interface module 1780 (either unicast or multicast), then the SRAM reader sub-module of PLIM interface module 1780 can determine which channel to fetch next and will provide the request information to FFI FIFO interface module 1770.

The FFI FIFO interface module can read the entire packet header from SRAM 1775 and transfer it to the appropriate pre-fetch FIFO in PLIM interface module 1780. The process can be repeated if there are more packet headers to fetch and there is space in the pre-fetch FIFOs. During header transfers, the FIFO interface module can also send the packet address which can be later used to locate tail data during tail request. The PLIM arbiter sub-module can constantly monitor backpressure signals from Egress Packet Processor 235 and the availability of data in the pre-fetch buffers. Headers will always have priority, so if there is no backpressure then the PLIM arbiter will read the next packet header from the prefetch buffer and send an appropriate command to the DDR interface sub-module of PLIM interface module 1780 to indicate that a header is being transferred.

As a header is read from the Pre-Fetch FIFO, the header is examined to see if it has an associated tail. The "no tail" indication of the cell control word indicates whether or not a tail is required (as calculated by FFI fabric interface module 1760). If there is an associated tail, the packet address and length of the packet are stored in an address length FIFO sub-module to enable the correct ordering of tails to be sent later.

If there are no new heads to fetch, then the SRAM reader sub-module can fetch some additional tail data to fill up the tail Pre-Fetch buffer. The SRAM reader sub-module can continue to write subsequent data into the tail Pre-Fetch buffer until another header becomes available for writing to the head Pre-Fetch buffer or the tail Pre-Fetch buffer fills. The SRAM reader sub-module can also count the tail data and provide an end-of-packet flag to the tail Pre-Fetch buffer when the appropriate number of bytes have been stored.

The purpose of the SRAM reader sub-module of PLIM interface module 1780 is to keep up of the Pre-Fetch FIFOs full. The SRAM reader can constantly monitor the packet available vector to determine when packets have been completely written to the reassembly memory. If there is a valid packet to read (and space in the appropriate Pre-Fetch FIFO to put that data), the SRAM reader sub-module will initiate a head request for that channel. If there is more than one channel with packets to send, the SRAM reader sub-module can select the next channel number by first performing a round robin selection from the eligible high priority channels. If there are no eligible high priority channels remaining with data, the SRAM reader can perform a round robin selection from the eligible low-priority channels.

There are three Pre-Fetch FIFOs: one for unicast heads, one for multicast heads, and one for tails. These Pre-Fetch FIFOs are used to store previously fetched data from the FFI FIFO. Once a complete header has been written to one of the head Pre-Fetch FIFOs, an appropriate header available signal can be asserted to the PLIM arbiter. When new data is written to any of the Pre-Fetch FIFOs, that data is formatted to allow the PLIM arbiter to read the information and send it across the bus to Egress Packet Processor 235 without having to count bytes. The PLIM arbiter sub-module monitors backpressure signals from Egress Packet Processor 235 to determine whether to send a unicast head, multicast head, or a packet tail.

In an alternative embodiment of PLIM interface module 1780 scheduling of packets can be accomplished by using a packet-by-packet deficit round robin algorithm designed to work with quanta that are fractions of a maximum transmission unit (MTU). By using quanta that can be fractions of an MTU, a possible breakdown of the algorithm due to insufficient buffering space can be avoided. The algorithm can be separately applied to four groups of 16 channels. By such an application, traffic scheduling can be applied to high-priority unicast, high-priority multicast, low-priority unicast and low-priority multicast traffic individually. In this manner, PLIM interface 1780 can respect traffic preferences indicated by Egress Packet Processor 235 without having to reset scheduling history of channels. Channel selection can be visualized as taking place in three stages. In the first stage, one of four parallel modified packet-by-packet deficit round robin selections are made from each of the groups of 16 slots with packets available (in SRAM 1775). In the second stage, two parallel selections are made between unicast and multicast according to a backpressure indication from Egress Packet Processor 235, and in a case where no preference is indicated such a selection can revert to being a round robin. In the final stage, strict priority can be observed between the two selected channels.

Switch fabric interface 250 can provide a datastream of packet headers and tails, differentiated between unicast and multicast, to Egress Packet Processor 235 for further processing. As will be seen below, Egress Packet Processor 235 bears responsibility for replication packet headers for multicast packet replication along with the unicast and multicast packet analysis tasks previously described with regard to the Ingress Packet Processor 230.

B. Egress Packet Processor

Router line card 200 includes two substantially identical Packet Processor modules: Ingress Packet Processor 230 and Egress Packet Processor 235. Egress Packet Processor 235 contains all of the modules, pipes, and stages described above for Ingress Packet Processor 230, the functional description of which will not be repeated here. Egress Packet Processor 235 receives packet headers and tails from switch fabric interface 250, which provides regulated quantities of unicast and multicast packets. Such regulation can be determined through a backpressure mechanism provided by Egress Packet Processor 235. A principle difference between Egress Packet Processor 235 and Ingress Packet Processor 230 is that the Egress Packet Processor bears responsibility for multicast packet replication.

Egress Packet Processor 235 is illustrated in FIGS. 4A and 4B, as was Ingress Packet Processor 230. Egress Packet Processor 235 utilizes a packet recycling mechanism (illustrated by data path 585 from Gather stage 576 to Fetch stage 512 in FIG. 5) that enables a packet to be processed more than once by HPU 410 for header replication in processing multicast packet headers. Such replication is performed by sending a packet header on the recycle path back to Fetch stage 512 of the same tiny pipe, while at the same time sending the packet header to BMI 430 which can then transmit the packet header and the tail to Egress Traffic Management module 260. The recycle path will be to the Fetch stage of the same HPU tiny pipe through which the packet header initially passed.

TLU stage 534 fetches the appropriate L2 encapsulation information for the packet header. Such encapsulation is performed for both unicast and multicast packets and the encapsulation can reside in forwarding database 420. Such information can be read and written by TLU stage 534 to the packet's PHB. Ultimately, the Gather stage will prepend the appropriate encapsulation information to the packet. It is possible for any intermediate stages to make changes to the encapsulation information prior to the Gather stage. For multicast packets, a field containing information regarding the specific replica of the multicast packet header is provided in the buffer header. This field can be a pointer for the TLU lookup. In one embodiment, the data structure of this field can be built as a linked list so that part of the data written by TLU stage 534 to a packet header's PHB is a pointer to the next replica data. Gather stage 576 can replace this field in the BHDR with a new field.

Gather stage 576 then reconstructs the header along with the new L2 encapsulation. When this gather process is performed for a multicast packet, L2 information is resolved for each replication. The CAMP blocks (Pre-CAM2 554, CAM- and Match 556 and Post-CAM 572) and PoP 574 can also use the modified L2 information for packet classification.

A unique association identifier (e.g., one of a set of values) can be linked to all multicast replicas of a header. The same unique association identifier will be passed along with each replica header to Egress Traffic Management module 260 in order to match the header with its appropriate tail, which will have a corresponding unique association identifier. A tail of a multicast packet is transmitted to Egress Traffic Management module 260 only one time, and the unique association identifier is the key to match all the header replications with the correct tail.

In one embodiment of the present invention, Pre-Fetch module 405 maintains the unique association identifiers. When a new multicast packet enters Egress Packet Processor 235, Pre-Fetch module 405 allocates a new unique number and moves that number from a bank of available numbers. Once the last replica of a packet has passed through HPU 410, Pre-Fetch module 405 can be informed and Pre-Fetch will release the unique association identifier back to the bank of available numbers. In one embodiment of the present invention, the unique association identifiers can be described with 6-bit words since Egress Packet Processor 235 can handle at most 48 multicast headers at the same time.

Pre-Fetch module 405 can also provide a sequence indicator, such as a time stamp, to every new header entering Egress Packet Processor 235; such sequence indicators are consecutive. BMI module 430 uses the sequence indicator, which resides in the PHB, as a pointer to a header FIFO, thus keeping the order of headers when recycling packets. When replicating headers, each replica is sent to the BMI stage as well as to the Fetch stage, so a new sequence indicator is provided for each replica. Fetch stage 512 checks the header to determine whether the header is a unicast recycle or dummy multicast header (described below), which keep the old sequence indicator, or a multicast replica header that needs a new sequence indicator. The new sequence indicator is provided by Pre-Fetch module 405, thereby synchronizing sequence indicators among the four HPU tiny pipes.

Egress Packet Processor 235 can also provide a backpressure to switch fabric interface 250. For optimal flow through the Egress Packet Processor, it is important to control the flow of unicast and multicast packets. A burst of multicast packets can break the equilibrium between unicast and multicast flow. This is because recycle path 585 has priority within Fetch stage 512 and therefore recycled multicast packet headers will block new packet headers from entering a tiny pipe. If HPU 410 is occupied with multicast packets, which are being recycled, unicast packets can be starved for a relatively long period. Therefore, switch fabric interface 250 is backpressured according to the percentage of the HPU's total header capacity being occupied with multicast headers.

In one embodiment of the present invention, Pre-Fetch module 405 can include two configurable registers: one to control the average number of multicast packets allowed into HPU 410 and the second to control the peak number of multicast packets allowed into HPU 410. These values are used as thresholds to the backpressure mechanism. Pre-Fetch module 405 can also maintain a counter counting the multicast headers entering HPU 410 by incrementing the counter each time a new multicast header enters Pre-Fetch and decrementing the counter when PoP stage 574 indicates a last replication of the counter. If the counter is less than the average multicast threshold register, then switch fabric interface 250 can send both unicast and multicast packets, if available. In one embodiment, the switch fabric interface can round robin between unicast and multicast. When the counter is between the average and peak multicast threshold register values, Egress Packet Processor 235 will indicate a priority for unicast packets but can still take on a multicast packet if no unicast packets are available. When the counter exceeds the peak threshold register value, Egress Packet Processor 235 backpressures switch fabric interface 250 for multicast, thereby only allowing unicast packets to be provided to Egress Packet Processor 235. In order to prevent starvation of unicast packets, as in the case of a multicast burst, the value of the peak number of multicast headers should be kept lower than the maximum number of multicast headers that can be handled by Egress Packet Processor 235 (e.g., one embodiment of the present invention can handle a maximum of 48 multicast packets at one time).

Egress Packet Processor 235 can be in turn backpressured by Egress Traffic Management module 260. Typically, when FIFOs in BMI 430 become full, the BMI module backpressures Pre-Fetch module 405, but if the HPU has one or more multicast packets with many replications, an BMI FIFO can overflow. To avoid this, multicast packets can be allowed to recycle without being processed and without being written to the BMI. When the FIFO drops below its full threshold, processing on the headers can continue.

During recycle, a recycled header blocks younger headers in the header FIFO of BMI 430 and the FIFO begins to fill. A backpressure signal can be sent by the header FIFO to stop overflow. Fetch stage 512 can receive the backpressure signal and stop new packets from being sent by Pre-Fetch module 405 and generation of new multicast replication. In order to maintain order between different multicast replication streams in different tiny pipes, "dummy" multicast headers can be passed through the tiny pipe stages until the backpressure is deasserted. As long as backpressure is asserted, the dummy packet headers will not receive new time stamps from Pre-Fetch module 405. Dummy packet headers can be created by setting a dummy field in a PAIR register associated with the packet.

Egress Packet Processor 235 interfaces to Egress Traffic Management module 260 through BMI 430. In one embodiment of the present invention, transfers from Egress Packet Processor 235 to Egress Traffic Management module 260 are 64-bit words for headers and tails. Egress Packet Processor 235 is the master of the data bus to Egress Traffic Management module, and thereby decides the type of data to be transferred on that bus (header or tail). Such a decision is based on the Egress Traffic Management module being ready to receive relevant data, with headers having priority over tails. As stated above, additional information about multicast headers are sent from the Egress Packet Processor to the Egress Traffic Management module in the buffer header. Such information can include the unique association identifier, an identification of the first replication of a multicast header, the last replication of the multicast header, and a unicast/multicast indicator. In turn, Egress Traffic Management module 260 can inform the Egress Packet Processor 235 that the Egress Traffic Management module is running out of available multicast counters and requesting the Egress Packet Processor to backpressure multicast headers.

C. Egress Traffic Management Module

Egress Traffic Management module 260 is responsible for receiving packet headers and tails from the Egress Packet Processor, reassembling those packet headers and tails into packets, storing the packets in FCRAM queues, and sending each packet to the transmit portion of bridge 220 in the form of whole packets. In one embodiment of the present invention, the Egress Traffic Management module can support up to 8,000 output queues and up to 4,000 ports, with a many-to-one mapping between ports in the Egress Traffic Management module and physical Layer 2 ports to the network. Each port can have one high-priority queue and a number of low-priority queues. Egress Traffic Management module 260 shares common sub-modules with Ingress Traffic Management module 240. The Egress Traffic Management module can handle both unicast and multicast flows. Multicast flows are received from Egress Packet Processor 235 and are identified as multicast flow and stored in the FCRAM memory. A first header replication is stored along with the tail of the multicast packets in one memory location, and each subsequent header replication is stored individually (without the tail data). The tail data is kept in the memory until all header replications are read out of the FCRAM and sent to bridge 220.

Figure 18A:
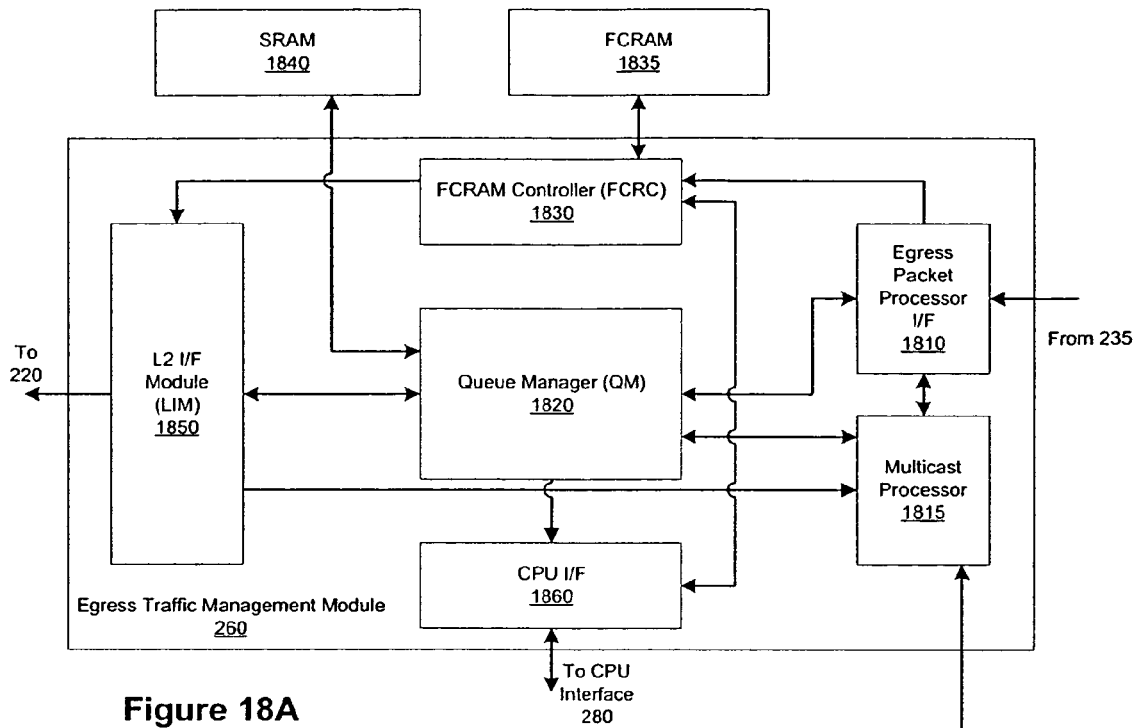
FIG. 18A is a simplified block diagram illustrating a line card egress traffic management module in accord with one embodiment of the present invention.

FIG. 18A is a simplified block diagram illustrating one embodiment of Egress Traffic Management module 260. Major functional modules in the data path of Egress Traffic Management module 260 are Egress Packet Processor Interface 1810 and Multicast Processor 1815, QM 1820, ECRAM Controller (FCRC) 1830, L2 Interface Module (LIM) 1850, and CPU Interface 1860. Coupled to the Egress Traffic Management module 260 are external memories FCRAM 1835 (coupled to FCRC 1830) and SRAM 1840 (coupled to QM 1820).

A queuing operation of Egress Traffic Management module 260 is similar to that of Ingress Traffic Management module 240. Egress Traffic Management module 260 supports two types of queues: low queues (free queues+raw queues) and output queues (that can be arbitrarily mapped to ports as long as all the queues mapped to a given port are contiguous [e.g., up to 8,000 output queues are supported in one embodiment of the present invention]).

A packet passing through Egress Traffic Management module 260 can experience the following sequence of events. A packet can be received by Egress Packet Processor interface module 1810. Egress Packet Processor interface 1810 can check an ideal free queue field in the packet header to determine the size of a buffer required to store the packet plus all associated header information. Egress Packet Processor interface 1810 can then submit a "low queue dequeue" request to QM 1820, providing the ideal free queue information. QM 1820 can then read the appropriate low queue head-tail-length (HTL) memory for the free queue specified, which can contain the address in SRAM 1840 of the first element in the free queue of the correct size. QM 1820 can then determine the location in FCRAM 1835 where the packet can be stored from information in SRAM 1840. The information received from SRAM 1840 is called queue element (QE) data. The QE for the referenced free queue will be removed from the free queue list by QM 1820. QM 1820 can then return the beginning address and QE number of the address in FCRAM 1835 in which to store the packet information to Egress Packet Processor interface 1810.

Egress Packet Processor interface 1810 can then request FCRC 1830 to write the packet information to the appropriate location within FCRAM 1835. It can take multiple transactions between Egress Packet Processor interface 1810 and FCRC 1830 before a packet is completely stored in FCRAM 1835.

Upon completing the writing of the packet to FCRAM 1835, Egress Packet Processor interface 1810 can make an output queue enqueue request to QM 1820, to enqueue the packet buffer onto the output queue as specified in an output queue field of the packet header. Along with that request, the Egress Packet Processor interface will provide the QE number for the buffer now containing the packet. QM 1820 will then read an appropriate HTL memory for the requested output queue, the tail of which will point to the last element in the output queue linked-list. The QM can then add the QE provided by Egress Packet Processor interface 1810 to the linked-list, thereby placing the QE at the end of the output queue linked-list. QM 1820 can then acknowledge the output queue enqueue request to Egress Packet Processor interface 1810.

Layer 2 interface module (LIM) 1850 functions to keep egress FIFOs in bridge 220 full and a packet FIFO within the LIM full. As the LIM's FIFO empties due to data transfer, the LIM will request more data. LIM 1850 requests more data by providing a dequeue request from an output queue that is selected by a port queue scheduler within QM 1820. The QM can perform a dequeue operation, removing a QE from the beginning of a selected output queue linked-list and giving it to LIM 1850. The LIM can then request a read from FCRC 1830 by passing to the FCRC an address of the dequeued buffer. The LIM then reads the packet data from the FCRAM into an internal FIFO (again possibly taking multiple transactions between the FCRC and the LIM). When LIM 1850 has completely read a packet from FCRAM 1835, the LIM can perform a low queue enqueue to return the QE and its respective buffer onto the tail of the free queue, ready to be used again.

As with Ingress Traffic Management module 240, QM 1820 in the Egress Traffic Management module is designed such that the Egress Packet Processor interface, LIM, and CPU interface module are clients of QM 1820. The clients request enqueue and dequeue operations to the various queues asynchronously to each other. QM 1820 arbitrates among the clients for servicing, and internally arbitrates for access to SRAM 1840. QM 1820 forms the heart of Egress Traffic Management module 260. QM 1820 can perform functions including: enqueue and dequeue functions by manipulating queue elements in external SRAM 1840 and internal HTL pointers; weighted random early detection (WRED); selection of output queues; managing bandwidth for the output queues; mapping output queues to port; and, arbitrating for access between internal enqueue and dequeue state machines. QM 1820 further manages scheduling between ports in addition to queues. In one embodiment of the present invention, the Egress Traffic Management module can support up to 4,000 ports that can have 8,000 queues flexibly matched to those ports. Each port can have a leaky-bucket mechanism to control a maximum bandwidth sent on that port. Each port can have one queue designated optionally as a high-priority queue for that port.

In addition, ports can be optionally paired with one being designated as a high-priority port and the other a low-priority port. In such a configuration, traffic from both the high and low priority ports are used to update a single maximum bandwidth leaky bucket. Service to the high priority port is not stopped if the leaky bucket goes negative (an indication of the configured bandwidth limit having been met), but the low priority port is stopped in the usual manner. Such a high/low priority configuration can be used, for example, where a number of such ports are used as sub-interfaces (e.g., VLANs) on a larger aggregate physical port (e.g., a gigabit ethernet channel). Each VLAN (or customer) can have one designated pair of high and low priority ports. If the physical interface becomes congested, then high priority port traffic can continue to be transmitted, with the low priority port traffic being transmitted as bandwidth is available. Such a high priority propagation (HPP) scheme can be used, for example, to ensure quality of service provision.

Queues can have mechanisms to guarantee that the queue receives a minimum provisioned bandwidth (a minimum bandwidth leaky bucket), to guarantee the queue will not exceed the maximum configured bandwidth (maximum bandwidth leaky bucket), and a deficit round robin quantum to support different classes of services among the queues. As with the ingress direction, the leaky bucket mechanism can be implemented to deducted packet length from the leaky bucket. The packet length used in any of the port or queue schedulers can either be an L3 length of the packet or can be adjusted to account for additional L2 information that will be added to the packet before transmission from the SPAs.

QM 1820 provides a port scheduler that can select queues using a round robin scheme. The port scheduler can make a queuing determination in light of criteria such as a per-port backpressure from bridge 220, a port not exceeding its maximum configured bandwidth, at least one of the queues associated with a port not being empty, and at least one of the non-empty queues associated with a port not exceeding a maximum bandwidth.

QM 1820 can also provide a queue scheduler responsible for selecting a next queue from all queues associated with a port selected by the port scheduler. Once the queue scheduler selects the queue, the packet can be sent from that queue. Subsequently, the port scheduler can select another, or the same, port and the queue scheduler can select a new (or the same) queue. The queue scheduler can be configured to select the high-priority queue for a selected port, if such a high-priority queue exists, or else the queue scheduler can round robin among the non-high-priority queues provided that at least one non-high-priority queue has not reached it minimum guaranteed bandwidth. Once all the non-high-priority queues have satisfied their minimum guaranteed bandwidth, then the queue scheduler uses a DRR algorithm to allocate the excess bandwidth between all the queues that have not reached their maximum configured bandwidth.

QM 1820 performs a function similar to that of the QM in Ingress Traffic Management module 240. QM 1820 responds to enqueue and dequeue requests from the client modules of Egress Traffic Management module 260. A set of linked-list of queues is maintained to which queue elements representing data buffers in FCRAM 1835 can be added or removed from. Output queue enqueue commands are processed using WRED that can help control the latency of queues by randomly dropping packets with increased probability as the average depth of a queue increases. Output queue dequeue commands are processed using a deficit round robin technique. Low queue enqueue and dequeue commands can be handled in the sequence in which they are received. The linked-list manager's basic responsibility is to manage and maintain queue structures of QM 1820. In order to accomplish this task, QM accesses all of the necessary internal memories used to implement the queues of the system. Queues are logically constructed as a linked list of queue elements. Every queue in the system contains an entry in an internal memory that is responsible for indicating which queue element is at the front, or head, of the queue, which element is at the end, or tail of the queue, as well as the length of the queue. These are the HTL (head-tail-length) memories of the system. For each of the output queues and the low queues, there is a single HTL structure containing as many entries as queues of that type. For every queue, the QM 1820 is responsible for maintaining and updating the complete HTL entry with valid information in addition, every queue element of the system can be associated with a single entry in SRAM 1840. For every queue element, the corresponding entry in the SRAM contains needed information about the queue element.

Egress Packet Processor interface 1810 provides the interface to Egress Packet Processor 235 for egress traffic management module. The Egress Packet Processor interface reassembles header and tail sections of packets received from the Egress Packet Processor and can write those reassembled packets to a packet memory in FCRAM 1835 via FCRC 1830. If header and tails FIFOs within Egress Packet Processor interface module 1810 become nearly full, the Egress Packet Processor interface module can assert backpressure to Egress Packet Processor 235. To obtain a buffer in packet memory (FCRAM 1835), the Egress Packet Processor interface module can perform a dequeue request from one of the free queues managed by QM 1820. When a packet is completely written to memory, Egress Packet Processor interface module 1810 enqueues the packet onto the output queue to which it is destined. Egress Packet Processor interface module 1810 works with multicast processor module 1815 to manage accounting of packet buffers for multicast packets.

In one embodiment of the present invention, a packet header is typically the first 128 bytes of a packet, while the remaining portion of a packet is the tail. For packets of a size less than a header transfer size, the complete packet data is transferred as a header. Egress Packet Processor 235 appends L2 encapsulation to unicast packets, which is always added to the header, resulting in a header size received by Egress Packet Processor interface 1810 being larger than the header size received by the Egress Packet Processor. In one embodiment of the present invention, the maximum header size supported by the Egress Packet Processor interface is 1,024 bytes.

Egress Packet Processor interface module 1810 can also drop a unicast packet if QM 1820 cannot allocate a buffer for the packet. Queue Manger 1820 can provide a zero value for the beginning address of the buffer which becomes the location that Egress Packet Processor interface 1810 writes dropped packets. In other words, the Egress Packet Processor interface does not treat dropped packets any differently from another packets, but will write a dropped packet to a drop area of memory. Multicast packets cannot be dropped in this manner and will be discussed below.

Multicast processor 1815 works with Egress Packet Processor interface 1810 to manage packet buffers for multicast packets. The multicast processor has responsibility for accounting for packet buffers from multicast replication, with the actual replication of packet headers performed by Egress Packet Processor 235, as discussed above. Egress Packet Processor 235 sends both a header and a tail for the first replication of a multicast packet. For subsequent replications, only headers are transmitted from the Egress Packet Processor to the Egress Traffic Management module. The first multicast replication can be written in its entirety into FCRAM 1835 and multicast processor 1815 retains a pointer to the address of the memory location of the beginning of the tail. When subsequent headers associated with the multicast tail arrive at Egress Packet Processor interface 1810, multicast processor 1815 associates those headers with the original packet using the unique association identifier in the packet's buffer header. As Egress Packet Processor interface 1810 enqueues these subsequent headers to QM 1820, the tail memory location is provided so that LIM 1850 can reassemble the packet. The multicast processor can maintain an internal table allowing the multicast processor to lookup tail addresses based on unique association identifiers.

Since each replication of a multicast packet requires the first instance of the packet to remain in packet memory (in order for the tail data to be obtained), LIM 1850 cannot return a queue element for the first instance's packet buffer when the first instance is transmitted. Responsibility for returning the packet buffer of the first instance lies with multicast processor 1815, which can wait until all replications of the packet have been transmitted or dropped until returning the packet buffer. This can be accomplished by maintaining a counter of how many replications are outstanding and having that counter decremented by the multicast processor each time a replication is transmitted or dropped. After the last replication of a packet has been transmitted, the multicast processor can signal to QM 1820 to return the queue element to the free queue.

In one embodiment of the present invention, Egress Packet Processor interface 1810 and multicast processor 1815 can process up to 64 concurrent multicast packets from Egress Packet Processor 235 with each packet having up to 8,191 replications, as limited by the width of a multicast count in a counter table. Egress Traffic Management module 260 can offer up to 16,384 simultaneous different multicast packets, as limited by the size of a multicast counter table.

Multicast processor 1815 tracks the number of unused multicast counters that are available. If this number passes below a programmable threshold, Egress Packet Processor interface 1810 provides a backpressure signal to Egress Packet Processor 235; the Egress Packet Processor will then stop accepting new multicast packets from switch fabric interface 250. Such a threshold can be set to allow for new multicast packets arriving at the Egress Traffic Management module during the time for the backpressure indication to arrive at and be acted upon by Egress Packet Processor 235 and switch fabric interface 250.

Multicast processor 1815 also can assist Egress Packet Processor interface module 1810 with multicast packet dropping. If the Egress Packet Processor interface module receives a non-acknowledgement from QM on a free queue dequeue request, then the multicast processor will not allocate a counter and not mark an association with the multicast packet as active. Then when subsequent replications are received, the Egress Packet Processor interface can attempt to perform an increment, but will receive a non-acknowledgement by the multicast processor since the association is not active. This can then cause the Egress Packet Processor interface to drop the replication by enqueueing a queue element back to its free queue. Similarly, if the multicast processor is out of counters, a non-acknowledgement can be sent to the Egress Packet Processor interface, and the multicast association will remain inactive. Once again, as replication headers arrive they will be dropped because of the inactive association. The Egress Packet Processor interface module and multicast processor can also perform multicast packet drops if free queue space is not available for subsequent replications by dropping the particular replication and incrementing the counter.

Layer 2 Interface module (LIM) 1850 dequeues packets from QM 1820, reads the packets out of packet memory FCRAM 1835, and transmits the packets to bridge 220. The LIM can also be configured to support special case packets (e.g., fragmentation) as well as providing multicast support.

Figure 18B:
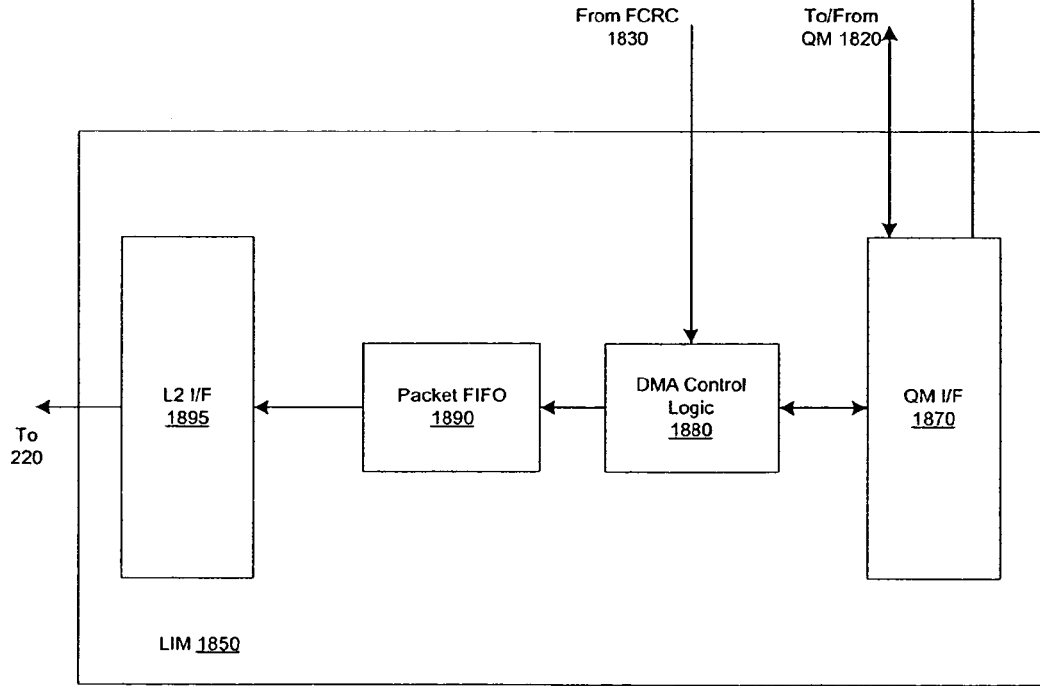
FIG. 18B is a simplified block diagram illustrating an egress traffic management module Layer 2 interface module (LIM) in accord with one embodiment of the present invention.

FIG. 18B is a simplified block diagram illustrating modules in a data path of LIM 1850, according to one embodiment of the present invention. For fast path unicast packets (unicast packets with L2 encapsulation prepended by Egress Packet Processor 235) the LIM process is as follows. A dequeue request is made to QM 1820 by QM Interface module 1870 when the QM indicates to the LIM that packets are available. QM 1820 decides the port and queue from which the packet will be dequeued. The QM returns to the QM Interface module information related to port number, whether the packet is a high-priority packet, buffer address within FCRAM 1835, start offset from the base address where packet data is located, and L2 encapsulation field, packet length, and multicast fields (not used for unicast packets). QM interface module 1870 then can send the appropriate data to DMA Control logic 1880.

DMA Control logic 1880 performs one or more requests to FCRC 1830 to get necessary data for packet transmission. Once a DMA read request has been acknowledged by the FCRC, the requested data can come several cycles later. The read request information is therefore written to a DMA request FIFO for later access. DMA Control logic 1880 can also provide packet information to a packet information FIFO. The DMA Control logic can also track the space available to write packet data into Packet FIFO 1890, and once a threshold has been reached the DMA Control logic can cease issuing requests until the Packet FIFO level drops below the programmable threshold.

DMA Control logic 1880 receives the packet data from FCRC 1830. Additional fields can be accessed from the packet buffer header once the packet data is written into Packet FIFO 1890. Such information can include return queue, free queue, queue element, and multicast counter field. All data after the start offset of the packet can be written to Packet FIFO 1890. Once the packet data is completely written into Packet FIFO 1890, QM Interface module 1870 can attempt to re-enqueue the packet to the return queue.

DMA Control logic 1880 can start sending the packet out through L2 Interface 1895 once some of the packet data is in the Packet FIFO. The DMA Control logic generates a channel/length control word and sends that word to the L2 Interface. Such a word can contain length of the data being transmitted, port number, and indicia of multicast, high-priority, etc., packet type. L2 Interface logic 1895 reads packet information from the packet information FIFO.

LIM 1850 can also process special case packets such as those requiring fragmentation, encapsulation support, and multicast. Packets requiring fragmentation can be sent to processor 284 to perform work needed to adjust start offset and L2/L3 length for each fragment. The fragments, each a separate packet with the same header, are enqueued to an appropriate output queue by processor 284 writing through CPU Interface module 1860. The first fragment can be handled by the LIM as a standard packet. Successive packets require additional attention because start offset values are larger than the maximum packet size. For such fragmented packets, a first request to FCRAM 1835 will be a read sufficient to get buffer header information. A second request can be generated for an address that adds the start offset to the beginning address of the packet data. That fragment data can be aligned into Packet FIFO 1890 in the same manner as a non-fragment packet, and from that point on the process is the same as that for a non-fragment packet.

LIM 1850 can also prepend L2 encapsulations to packets from the CPU. The LIM examines an output info field of a packet to determine whether or not to prepend encapsulation. If the output info field is non-zero, the LIM decodes the output info field to determine what encapsulation to prepend.

LIM 1850 is further responsible for transmitting replicated multicast packets to bridge 220. For a packet in which a multicast bit is set and there is tail data, DMA Control Logic 1880 requests a read of both the header and the tail of the multicast packet. If there is no tail data, the packet will be treated by DMA Control logic as a unicast fast path packet. The LIM is responsible for determining header and tail lengths of a multicast packet in preparation for transmitting multicast replicas. Multicast packet transmission deviates from normal operation when it is time to re-enqueue a multicast packet to the free queue. Generally, multicast packets are re-enqueued to the free queue like unicast packets. However, there is an exception when dealing with a first multicast packet including tail data. The first multicast packet contains tail data for all subsequent replications, therefore the buffer containing this packet information cannot be returned to the free queue until all replications have been sent to bridge 220. Multicast processor 1815 is responsible for maintaining replication counters, and is therefore responsible for re-enqueueing the buffer containing the first multicast packet to the free queue. LIM 1850 can indicate to multicast processor 1815 when a multicast packet has been sent so that that multicast processor can update replication counters.

Egress Traffic Management module 260 gathers the packet information transmitted by Egress Packet Processor 235 and prepares packets for egress from line card 200 through bridge 220.

D. Bridge (Transmit)

Egress Traffic Management module 260 sends packets to be transmitted out on to network 1 to bridge 220 in preparation for providing those packets to shared port adapters 210. The transmit section of bridge 220 is structurally similar to that of the receive section of bridge 220, and can share common modules such as physical layer interface modules.

Figure 19:
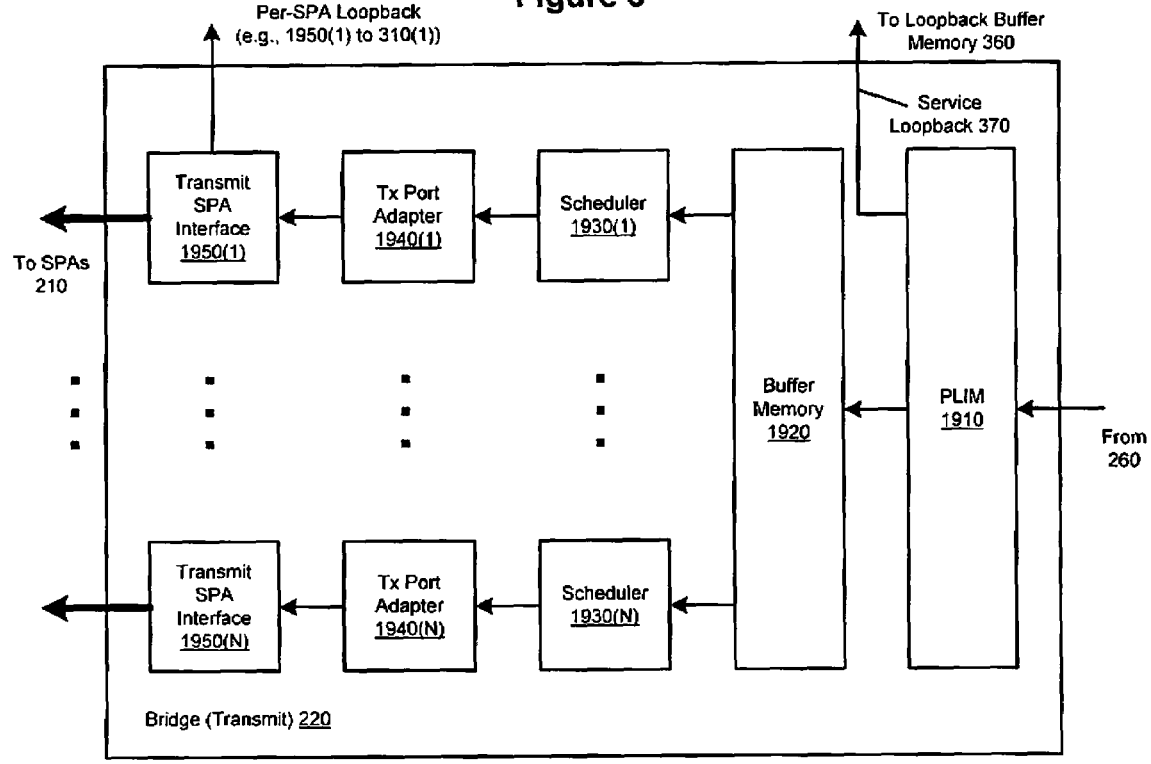
FIG. 19 is a simplified block diagram illustrating a transmit portion of a line card bridge in accord with one embodiment of the present invention.

FIG. 19 is a simplified block diagram illustrating modules within the transmit section of bridge 220, according to one embodiment of the present invention. Bridge 220 receives full packets from Egress Traffic Management module 260 on PLIM 1910. Packets are transferred from PLIM 1910 into Buffer Memory 1920. In one embodiment of the present invention, Buffer Memory 1920 comprises two megabytes of DRAM with a maximum of 64 buffers supported and a fixed size of 32 kilobytes for each egress buffer. A per-buffer backpressure signal can be provided to Egress Traffic Management module 260 in the event that a programmable threshold is exceeded on Buffer Memory 1920. Buffers are assigned based on a packet's port number, as provided by the Egress Traffic Management module, and the packet will be written in that buffer. Typically, there are more ports than buffers and therefore multiple ports can map into one buffer.

Once a packet is entirely written into a buffer, that buffer is eligible to be read out to a corresponding shared port adapter for the port. Schedulers 1930(1)-(N) select a buffer to read based on calendaring of transmit SPA interface modules 1950(1)-(N) and the fill level of the receiving FIFO in the corresponding shared port adapter. Once a buffer is selected, a portion of the packet is sent on an SPA bus to the corresponding shared port adapter. Portions of packets of different channels can be interleaved on the SPA bus.

Bridge 220 can use a hard backpressure to Egress Traffic Management module 260 when the bridge temporarily falls behind (e.g., because of an DRAM refresh cycle). Hard backpressures due to a full egress FIFO can result in an interrupt and optionally halt bridge 220 since an egress FIFO full situation means that the soft backpressure scheme did not function as intended. A soft backpressure threshold for a buffer can be adjusted to effectively reduce the size of that buffer and thereby reduce jitter. If any of the DRAM buffers fill level exceeds a threshold indicating that the buffer is about to overflow, the hard backpressure is asserted to the Egress Traffic Management module and bridge 220 can be configured to halt, again as this scenario should never happen if properly configured.

Bridge 220 can also count a number of multicast packets and number of multicast bytes per port.

As discussed above for FIG. 3, Bridge 220 can also support an internal loop back from a transmit SPA interface module to a receive SPA interface module for each SPA interface module. Such a loop back is not per channel; that is, once enabled all traffic to that SPA is looped back. Bridge 220 can also support an internal Service Loopback 370 from certain channels of the transmit PLIM to the receive PLIM via a loopback buffer memory 360. Such a loop back can be used as a loop back for services (e.g., packets requiring additional processing services not available on line card 200). Bridge 220 will translate a full packet into a head-tail protocol for the receive path.

As discussed above with regard to the receive section of bridge 220, the SPA interface modules communicate with the shared port adapters using a system packet interface protocol such as SPI 4.2. The shared port adapters can then receive egress packets from bridge 220 and process the egress packets, formatting the packets appropriately for the hardware and network protocols for network 1. The shared port adapter 210 can then transmit the outgoing packets on hardware interfaces coupled to network 1.

V. Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. An apparatus for switching packets, each packet having a header and a corresponding tail, the apparatus comprising:
  a header processing pipeline comprising a plurality of pipeline stage circuits connected in a sequence, wherein the plurality of pipeline stage circuits comprises at least a fetch stage circuit and a gather stage circuit;
  an input buffer configured to receive a multicast packet header from a switch fabric interface queue;
  sequence number logic configured to associate a first sequence number with the multicast packet header; and a recycle path coupling the gather stage circuit and the fetch stage circuit, wherein the fetch stage circuit is configured to
provide the multicast packet header and first sequence number to a subsequent stage circuit in the header processing pipeline, and
the gather stage circuit is configured to
output the first sequence number and a modified multicast packet header corresponding to the multicast packet header, and
provide a multicast packet header replica to the fetch stage circuit via the recycle path, the multicast packet header replica being a replica of the multicast packet header.

2. The apparatus of claim 1, wherein:
the fetch stage circuit further comprises
a state machine configured to select an input from one of the input buffer and the recycle path,
sequence request logic coupled to the sequence number logic wherein the sequence request logic is configured to request a second sequence number to associate with the multicast packet header replica, wherein
the fetch stage circuit is further configured to provide the multicast packet header replica and the second sequence number to a subsequent stage circuit in the header processing pipeline; and
the gather stage circuit is further configured to output the second sequence number and a modified multicast packet header replica corresponding to the multicast packet header replica.

3. The apparatus of claim 2, wherein
the sequence request logic is further configured to request the second sequence number upon a determination that a recycled packet header is the multicast packet header replica.

4. The apparatus of claim 1, wherein the header processing pipeline further comprises:
a stage circuit comprising recycle logic configured to set a recycle indication if the multicast packet header should be recycled.

5. The apparatus of claim 4, wherein the stage circuit comprising recycle logic is a microsequencer coupled to an instruction memory, wherein
the instruction memory is configured to store a first set of instructions, executable by the microsequencer, configured to set a recycle bit associated with the multicast packet header in response to a determination that the multicast packet header should be recycled.

6. The apparatus of claim 4, wherein the recycle logic is further configured to analyze multicast packet header type and previous recycle information associated with the multicast packet, if any.

7. The apparatus of claim 1, further comprising:
a counter configured to count a number of multicast packet headers and recycled multicast packet headers concurrently processed by the header processing pipeline; and
backpressure logic responsive to the counter and configured to provide a backpressure signal to the switch fabric interface queue.

8. The apparatus of claim 7, further comprising:
a first configurable register; and
a second configurable register, wherein
the first configurable register is configured to store a first threshold value comprising a defined average number of multicast packet headers and multicast packet header replicas to be concurrently processed by the header processing pipeline, and
the second configurable register is configured to store a second threshold value comprising a defined peak number of multicast packet headers and multicast packet header replicas to be concurrently processed by the header processing pipeline.

9. The apparatus of claim 8, wherein the backpressure logic is further configured to:
provide no backpressure signal to the switch fabric interface queue if the counter value is less than the first threshold value;
provide a first backpressure signal to the switch fabric interface queue if the counter value is greater than the first threshold value and less than the second threshold value; and
provide a second backpressure signal to the switch fabric interface queue if the counter value is greater than the second threshold value.

10. The apparatus of claim 9, wherein:
the first backpressure signal comprises a signal to the switch fabric interface queue to supply a next multicast packet header only if there are no unicast packet headers in a queue configured to supply unicast packet headers; and
the second backpressure signal comprises a signal to the switch fabric interface queue configured to supply no multicast packet headers.

11. The apparatus of claim 1, further comprising:
a pre-fetch module, coupled to the header processing pipeline and the switch fabric interface queue, comprising:
the input buffer configured to receive the multicast packet header,
the sequence number logic,
a tail input buffer configured to receive a multicast packet tail corresponding to the multicast packet header,
identifier logic configured to associate an associated identifier with the multicast packet header and the multicast packet tail, and
wherein the pre-fetch module is configured to
output the multicast packet tail and the associated identifier, and
provide the multicast packet header, the first sequence number and the associated identifier to the header processing pipeline.

12. The apparatus of claim 11, further comprising:
an egress traffic management module, coupled to the header processing pipeline, comprising
an output tail buffer configured to receive the multicast packet tail,
one or more output header buffers configured to receive the modified multicast packet header and any modified multicast packet header replicas corresponding to the multicast packet header, and
wherein the egress traffic management module is configured to associate the multicast packet tail with each modified multicast packet header and modified multicast packet header replica having an associated identifier that matches the associated identifier of the multicast packet tail.

13. The apparatus of claim 11, further comprising:
a header processing unit comprising a first plurality of header processing pipelines, wherein
the first plurality of header processing pipelines comprises the header processing pipeline, and
the pre-fetch module further comprises
a second plurality of input buffers configured to receive multicast packet headers, and a buffer distributor coupled to the first plurality of header processing pipelines and the second plurality of input buffers and configured to select a selected header processing pipeline of the first plurality of header processing pipelines to transfer a multicast packet header from one of the input buffers.

14. The apparatus of claim 13, wherein the pre-fetch module further comprises:
a counter configured to count a number of multicast packet headers and recycled packet headers concurrently processed by the header processing unit; and
backpressure logic responsive to the counter and configured to provide a backpressure signal to the switch fabric interface queue.

15. An apparatus for switching packets, each packet having a header and a corresponding tail, the apparatus comprising:
means for receiving a multicast packet header;
means for associating a first sequence number with the multicast packet header;
means for fetching the multicast packet header comprising means for providing the multicast packet header and the first sequence number to a subsequent one of a plurality of sequential means for processing;
means for outputting a modified multicast packet header and the first sequence number from an egress means for processing of the plurality of sequential means for processing; and
means for providing a multicast packet header replica to the means for fetching from the egress means for processing, wherein
the modified multicast packet header corresponds to the multicast packet header, and
the multicast packet header replica is a replica of the multicast packet header.

16. The apparatus of claim 15, further comprising:
the means for fetching further comprising
means for selecting from the multicast packet header and the multicast packet header replica,
means for associating a second sequence number with the multicast packet header replica, and
means for providing the recycled multicast packet header and the second sequence number to a subsequent one of the plurality of sequential means for processing; and
means for outputting a modified multicast packet header replica and the second sequence number from the egress means for processing, wherein
the modified multicast packet header replica corresponds to the recycled multicast packet header.

17. The apparatus of claim 16, wherein the means for associating a second sequence number with the multicast packet header replica further comprises:
means for requesting the second sequence number from a pre-fetch module in response to a means for determining that a multicast packet header replica is a replica of the multicast packet header.

18. The apparatus of claim 15, wherein the plurality of sequential means for processing further comprises:
means for determining that the multicast packet header should be recycled; and
said means for providing the multicast packet header replica to the means for fetching is responsive to said means for determining that the multicast packet header should be recycled.

19. The apparatus of claim 15, further comprising:
means for tracking a number of multicast packet headers and multicast packet header replicas concurrently processed by the plurality of sequential means for processing; and
means for providing a backpressure signal to a means for supplying multicast packet headers in response to the means for tracking.

20. The apparatus of claim 19, further comprising:
means for storing a first threshold value, wherein
the first threshold value comprises a defined average number of multicast headers to be concurrently processed by the plurality of sequential means for processing;
means for storing a second threshold value, wherein
the second threshold value comprises a defined peak number of multicast packet headers to be concurrently processed by the plurality of sequential means for processing; and
said means for providing a backpressure signal further comprises
means for providing a first backpressure signal if the number of multicast packet headers and multicast packet header replicas being concurrently processed by the plurality of sequential means for processing is greater than the first threshold value and less than the second threshold value, and
means for providing a second backpressure signal if the number of multicast packet headers and multicast packet header replicas being concurrently processed by the plurality of sequential means for processing is greater than the second threshold value.

21. The apparatus of claim 15, further comprising:
a pre-fetch module comprising
the means for receiving the multicast packet header,
the means for associating the first sequence number with the multicast packet header,
means for receiving a multicast packet tail corresponding to the multicast packet header,
means for associating an associated identifier with the multicast packet header and the multicast packet tail,
means for outputting the multicast packet tail and the associated identifier, and
means for providing the multicast packet header, first sequence number and the associated identifier to the means for fetching.

22. The apparatus of claim 21, further comprising:
egress traffic management means comprising
means for receiving the multicast packet tail from the pre-fetch module,
means for receiving the modified multicast packet header and any modified multicast packet header replicas corresponding to the multicast packet header, and
means for associating the multicast packet tail with the modified multicast packet header and each modified recycled multicast packet header associated with an associated identifier that matches the multicast packet tail associated identifier.

23. The apparatus of claim 21, further comprising:
a header processing unit comprising a first plurality of header processing pipelines wherein a first header processing pipeline comprises the plurality of sequential means for processing; and the pre-fetch module further comprises
- a second plurality of means for buffering multicast packet headers,
- means for selecting a selected header processing pipeline of the first plurality of header processing pipelines, and
- means for transferring a multicast packet header from one of second plurality of means for buffering to the selected header processing pipeline.

24. A method for switching packets comprising:

receiving a multicast packet header;

associating a first sequence number with the multicast packet header;

providing the multicast packet header and first sequence number to a first stage circuit of a header processing pipeline, wherein
- the header processing pipeline comprises a plurality of pipeline stage circuits connected in sequence;

processing the multicast packet header in one or more of the stages of the header processing pipeline and generating a modified multicast packet header corresponding to the multicast packet header;

outputting the modified multicast packet header and the first sequence number; and providing a multicast packet header replica to the first stage circuit of the header processing pipeline, wherein
- the multicast packet header replica is a replica of the multicast packet header.

25. The method of claim 24, further comprising:

associating a second sequence number with the multicast packet header replica;

processing the recycled multicast packet header in one or more stages of the header processing pipeline and generating a modified multicast packet header replica corresponding to the multicast packet header replica; and outputting the modified packet header replica and the second sequence number.

26. The method of claim 24, further comprising:

determining whether the multicast packet header should be recycled; and performing said providing the recycled multicast packet header to the first stage circuit in response to said determining.

27. The method of claim 24, further comprising:

tracking a number of multicast packet headers and recycled multicast packet headers concurrently processed by the header processing pipeline; and providing a backpressure signal to a queue configured to supply multicast packet headers, wherein said providing the backpressure signal is performed in response to the number of multicast packet headers and recycled multicast packet headers exceeding a threshold.

28. The method of claim 24, further comprising:

receiving a multicast packet tail corresponding to the multicast packet header;

associating an associated identifier with the multicast packet header and the multicast packet tail; and outputting the multicast packet tail and the associated identifier.

29. The method of claim 28, further comprising:

associating the multicast packet tail with the modified multicast packet header and any modified multicast packet header replica having an associated identifier that matches the multicast packet tail associated identifier.

30. The method of claim 28, further comprising:

selecting the header processing pipeline from a plurality of header processing pipelines;

providing the associated identifier to the first stage circuit of the header processing pipeline;

outputting the associated identifier with the modified multicast packet header; and associating the associated identifier with the multicast packet header replica.

* * * * *